US012598548B2

(12) United States Patent
Chun et al.

(10) Patent No.: US 12,598,548 B2
(45) Date of Patent: Apr. 7, 2026

(54) SUPPORT FOR NETWORK SERVICE

(71) Applicant: Ofinno, LLC, Reston, VA (US)

(72) Inventors: SungDuck Chun, Fairfax, VA (US);
Kyungmin Park, Vienna, VA (US);
Esmael Hejazi Dinan, McLean, VA
(US); Peyman Talebi Fard, Vienna, VA
(US); Taehun Kim, Fairfax, VA (US);
Weihua Qiao, Herndon, VA (US)

(73) Assignee: Ofinno, LLC, Reston, VA (US)

( * ) Notice: Subject to any disclaimer, the term of this
patent is extended or adjusted under 35
U.S.C. 154(b) by 0 days.

(21) Appl. No.: 18/501,763

(22) Filed: Nov. 3, 2023

(65) Prior Publication Data

US 2024/0064626 A1      Feb. 22, 2024

Related U.S. Application Data

(63) Continuation of application No.
PCT/US2022/048991, filed on Nov. 4, 2022.

(60) Provisional application No. 63/275,819, filed on Nov.
4, 2021.

(51) Int. Cl.
*H04W 48/18* (2009.01)
*H04W 8/02* (2009.01)
*H04W 48/08* (2009.01)
*H04W 48/16* (2009.01)

(52) U.S. Cl.
CPC ............. *H04W 48/18* (2013.01); *H04W 8/02*
(2013.01); *H04W 48/08* (2013.01); *H04W*
*48/16* (2013.01)

(58) Field of Classification Search
CPC ..... H04W 48/08; H04W 48/16; H04W 48/18;
H04W 8/02
See application file for complete search history.

(56) References Cited

U.S. PATENT DOCUMENTS

| | | | |
|---|---|---|---|
| 10,880,806 B2 | 12/2020 | Faccin et al. | |
| 11,696,208 B1 * | 7/2023 | Manning ............... | H04W 48/18 |
| | | | 370/329 |
| 2018/0227873 A1 | 8/2018 | Vrzic et al. | |
| 2020/0322879 A1 * | 10/2020 | Zhu ........................ | H04W 60/00 |
| 2021/0014766 A1 * | 1/2021 | Liu ........................ | H04W 48/16 |
| 2022/0159605 A1 | 5/2022 | Li et al. | |

(Continued)

FOREIGN PATENT DOCUMENTS

| | | |
|---|---|---|
| CN | 111630880 A | 9/2020 |
| CN | 115299114 A | 11/2022 |

(Continued)

OTHER PUBLICATIONS

3GPP TS 23.502 V17.1.0 (Jun. 2021); Technical Specification; 3rd
Generation Partnership Project; Technical Specification Group Ser-
vices and System Aspects; Procedures for the 5G System (5GS);
Stage 2; (Release 17).

(Continued)

*Primary Examiner* — Wayne H Cai
(74) *Attorney, Agent, or Firm* — John F. Sun; Kavon
Nasabzadeh; Jacob L. Mangan

(57) ABSTRACT

An access and mobility management function (AMF)
receives, from a wireless device, a request message for a
protocol data unit (PDU) session via an allowed network
slice. The AMF sends, to the wireless device, a message
indicating the allowed network slice and an alternative
network slice associated with the allowed network slice.

17 Claims, 34 Drawing Sheets

(56) References Cited

U.S. PATENT DOCUMENTS

| | | | |
|---|---|---|---|
| 2023/0052699 A1* | 2/2023 | Ninglekhu | H04W 48/16 |
| 2023/0130966 A1 | 4/2023 | Suh et al. | |
| 2023/0132096 A1* | 4/2023 | Shekhar | H04W 76/10 |
| | | | 370/329 |
| 2023/0171647 A1 | 6/2023 | Jiang | |
| 2023/0362766 A1* | 11/2023 | Ianev | H04W 36/0011 |
| 2024/0365272 A1* | 10/2024 | Ninglekhu | H04W 60/04 |

FOREIGN PATENT DOCUMENTS

| | | |
|---|---|---|
| EP | 1353480 A1 | 10/2003 |
| EP | 3713370 A1 | 9/2020 |
| WO | 2020/186145 A1 | 9/2020 |
| WO | 2021/069056 A1 | 4/2021 |
| WO | 2021/138526 A1 | 7/2021 |
| WO | 2021/183870 A1 | 9/2021 |
| WO | 2022/030254 A1 | 2/2022 |
| WO | 2022/069126 A1 | 4/2022 |
| WO | 2023/285224 A1 | 1/2023 |
| WO | 2023/057081 A1 | 4/2023 |
| WO | 2023/075354 A1 | 5/2023 |

OTHER PUBLICATIONS

3GPP TS 38.413 V16.6.0 (Jul. 2021); Technical Specification; 3rd Generation Partnership Project; Technical Specification Group Radio Access Network; NG-RAN; NG Application Protocol (NGAP); (Release 16).

3GPP TS 38.423 V16.6.0 (Jul. 2021); Technical Specification; 3rd Generation Partnership Project; Technical Specification Group Radio Access Network; NG-RAN; Xn application protocol (XnAP); (Release 16).

R2-2008963; 3GPP TSG RAN WG2 Meeting #112-e; E-Conference, Nov. 2-13, 2020; Agenda item: 8.8.2; Source: Qualcomm Incorporated; Title: Further discussion on RAN slicing enhancement; WID/SID: FS_NR_slice—Release 17; Document for: Discussion and Decision.

R2-2010181; 3GPP TSG-RAN WG2 Meeting #112 electronic; Online, Nov. 2-13, 2020; Source: Huawei, HiSilicon; Title: Slice based Cell (re)selection under network control; Agenda Item: 8.3.2 Slice based cell reselection under network control; Document for: Discussion and decision.

R2-2010366; 3GPP TSG-RAN WG2 Meeting #112 electronic; Online, Nov. 2-13, 2020; Agenda Item: 8.8.1; Source: CMCC; Title: Email discussion on open issues for RAN slicing SI.

R2-2100660; 3GPP TSG-RAN WG2 Meeting #113 electronic; Online, Jan. 25-Feb. 5, 2021; Agenda item: 8.8.2; Source: Spreadtrum Communications; Title: Discussion on the awareness of intended slice for MT service; WID/SID: FS_NR_Slice; Document for: Discussion and Decision.

R2-2100894; 3GPP TSG-RAN WG2 #113-e; E-meeting, Jan. 2021; Agenda Item: 8.8.2; Source: OPPO; Title: Consideration on slice-specific cell (re)selection; Document for: Discussion, Decision.

R2-2100964; 3GPP TSG-RAN WG2 Meeting #113 electronic; Online, Jan. 25-Feb. 5, 2021; Source: CATT; Title: Slice based Cell Reselection under Network Control; Agenda Item: 8.8.2; Document for: Discussion and Decision.

R2-2101294; 3GPP TSG-RAN WG2 #113eTdoc; Electronic meeting, Jan. 25, 2021-Feb. 5, 2021; Agenda Item: 8.3.2; Source: Ericsson; Title: Network Slice Support in Cells; Document for: Discussion, Decision.

R2-2101802; 3GPP TSG-RAN WG2 Meeting #113 electronic; Online, Jan. 25-Feb. 5, 2021; Agenda Item: 8.8.1; Source: CMCC; Title: Report of [Post112-e][253][RAN slicing] Prioritized solutions for RAN slicing; Document for: Discussion and Decision.

R2-2101974; 3GPP TSG-RAN WG2 Meeting #113 electronic; Online, Jan. 25-Feb. 5, 2021; Agenda Item: 8.8.2 Slice based cell reselection under network control; Source: Huawei (Email rapporteur); Title: Report of email 251 for slice-based cell (re)selection; WI code(s): FS_NR_slice; Document for: Discussion and Decision.

R2-2107108; 3GPP TSG RAN WG2 Meeting #115-e; E-Conference, Aug. 9-27, 2021; Agenda item: 8.8.2; Source: Qualcomm Incorporated; Title:Further discussion on slice specific cell reselection; WID/SID: NR_Slice-Core—Release 17; Document for: Discussion and Decision.

R2-2107383; 3GPP TSG-RAN WG2 Meeting #115 electronic; Online, Aug. 9-Aug. 27, 2021; Source: CATT ; Title: Discussion on Slice based Cell Reselection; Agenda Item: 8.8.2; Document for: Discussion and Decision.

R2-2107466; 3GPP TSG-RAN WG2 Meeting #115 electronic; Online, Aug. 16-Aug. 27, 2021; Agenda item: 8.8.2; Source: FGI, Asia Pacific Telecom; Title: Cell reselection in RAN slicing; Document for: Discussion and decision.

R2-2107592; 3GPP TSG-RAN WG2 Meeting #115-e; Electronic, Aug. 16-Aug. 27, 2021; Agenda item: 8.8.2; Source: Apple; Title: Slice based cell reselection under NW control; Document for: Discussion.

R2-2107705; 3GPP TSG-RAN2 #115-e; Elbonia, Aug. 16-Aug. 27, 2021; Agenda item: 8.8.2 ; Source: LG Electronics; Title: Discussion on slice based cell reselection; Document for: Discussion and Decision.

R2-2108433; 3GPP TSG RAN WG2 Meeting #115-e; Aug. 9-27, 2021; Revision of R2-2106087; Source: Sharp; Title: Slice information provided by RRCRelease; Agenda Item: 8.8.2; Document for: Discussion and Decision.

R3-204809; 3GPP TSG-RAN WG3 Meeting #109-e; Electronic, Aug. 17-28, 2020; Agenda item: 17.3; Source: Qualcomm Incorporated; Title: On need for UE Capability Check for RAN slicing; Document for: Discussion.

R3-212977; 3GPP TSG-RAN WG3 #112-e; May 17-May 27, 2021; Online; Agenda item: 17.3; Source: ZTE (Moderator); Title: (TP for TR 38.832) RAN Slicing; Document for: Discussion and Approval.

RP-211287; 3GPP TSG RAN meeting #92e; Electronic Meeting, Jun. 14-18, 2021; Status Report to TSG; Agenda item: 9.6.4; WI / SI Name; Study on enhancement of RAN slicing for NR.

RP-211289; 3GPP TSG RAN meeting #92e; Electronic Meeting, Jun. 14-18, 2021; Status Report to TSG; Agenda item: 9.7.2.10; WI / SI Name; Enhancement of RAN slicing for NR.

RP-211290; 3GPP TSG RAN Meeting #92-e; Electronic Meeting, Jun. 14-18, 2021; Source: CMCC, ZTE; Title: Revised WID on enhancement of RAN Slicing for NR; Document for: Approval; Agenda Item: 9.7.2.10.

S1-211423; 3GPP TSG-SA WG1 Meeting # 94e; Electronics, May 10-20, 2021; Change Request; 22.261; CR 0505; rev 1; Current version: 18.2.0.

S2-2000482; 3GPP TSG-WG SA2 Meeting #136-AH; Incheon, Korea, Jan. 13-17, 2020; Source: AT Title: Use of OAM based slice information by the AMF/NSSF; Document for: Approval.

S2-2000564; SA WG2 Meeting #136-AH; Jan. 13-17, 2020, Incheon, South Korea; (revision of ); Source: Qualcomm Incorporated; Title: eNS_Ph2 Solution for handling at NAS level restrictions imposed by GST parameters; Document for: Discussion and Agreement; Agenda Item: 8.8; Work Item / Release: FS_eNS_Ph2/ Rel-17.

S2-2000691; SA WG2 Meeting #136 Ad-hoc; Jan. 13-17, 2020, Incheon, Korea; (was S2-1912732); Source: Samsung, AT&T, Sprint, InterDigital, China Mobile, SK Telecom, Convida Wireless, ZTE ; Title: Key Issue on 5GC assisted cell selection to access network slice; Document for: Approval; Agenda Item: 8.8; Work Item / Release: FS_eNS_Ph2 / Rel-17.

S2-2005478; 3GPP TSG-WG SA2 Meeting #140E e-meeting; Elbonia, Aug. 19-Sep. 1, 2020; (revision of S2-200xxxx); Source: Huawei, HiSilicon; Title: KI#6, New Sol: Simultaneous use of network slices via Configured NSSAI; Document for: Approval; Agenda Item: 8.4; Work Item / Release: FS_eNS_Ph2 / Rel-17.

S2-2005479; 3GPP TSG-WG SA2 Meeting #140E e-meeting; Elbonia, Aug. 19-Sep. 1, 2020; (revision of S2-200xxxx); Source: Huawei, HiSilicon; Title: KI#7, New Sol: S-NSSAI-aware 5G-AN selection based on UE Radio capability; Document for: Approval; Agenda Item: 8.4; Work Item / Release: FS_eNS_Ph2 / Rel-17.

(56)          References Cited

OTHER PUBLICATIONS

International Search Report and Written Opinion of the International Searching authority mailed Feb. 6, 2023, in International Application No. PCT/US2022/048991.

R2-2100768; 3GPP TSG-RAN2 #113e; Electronic meeting, Jan. 25-Feb. 5, 2021; Agenda item: 8.8.2; Source: LG Electronics Inc.; Title: Further discussion on intended slices; Document for: Discussion and Decision.

S3-213030; 3GPP TSG-SA3 Meeting #104-e; e-meeting, Aug. 16-27, 2021; Source: Lenovo, Motorola Mobility; Title: Update to Key Issue #1; Document for: Approval; Agenda Item: 5.21.

European Office Action mailed Mar. 19, 2025 in EP Patent Application No. 22826721.7.

R3-210525; 3GPP TSG-RAN3 #111; Jan. 25-Feb. 4, 2021; Online; Agenda Item: 17.2; Source: Ericsson; Title: TP for 38.823— structure of slice re-mapping solutions chapter; Document for: Discussion, TP.

* cited by examiner

FIG. 7C

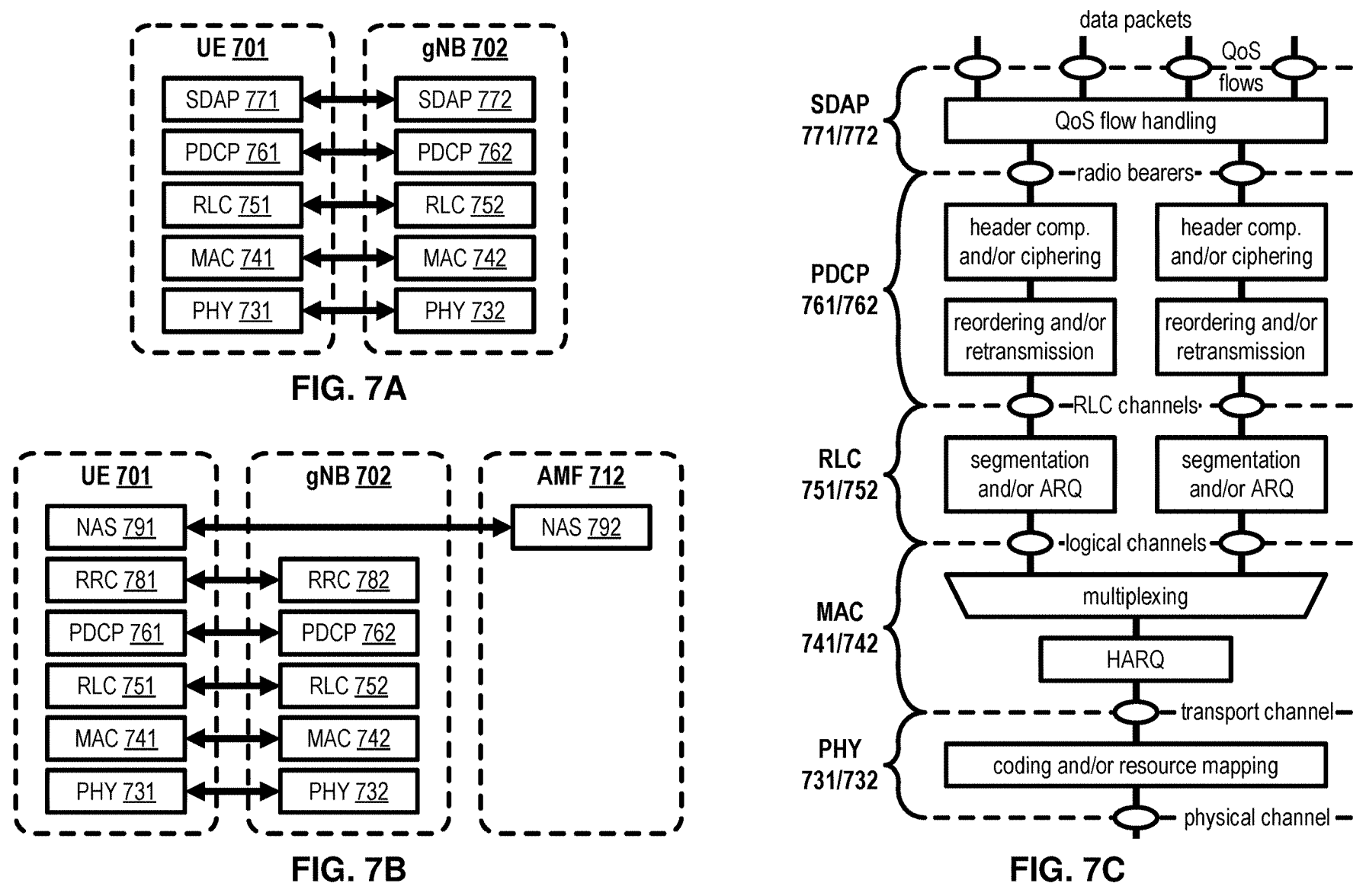

SDAP 771/772

PDCP 761/762

RLC 751/752

MAC 741/742

PHY 731/732 data packets

QoS flows

QoS flow handling radio bearers header comp. and/or ciphering reordering and/or retransmission RLC channels segmentation and/or ARQ logical channels multiplexing

HARQ transport channel coding and/or resource mapping physical channel

FIG. 7A gNB 702

SDAP 772

PDCP 762

RLC 752

MAC 742

PHY 732

UE 701

SDAP 771

PDCP 761

RLC 751

MAC 741

PHY 731

FIG. 7B

AMF 712

NAS 792 gNB 702

RRC 782

PDCP 762

RLC 752

MAC 742

PHY 732

UE 701

NAS 791

RRC 781

PDCP 761

RLC 751

MAC 741

PHY 731

Figures 14A, 14B, 14C, 14D:
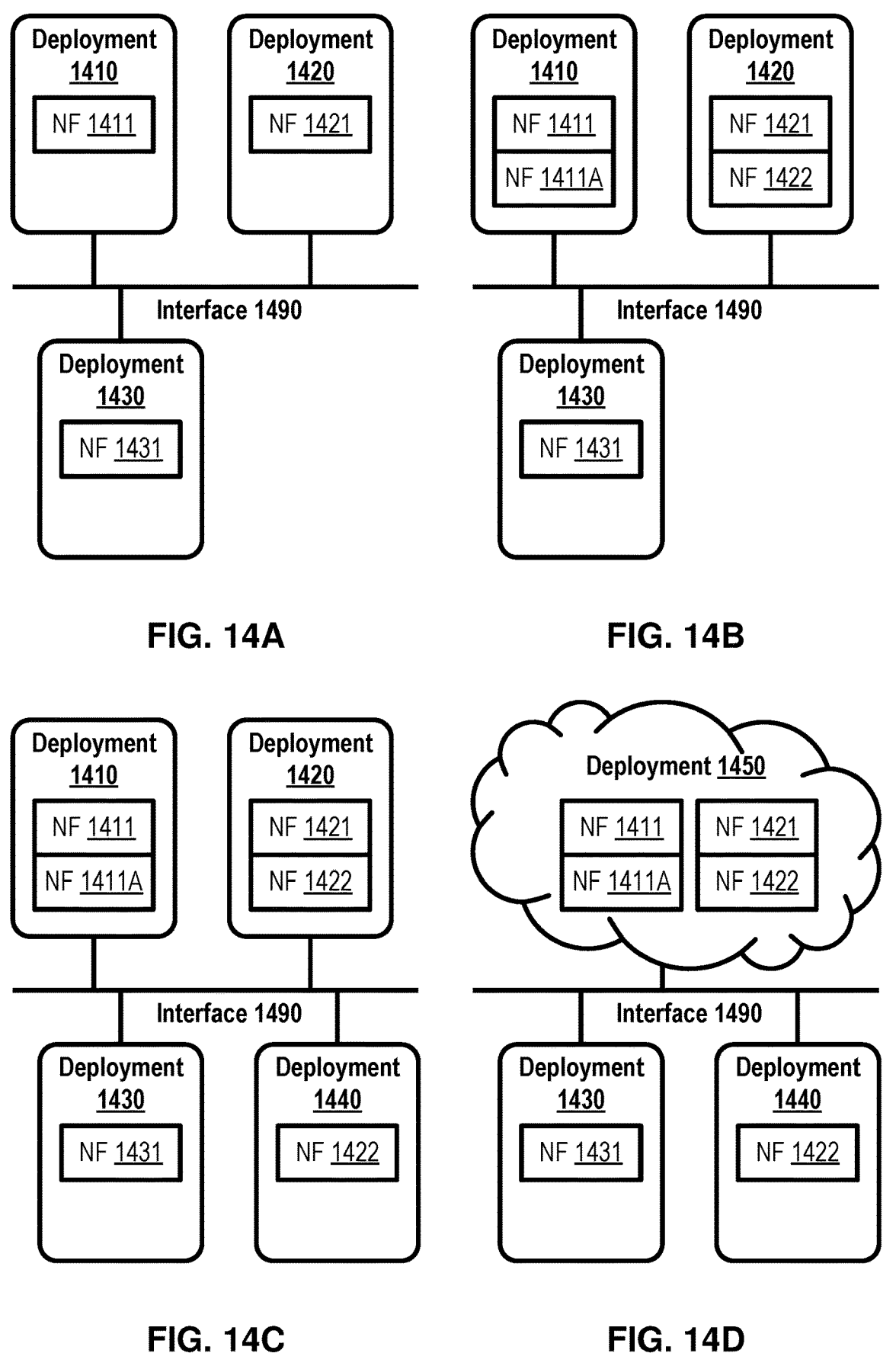

Deployment
1410

NF 1411

Deployment
1420

NF 1421

Interface 1490

Deployment
1430

Deployment
1410

NF 1411

NF 1411A

Deployment
1420

NF 1421

NF 1422

Interface 1490

Deployment
1430

Deployment
1410

NF 1411

NF 1411A

Deployment
1420

NF 1421

NF 1422

Interface 1490

Deployment
1430

NF 1431

Deployment
1440

Deployment 1450

NF 1411

NF 1411A

NF 1421

NF 1422

Interface 1490

Deployment
1430

NF 1431

Deployment
1440

SUPPORT FOR NETWORK SERVICE

CROSS-REFERENCE TO RELATED APPLICATIONS

This application is a continuation of International Application No. PCT/US2022/048991, filed Nov. 4, 2022, which claims the benefit of U.S. Provisional Application No. 63/275,819, filed Nov. 4, 2021, all of which are hereby incorporated by reference in their entireties.

BRIEF DESCRIPTION OF THE DRAWINGS

Examples of several of the various embodiments of the present disclosure are described herein with reference to the drawings.

FIG. 7A, FIG. 7B, and FIG. 7C illustrate a user plane protocol stack, a control plane protocol stack, and services provided between protocol layers of the user plane protocol stack.

FIG. 14A, FIG. 14B, FIG. 14C, and FIG. 14D illustrate various examples of physical core network deployments, each having one or more network functions or portions thereof.

DETAILED DESCRIPTION

Figures 1A, 1B:
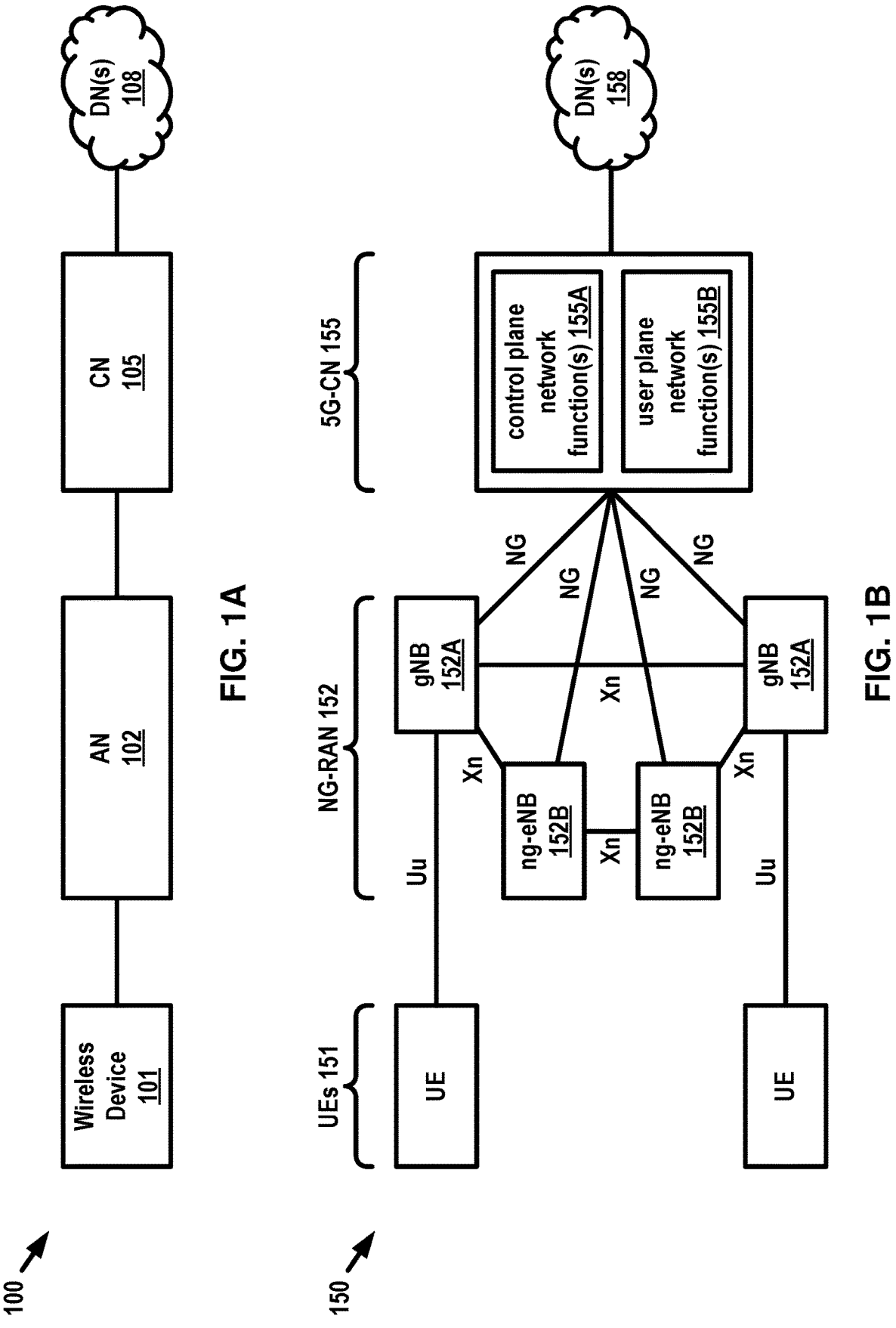
FIG. 1A and FIG. 1B illustrate example communication networks including an access network and a core network.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have one or more specific capabilities. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases refer to a single instance of a particular element, but should not be interpreted to exclude other instances of that element. For example, a bicycle with two wheels may be described as having "a wheel". Any term that ends with the suffix "(s)" is to be interpreted as "at least one" and/or "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described.

The phrases "based on", "in response to", "depending on", "employing", "using", and similar phrases indicate the presence and/or influence of a particular factor and/or condition on an event and/or action, but do not exclude unenumerated factors and/or conditions from also being present and/or influencing the event and/or action. For example, if action X is performed "based on" condition Y, this is to be interpreted as the action being performed "based at least on" condition Y. For example, if the performance of action X is performed when conditions Y and Z are both satisfied, then the performing of action X may be described as being "based on Y".

The term "configured" may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, a parameter may comprise one or more information objects, and an information object may comprise one or more other objects. For example, if parameter J comprises parameter K, and parameter K comprises parameter L, and parameter L comprises parameter M, then J comprises L, and J comprises M. A parameter may be referred to as a field or information element. In an example embodiment, when one or more messages comprise a plurality of parameters, it implies that a parameter in the plurality of parameters is in at least one of the one or more messages, but does not have to be in each of the one or more messages.

This disclosure may refer to possible combinations of enumerated elements. For the sake of brevity and legibility, the present disclosure does not explicitly recite each and every permutation that may be obtained by choosing from a set of optional features. The present disclosure is to be interpreted as explicitly disclosing all such permutations. For example, the seven possible combinations of enumerated elements A, B, C consist of: (1) "A"; (2) "B"; (3) "C"; (4) "A and B"; (5) "A and C"; (6) "B and C"; and (7) "A, B, and C". For the sake of brevity and legibility, these seven possible combinations may be described using any of the following interchangeable formulations: "at least one of A, B, and C"; "at least one of A, B, or C"; "one or more of A, B, and C"; "one or more of A, B, or C"; "A, B, and/or C". It will be understood that impossible combinations are excluded. For example, "X and/or not-X" should be interpreted as "X or not-X". It will be further understood that these formulations may describe alternative phrasings of overlapping and/or synonymous concepts, for example, "identifier, identification, and/or ID number".

This disclosure may refer to sets and/or subsets. As an example, set X may be a set of elements comprising one or more elements. If every element of X is also an element of Y, then X may be referred to as a subset of Y. In this disclosure, only non-empty sets and subsets are considered. For example, if Y consists of the elements Y1, Y2, and Y3, then the possible subsets of Y are {Y1, Y2, Y3}, {Y1, Y2}, {Y1, Y3}, {Y2, Y3}, {Y1}, {Y2}, and {Y3}.

FIG. 1A illustrates an example of a communication network 100 in which embodiments of the present disclosure may be implemented. The communication network 100 may comprise, for example, a public land mobile network (PLMN) run by a network operator. As illustrated in FIG. 1A, the communication network 100 includes a wireless device 101, an access network (AN) 102, a core network (CN) 105, and one or more data network (DNs) 108.

The wireless device 101 may communicate with DNs 108 via AN 102 and CN 105. In the present disclosure, the term wireless device may refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, unmanned aerial vehicle, urban air mobility, and/or any combination thereof. The term wireless device encompasses other terminology, including user equipment (UE), user terminal (UT), access terminal (AT), mobile station, handset, wireless transmit and receive unit (WTRU), and/or wireless communication device.

The AN 102 may connect wireless device 101 to CN 105 in any suitable manner. The communication direction from the AN 102 to the wireless device 101 is known as the downlink and the communication direction from the wireless device 101 to AN 102 is known as the uplink. Downlink transmissions may be separated from uplink transmissions using frequency division duplexing (FDD), time-division duplexing (TDD), and/or some combination of the two duplexing techniques. The AN 102 may connect to wireless device 101 through radio communications over an air interface. An access network that at least partially operates over the air interface may be referred to as to a radio access network (RAN). The CN 105 may set up one or more end-to-end connection between wireless device 101 and the one or more DNs 108. The CN 105 may authenticate wireless device 101 and provide charging functionality.

In the present disclosure, the term base station may refer to and encompass any element of AN 102 that facilitates communication between wireless device 101 and AN 102. Access networks and base stations have many different names and implementations. The base station may be a terrestrial base station fixed to the earth. The base station may be a mobile base station with a moving coverage area. The base station may be in space, for example, on board a satellite. For example, WiFi and other standards may use the term access point. As another example, the Third-Generation Partnership Project (3GPP) has produced specifications for three generations of mobile networks, each of which uses different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use new terminology to refer to the elements which implement the methods described in the present disclosure (e.g., wireless devices, base stations, ANs, CNs, and/or components thereof). A base station may be implemented as a repeater or relay node used to extend the coverage area of a donor node. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The AN 102 may include one or more base stations, each having one or more coverage areas. The geographical size and/or extent of a coverage area may be defined in terms of a range at which a receiver of AN 102 can successfully receive transmissions from a transmitter (e.g., wireless device 101) operating within the coverage area (and/or vice-versa). The coverage areas may be referred to as sectors or cells (although in some contexts, the term cell refers to the carrier frequency used in a particular coverage area, rather than the coverage area itself). Base stations with large coverage areas may be referred to as macrocell base stations. Other base stations cover smaller areas, for example, to provide coverage in areas with weak macrocell coverage, or to provide additional coverage in areas with high traffic (sometimes referred to as hotspots). Examples of small cell base stations include, in order of decreasing coverage area, microcell base stations, picocell base stations, and femtocell base stations or home base stations. Together, the coverage areas of the base stations may provide radio coverage to wireless device 101 over a wide geographic area to support wireless device mobility.

A base station may include one or more sets of antennas for communicating with the wireless device 101 over the air interface. Each set of antennas may be separately controlled by the base station. Each set of antennas may have a corresponding coverage area. As an example, a base station may include three sets of antennas to respectively control three coverage areas on three different sides of the base station. The entirety of the base station (and its corresponding antennas) may be deployed at a single location. Alternatively, a controller at a central location may control one or more sets of antennas at one or more distributed locations. The controller may be, for example, a baseband processing unit that is part of a centralized or cloud RAN architecture. The baseband processing unit may be either centralized in a pool of baseband processing units or virtualized. A set of antennas at a distributed location may be referred to as a remote radio head (RRH).

FIG. 1B illustrates another example communication network 150 in which embodiments of the present disclosure may be implemented. The communication network 150 may comprise, for example, a PLMN run by a network operator. As illustrated in FIG. 1B, communication network 150 includes UEs 151, a next generation radio access network (NG-RAN) 152, a 5G core network (5G-CN) 155, and one or more DNs 158. The NG-RAN 152 includes one or more base stations, illustrated as generation node Bs (gNBs) 152A and next generation evolved Node Bs (ng eNBs) 152B. The 5G-CN 155 includes one or more network functions (NFs), including control plane functions 155A and user plane functions 155B. The one or more DNs 158 may comprise public DNs (e.g., the Internet), private DNs, and/or intra-operator DNs. Relative to corresponding components illustrated in FIG. 1A, these components may represent specific implementations and/or terminology.

The base stations of the NG-RAN 152 may be connected to the UEs 151 via Uu interfaces. The base stations of the NG-RAN 152 may be connected to each other via Xn interfaces. The base stations of the NG-RAN 152 may be connected to 5G CN 155 via NG interfaces. The Uu interface may include an air interface. The NG and Xn interfaces may include an air interface, or may consist of direct physical connections and/or indirect connections over an underlying transport network (e.g., an internet protocol (IP) transport network).

Each of the Uu, Xn, and NG interfaces may be associated with a protocol stack. The protocol stacks may include a user plane (UP) and a control plane (CP). Generally, user plane data may include data pertaining to users of the UEs 151, for example, internet content downloaded via a web browser application, sensor data uploaded via a tracking application, or email data communicated to or from an email server. Control plane data, by contrast, may comprise signaling and messages that facilitate packaging and routing of user plane data so that it can be exchanged with the DN(s). The NG interface, for example, may be divided into an NG user plane interface (NG-U) and an NG control plane interface (NG-C). The NG-U interface may provide delivery of user plane data between the base stations and the one or more user plane network functions 155B. The NG-C interface may be used for control signaling between the base stations and the one or more control plane network functions 155A. The NG-C interface may provide, for example, NG interface management, UE context management, UE mobility management, transport of NAS messages, paging, PDU session management, and configuration transfer and/or warning message transmission. In some cases, the NG-C interface may support transmission of user data (for example, a small data transmission for an IoT device).

One or more of the base stations of the NG-RAN 152 may be split into a central unit (CU) and one or more distributed units (DUs). A CU may be coupled to one or more DUs via an F1 interface. The CU may handle one or more upper layers in the protocol stack and the DU may handle one or more lower layers in the protocol stack. For example, the CU may handle RRC, PDCP, and SDAP, and the DU may handle RLC, MAC, and PHY. The one or more DUs may be in geographically diverse locations relative to the CU and/or each other. Accordingly, the CU/DU split architecture may permit increased coverage and/or better coordination.

The gNBs 152A and ng-eNB s 152B may provide different user plane and control plane protocol termination towards the UEs 151. For example, the gNB 154A may provide new radio (NR) protocol terminations over a Uu interface associated with a first protocol stack. The ng-eNB s 152B may provide Evolved UMTS Terrestrial Radio Access (E-UTRA) protocol terminations over a Uu interface associated with a second protocol stack.

The 5G-CN 155 may authenticate UEs 151, set up end-to-end connections between UEs 151 and the one or more DNs 158, and provide charging functionality. The 5G-CN 155 may be based on a service-based architecture, in which the NFs making up the 5G-CN 155 offer services to each other and to other elements of the communication network 150 via interfaces. The 5G-CN 155 may include any number of other NFs and any number of instances of each NF.

FIG. 2A, FIG. 2B, FIG. 2C, and FIG. 2D illustrate various examples of a framework for a service-based architecture within a core network. In a service-based architecture, a service may be sought by a service consumer and provided by a service producer. Prior to obtaining a particular service, an NF may determine where such as service can be obtained. To discover a service, the NF may communicate with a network repository function (NRF). As an example, an NF that provides one or more services may register with a network repository function (NRF). The NRF may store data relating to the one or more services that the NF is prepared to provide to other NFs in the service-based architecture. A consumer NF may query the NRF to discover a producer NF (for example, by obtaining from the NRF a list of NF instances that provide a particular service).

Figures 2A, 2B, 2C, 2D:
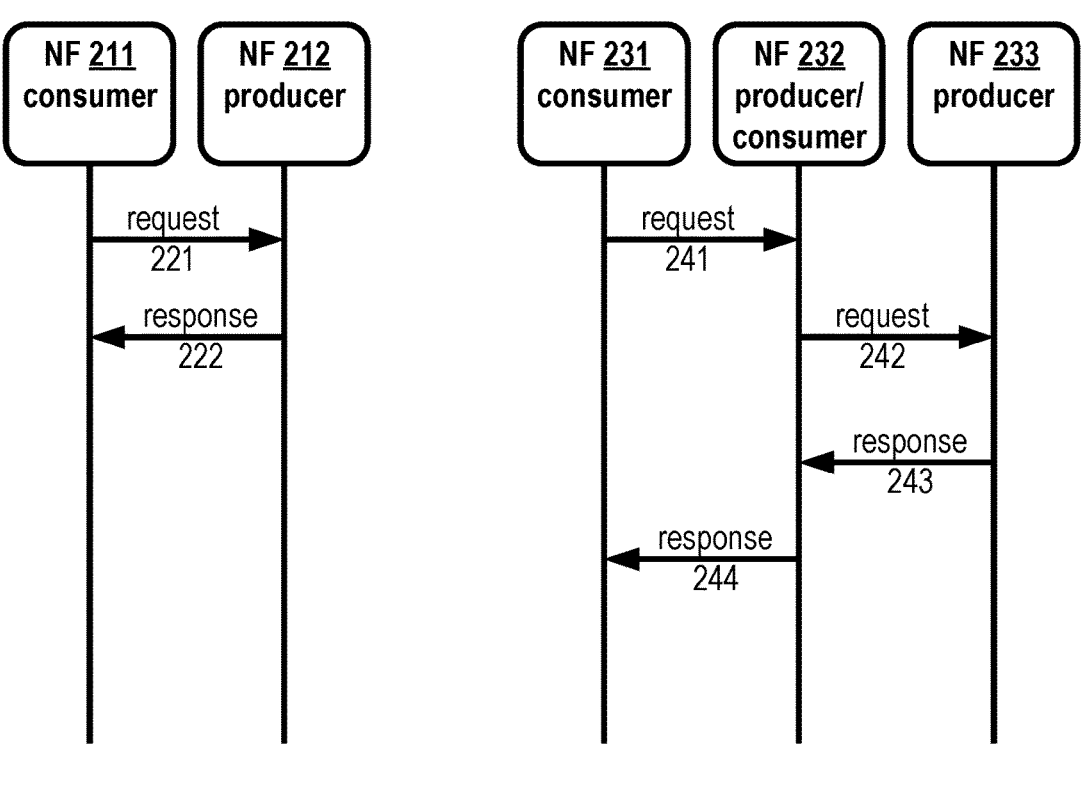
FIG. 2A, FIG. 2B, FIG. 2C, and FIG. 2D illustrate various examples of a framework for a service-based architecture within a core network.

In the example of FIG. 2A, an NF 211 (a consumer NF in this example) may send a request 221 to an NF 212 (a producer NF). The request 221 may be a request for a particular service and may be sent based on a discovery that NF 212 is a producer of that service. The request 221 may comprise data relating to NF 211 and/or the requested service. The NF 212 may receive request 221, perform one or more actions associated with the requested service (e.g., retrieving data), and provide a response 221. The one or more actions performed by the NF 212 may be based on request data included in the request 221, data stored by NF 212, and/or data retrieved by NF 212. The response 222 may notify NF 211 that the one or more actions have been completed. The response 222 may comprise response data relating to NF 212, the one or more actions, and/or the requested service.

In the example of FIG. 2B, an NF 231 sends a request 241 to an NF 232. In this example, part of the service produced by NF 232 is to send a request 242 to an NF 233. The NF 233 may perform one or more actions and provide a response 243 to NF 232. Based on response 243, NF 232 may send a response 244 to NF 231. It will be understood from FIG. 2B that a single NF may perform the role of producer of services, consumer of services, or both. A particular NF service may include any number of nested NF services produced by one or more other NFs.

FIG. 2C illustrates examples of subscribe-notify interactions between a consumer NF and a producer NF. In FIG. 2C, an NF 251 sends a subscription 261 to an NF 252. An NF 253 sends a subscription 262 to the NF 252. Two NFs are shown in FIG. 2C for illustrative purposes (to demonstrate that the NF 252 may provide multiple subscription services to different NFs), but it will be understood that a subscribe-notify interaction only requires one subscriber. The NFs 251, 253 may be independent from one another. For example, the NFs 251, 253 may independently discover NF 252 and/or independently determine to subscribe to the service offered by NF 252. In response to receipt of a subscription, the NF 252 may provide a notification to the subscribing NF. For example, NF 252 may send a notification 263 to NF 251 based on subscription 261 and may send a notification 264 to NF 253 based on subscription 262.

As shown in the example illustration of FIG. 2C, the sending of the notifications 263, 264 may be based on a determination that a condition has occurred. For example, the notifications 263, 264 may be based on a determination that a particular event has occurred, a determination that a particular condition is outstanding, and/or a determination that a duration of time associated with the subscription has elapsed (for example, a period associated with a subscription for periodic notifications). As shown in the example illustration of FIG. 2C, NF 252 may send notifications 263, 264 to NFs 251, 253 simultaneously and/or in response to the same condition. However, it will be understood that the NF 252 may provide notifications at different times and/or in response to different notification conditions. In an example, the NF 251 may request a notification when a certain parameter, as measured by the NF 252, exceeds a first threshold, and the NF 252 may request a notification when the parameter exceeds a second threshold different from the first threshold. In an example, a parameter of interest and/or a corresponding threshold may be indicated in the subscriptions 261, 262.

FIG. 2D illustrates another example of a subscribe-notify interaction. In FIG. 2D, an NF 271 sends a subscription 281 to an NF 272. In response to receipt of subscription 281 and/or a determination that a notification condition has occurred, NF 272 may send a notification 284. The notification 284 may be sent to an NF 273. Unlike the example in FIG. 2C (in which a notification is sent to the subscribing NF), FIG. 2D demonstrates that a subscription and its corresponding notification may be associated with different NFs. For example, NF 271 may subscribe to the service provided by NF 272 on behalf of NF 273.

Figure 3:
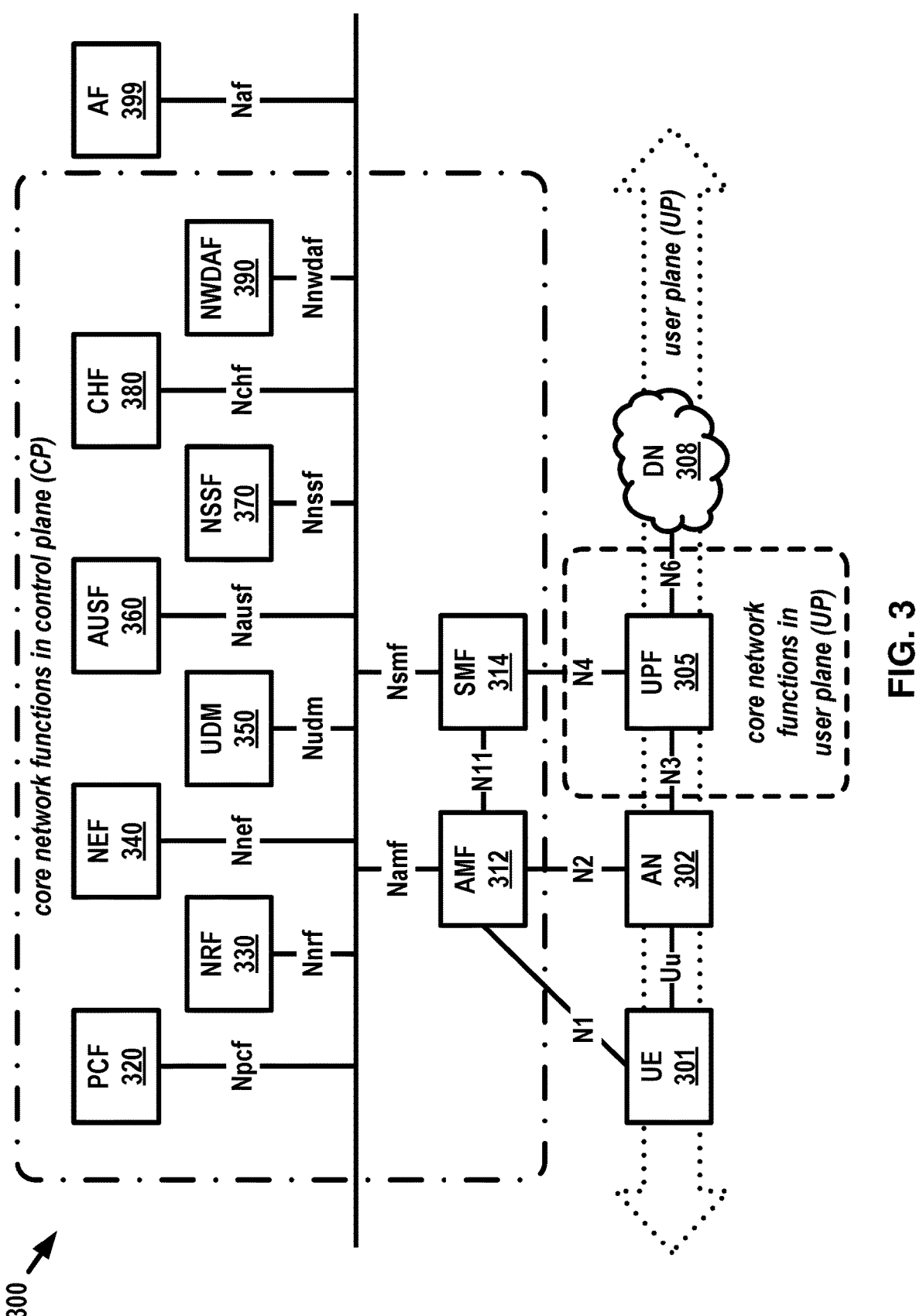
FIG. 3 illustrates an example communication network including core network functions.

FIG. 3 illustrates another example communication network 300 in which embodiments of the present disclosure may be implemented. Communication network 300 includes a user equipment (UE) 301, an access network (AN) 302, and a data network (DN) 308. The remaining elements depicted in FIG. 3 may be included in and/or associated with a core network. Each element of the core network may be referred to as a network function (NF).

The NFs depicted in FIG. 3 include a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and an application function (AF) 399. The UPF 305 may be a user-plane core network function, whereas the NFs 312, 314, and 320-390 may be control-plane core network functions. Although not shown in the example of FIG. 3, the core network may include additional instances of any of the NFs depicted and/or one or more different NF types that provide different services. Other examples of NF type include a gateway mobile location center (GMLC), a location management function (LMF), an operations, administration, and maintenance function (OAM), a public warning system (PWS), a short message service function (SMSF), a unified data repository (UDR), and an unstructured data storage function (UDSF).

Each element depicted in FIG. 3 has an interface with at least one other element. The interface may be a logical connection rather than, for example, a direct physical connection. Any interface may be identified using a reference point representation and/or a service-based representation. In a reference point representation, the letter 'N' is followed by a numeral, indicating an interface between two specific elements. For example, as shown in FIG. 3, AN 302 and UPF 305 interface via 'N3', whereas UPF 305 and DN 308 interface via 'N6'. By contrast, in a service-based representation, the letter 'N' is followed by letters. The letters identify an NF that provides services to the core network. For example, PCF 320 may provide services via interface 'Npcf'. The PCF 320 may provide services to any NF in the core network via 'Npcf'. Accordingly, a service-based representation may correspond to a bundle of reference point representations. For example, the Npcf interface between PCF 320 and the core network generally may correspond to an N7 interface between PCF 320 and SMF 314, an N30 interface between PCF 320 and NEF 340, etc.

The UPF 305 may serve as a gateway for user plane traffic between AN 302 and DN 308. The UE 301 may connect to UPF 305 via a Uu interface and an N3 interface (also described as NG-U interface). The UPF 305 may connect to DN 308 via an N6 interface. The UPF 305 may connect to one or more other UPFs (not shown) via an N9 interface. The UE 301 may be configured to receive services through a protocol data unit (PDU) session, which is a logical connection between UE 301 and DN 308. The UPF 305 (or a plurality of UPFs if desired) may be selected by SMF 314 to handle a particular PDU session between UE 301 and DN 308. The SMF 314 may control the functions of UPF 305 with respect to the PDU session. The SMF 314 may connect to UPF 305 via an N4 interface. The UPF 305 may handle any number of PDU sessions associated with any number of UEs (via any number of ANs). For purposes of handling the one or more PDU sessions, UPF 305 may be controlled by any number of SMFs via any number of corresponding N4 interfaces.

The AMF 312 depicted in FIG. 3 may control UE access to the core network. The UE 301 may register with the network via AMF 312. It may be necessary for UE 301 to register prior to establishing a PDU session. The AMF 312 may manage a registration area of UE 301, enabling the network to track the physical location of UE 301 within the network. For a UE in connected mode, AMF 312 may manage UE mobility, for example, handovers from one AN or portion thereof to another. For a UE in idle mode, AMF 312 may perform registration updates and/or page the UE to transition the UE to connected mode.

The AMF 312 may receive, from UE 301, non-access stratum (NAS) messages transmitted in accordance with NAS protocol. NAS messages relate to communications between UE 301 and the core network. Although NAS messages may be relayed to AMF 312 via AN 302, they may be described as communications via the N1 interface. NAS messages may facilitate UE registration and mobility management, for example, by authenticating, identifying, configuring, and/or managing a connection of UE 301. NAS messages may support session management procedures for maintaining user plane connectivity and quality of service (QoS) of a session between UE 301 and DN 309. If the NAS message involves session management, AMF 312 may send the NAS message to SMF 314. NAS messages may be used to transport messages between UE 301 and other components of the core network (e.g., core network components other than AMF 312 and SMF 314). The AMF 312 may act on a particular NAS message itself, or alternatively, forward the NAS message to an appropriate core network function (e.g., SMF 314, etc.)

The SMF 314 depicted in FIG. 3 may establish, modify, and/or release a PDU session based on messaging received UE 301. The SMF 314 may allocate, manage, and/or assign an IP address to UE 301, for example, upon establishment of a PDU session. There may be multiple SMFs in the network, each of which may be associated with a respective group of wireless devices, base stations, and/or UPFs. A UE with multiple PDU sessions may be associated with a different SMF for each PDU session. As noted above, SMF 314 may select one or more UPFs to handle a PDU session and may control the handling of the PDU session by the selected UPF by providing rules for packet handling (PDR, FAR, QER, etc.). Rules relating to QoS and/or charging for a particular PDU session may be obtained from PCF 320 and provided to UPF 305.

The PCF 320 may provide, to other NFs, services relating to policy rules. The PCF 320 may use subscription data and information about network conditions to determine policy rules and then provide the policy rules to a particular NF which may be responsible for enforcement of those rules. Policy rules may relate to policy control for access and mobility, and may be enforced by the AMF. Policy rules may relate to session management, and may be enforced by the SMF 314. Policy rules may be, for example, network-specific, wireless device-specific, session-specific, or data flow-specific.

The NRF 330 may provide service discovery. The NRF 330 may belong to a particular PLMN. The NRF 330 may maintain NF profiles relating to other NFs in the communication network 300. The NF profile may include, for example, an address, PLMN, and/or type of the NF, a slice identifier, a list of the one or more services provided by the NF, and the authorization required to access the services.

The NEF 340 depicted in FIG. 3 may provide an interface to external domains, permitting external domains to selectively access the control plane of the communication network 300. The external domain may comprise, for example, third-party network functions, application functions, etc. The NEF 340 may act as a proxy between external elements and network functions such as AMF 312, SMF 314, PCF 320, UDM 350, etc. As an example, NEF 340 may determine a location or reachability status of UE 301 based on reports from AMF 312, and provide status information to an external element. As an example, an external element may provide, via NEF 340, information that facilitates the setting of parameters for establishment of a PDU session. The NEF 340 may determine which data and capabilities of the control plane are exposed to the external domain. The NEF 340 may provide secure exposure that authenticates and/or authorizes an external entity to which data or capabilities of the communication network 300 are exposed. The NEF 340 may selectively control the exposure such that the internal architecture of the core network is hidden from the external domain.

The UDM 350 may provide data storage for other NFs. The UDM 350 may permit a consolidated view of network information that may be used to ensure that the most relevant information can be made available to different NFs from a single resource. The UDM 350 may store and/or retrieve information from a unified data repository (UDR). For example, UDM 350 may obtain user subscription data relating to UE 301 from the UDR.

The AUSF 360 may support mutual authentication of UE 301 by the core network and authentication of the core network by UE 301. The AUSF 360 may perform key agreement procedures and provide keying material that can be used to improve security. The NSSF 370 may select one or more network slices to be used by the UE 301. The NSSF 370 may select a slice based on slice selection information. For example, the NSSF 370 may receive Single Network Slice Selection Assistance Information (S-NSSAI) and map the S-NSSAI to a network slice instance identifier (NSI).

The CHF 380 may control billing-related tasks associated with UE 301. For example, UPF 305 may report traffic usage associated with UE 301 to SMF 314. The SMF 314 may collect usage data from UPF 305 and one or more other UPFs. The usage data may indicate how much data is exchanged, what DN the data is exchanged with, a network slice associated with the data, or any other information that may influence billing. The SMF 314 may share the collected usage data with the CHF. The CHF may use the collected usage data to perform billing-related tasks associated with UE 301. The CHF may, depending on the billing status of UE 301, instruct SMF 314 to limit or influence access of UE 301 and/or to provide billing-related notifications to UE 301.

The NWDAF 390 may collect and analyze data from other network functions and offer data analysis services to other network functions. As an example, NWDAF 390 may collect data relating to a load level for a particular network slice instance from UPF 305, AMF 312, and/or SMF 314. Based on the collected data, NWDAF 390 may provide load level data to the PCF 320 and/or NSSF 370, and/or notify the PC 220 and/or NSSF 370 if load level for a slice reaches and/or exceeds a load level threshold.

The AF 399 may be outside the core network, but may interact with the core network to provide information relating to the QoS requirements or traffic routing preferences associated with a particular application. The AF 399 may access the core network based on the exposure constraints imposed by the NEF 340. However, an operator of the core network may consider the AF 399 to be a trusted domain that can access the network directly.

Figure 4A:
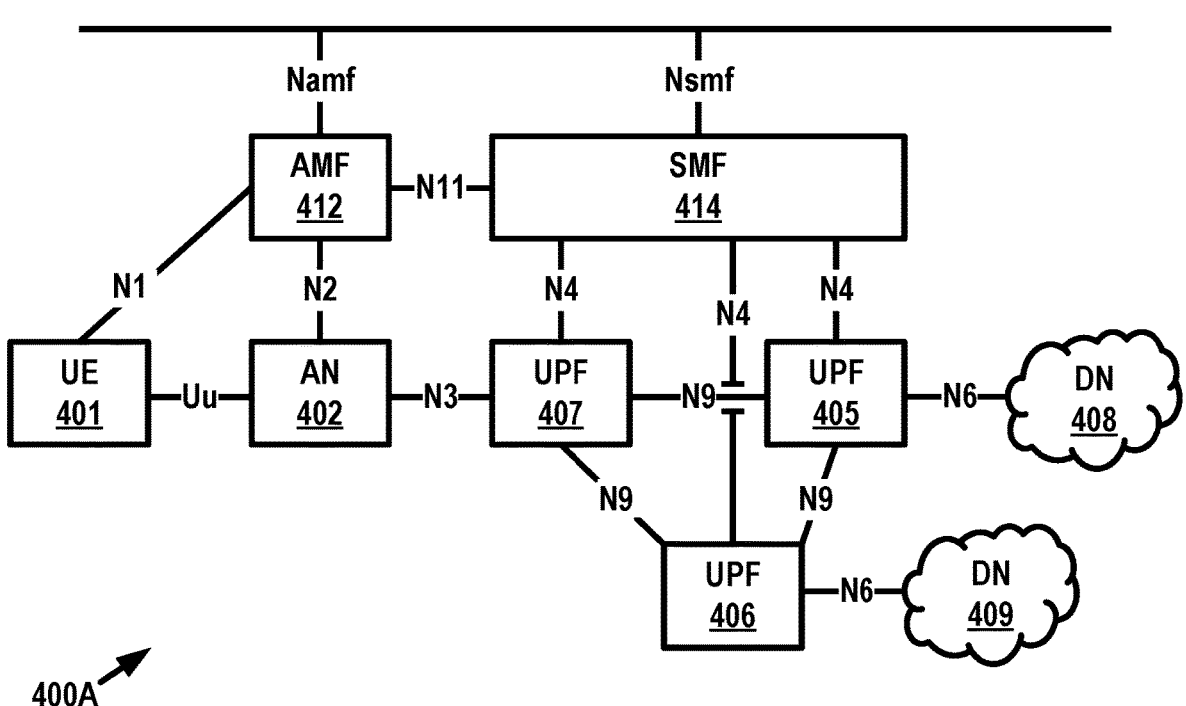
FIG. 4A and FIG. 4B illustrate example of core network architecture with multiple user plane functions and untrusted access.
Figure 4B:
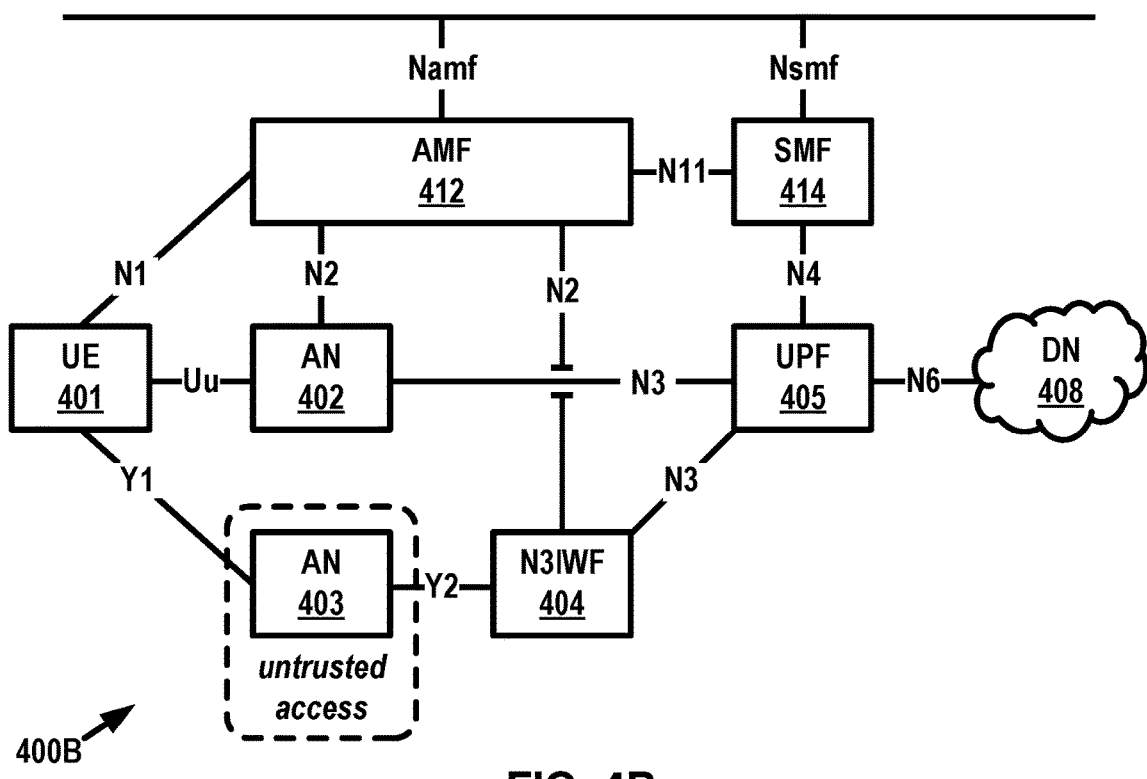
Figure 5:
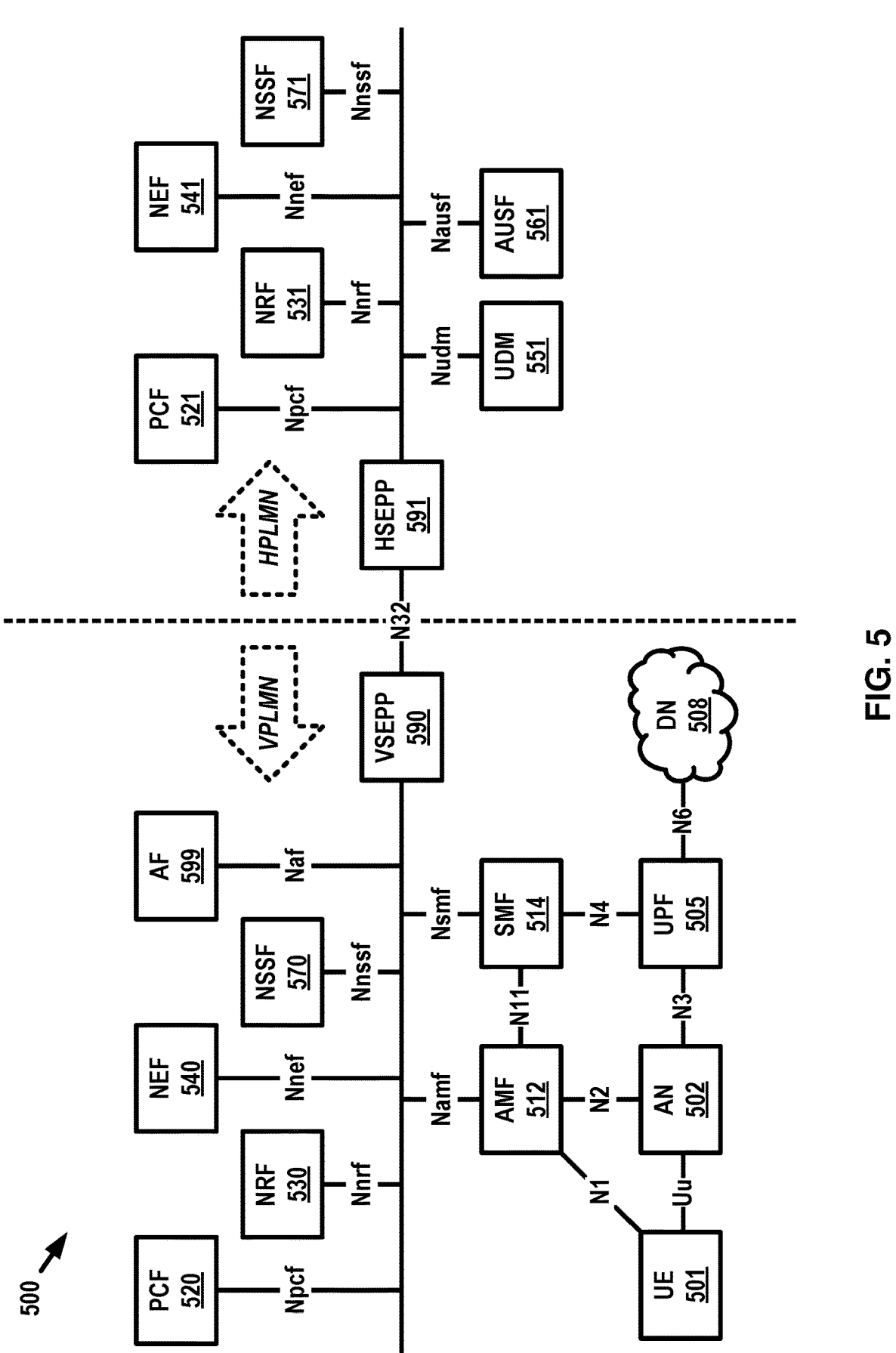
FIG. 5 illustrates an example of a core network architecture for a roaming scenario.

FIGS. 4A, 4B, and 5 illustrate other examples of core network architectures that are analogous in some respects to the core network architecture 300 depicted in FIG. 3. For conciseness, some of the core network elements depicted in FIG. 3 are omitted. Many of the elements depicted in FIGS. 4A, 4B, and 5 are analogous in some respects to elements depicted in FIG. 3. For conciseness, some of the details relating to their functions or operation are omitted.

FIG. 4A illustrates an example of a core network architecture 400A comprising an arrangement of multiple UPFs. Core network architecture 400A includes a UE 401, an AN 402, an AMF 412, and an SMF 414. Unlike previous examples of core network architectures described above, FIG. 4A depicts multiple UPFs, including a UPF 405, a UPF 406, and a UPF 407, and multiple DNs, including a DN 408 and a DN 409. Each of the multiple UPFs 405, 406, 407 may communicate with the SMF 414 via an N4 interface. The DNs 408, 409 communicate with the UPFs 405, 406, respectively, via N6 interfaces. As shown in FIG. 4A, the multiple UPFs 405, 406, 407 may communicate with one another via N9 interfaces.

The UPFs 405, 406, 407 may perform traffic detection, in which the UPFs identify and/or classify packets. Packet identification may be performed based on packet detection rules (PDR) provided by the SMF 414. A PDR may include packet detection information comprising one or more of: a source interface, a UE IP address, core network (CN) tunnel information (e.g., a CN address of an N3/N9 tunnel corresponding to a PDU session), a network instance identifier, a quality of service flow identifier (QFI), a filter set (for example, an IP packet filter set or an ethernet packet filter set), and/or an application identifier.

In addition to indicating how a particular packet is to be detected, a PDR may further indicate rules for handling the packet upon detection thereof. The rules may include, for example, forwarding action rules (FARs), multi-access rules (MARs), usage reporting rules (URRs), QoS enforcement rules (QERs), etc. For example, the PDR may comprise one or more FAR identifiers, MAR identifiers, URR identifiers, and/or QER identifiers. These identifiers may indicate the rules that are prescribed for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface, for example, "access" for downlink or "core" for uplink. If a packet is to be buffered, the FAR may indicate a buffering action rule (BAR). As an example, UPF 405 may perform data buffering of a certain number downlink packets if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark packets belonging to a particular QoS flow with a corresponding QFI. The marking may enable a recipient of the packet to determine a QoS of the packet.

The UPF 405 may provide usage reports to the SMF 414 in accordance with a URR. The URR may indicate one or more triggering conditions for generation and reporting of the usage report, for example, immediate reporting, periodic reporting, a threshold for incoming uplink traffic, or any other suitable triggering condition. The URR may indicate a method for measuring usage of network resources, for example, data volume, duration, and/or event.

As noted above, the DNs 408, 409 may comprise public DNs (e.g., the Internet), private DNs (e.g., private, internal corporate-owned DNs), and/or intra-operator DNs. Each DN may provide an operator service and/or a third-party service. The service provided by a DN may be the Internet, an IP multimedia subsystem (IMS), an augmented or virtual reality network, an edge computing or mobile edge computing (MEC) network, etc. Each DN may be identified using a data network name (DNN). The UE 401 may be configured to establish a first logical connection with DN 408 (a first PDU session), a second logical connection with DN 409 (a second PDU session), or both simultaneously (first and second PDU sessions).

Each PDU session may be associated with at least one UPF configured to operate as a PDU session anchor (PSA, or "anchor"). The anchor may be a UPF that provides an N6 interface with a DN.

In the example of FIG. 4A, UPF 405 may be the anchor for the first PDU session between UE 401 and DN 408, whereas the UPF 406 may be the anchor for the second PDU session between UE 401 and DN 409. The core network may use the anchor to provide service continuity of a particular PDU session (for example, IP address continuity) as UE 401 moves from one access network to another. For example, suppose that UE 401 establishes a PDU session using a data path to the DN 408 using an access network other than AN 402. The data path may include UPF 405 acting as anchor. Suppose further that the UE 401 later moves into the coverage area of the AN 402. In such a scenario, SMF 414 may select a new UPF (UPF 407) to bridge the gap between the newly-entered access network (AN 402) and the anchor UPF (UPF 405). The continuity of the PDU session may be preserved as any number of UPFs are added or removed from the data path. When a UPF is added to a data path, as shown in FIG. 4A, it may be described as an intermediate UPF and/or a cascaded UPF.

As noted above, UPF 406 may be the anchor for the second PDU session between UE 401 and DN 409. Although the anchor for the first and second PDU sessions are associated with different UPFs in FIG. 4A, it will be understood that this is merely an example. It will also be understood that multiple PDU sessions with a single DN may correspond to any number of anchors. When there are multiple UPFs, a UPF at the branching point (UPF 407 in FIG. 4) may operate as an uplink classifier (UL-CL). The UL-CL may divert uplink user plane traffic to different UPFs.

The SMF 414 may allocate, manage, and/or assign an IP address to UE 401, for example, upon establishment of a PDU session. The SMF 414 may maintain an internal pool of IP addresses to be assigned. The SMF 414 may, if necessary, assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of UE 401 may be maintained (and the same anchor UPF may be used) as the wireless device moves within the network. In SSC mode 2, the IP address of UE 401 changes as UE 401 moves within the network (e.g., the old IP address and UPF may be abandoned and a new IP address and anchor UPF may be established). In SSC mode 3, it may be possible to maintain an old IP address (similar to SSC mode 1) temporarily while establishing a new IP address (similar to SSC mode 2), thus combining features of SSC modes 1 and 2. Applications that are sensitive to IP address changes may operate in accordance with SSC mode 1.

UPF selection may be controlled by SMF 414. For example, upon establishment and/or modification of a PDU session between UE 401 and DN 408, SMF 414 may select UPF 405 as the anchor for the PDU session and/or UPF 407 as an intermediate UPF. Criteria for UPF selection include path efficiency and/or speed between AN 402 and DN 408. The reliability, load status, location, slice support and/or other capabilities of candidate UPFs may also be considered.

FIG. 4B illustrates an example of a core network architecture 400B that accommodates untrusted access. Similar to FIG. 4A, UE 401 as depicted in FIG. 4B connects to DN 408 via AN 402 and UPF 405. The AN 402 and UPF 405 constitute trusted (e.g., 3GPP) access to the DN 408. By contrast, UE 401 may also access DN 408 using an untrusted access network, AN 403, and a non-3GPP interworking function (N3IWF) 404.

The AN 403 may be, for example, a wireless land area network (WLAN) operating in accordance with the IEEE 802.11 standard. The UE 401 may connect to AN 403, via an interface Y1, in whatever manner is prescribed for AN 403. The connection to AN 403 may or may not involve authentication. The UE 401 may obtain an IP address from AN 403. The UE 401 may determine to connect to core network 400B and select untrusted access for that purpose.

The AN 403 may communicate with N3IWF 404 via a Y2 interface. After selecting untrusted access, the UE 401 may provide N3IWF 404 with sufficient information to select an AMF. The selected AMF may be, for example, the same AMF that is used by UE 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA) and may remain the anchor for the PDU session even as UE 401 shifts between trusted access and untrusted access.

FIG. 5 illustrates an example of a core network architecture 500 in which a UE 501 is in a roaming scenario. In a roaming scenario, UE 501 is a subscriber of a first PLMN (a home PLMN, or HPLMN) but attaches to a second PLMN (a visited PLMN, or VPLMN). Core network architecture 500 includes UE 501, an AN 502, a UPF 505, and a DN 508. The AN 502 and UPF 505 may be associated with a VPLMN. The VPLMN may manage the AN 502 and UPF 505 using core network elements associated with the VPLMN, including an AMF 512, an SMF 514, a PCF 520, an NRF 530, an NEF 540, and an NSSF 570. An AF 599 may be adjacent the core network of the VPLMN.

The UE 501 may not be a subscriber of the VPLMN. The AMF 512 may authorize UE 501 to access the network based on, for example, roaming restrictions that apply to UE 501. In order to obtain network services provided by the VPLMN, it may be necessary for the core network of the VPLMN to interact with core network elements of a HPLMN of UE 501, in particular, a PCF 521, an NRF 531, an NEF 541, a UDM 551, and/or an AUSF 561. The VPLMN and HPLMN may communicate using an N32 interface connecting respective security edge protection proxies (SEPPs). In FIG. 5, the respective SEPPs are depicted as a VSEPP 590 and an HSEPP 591.

The VSEPP 590 and the HSEPP 591 communicate via an N32 interface for defined purposes while concealing information about each PLMN from the other. The SEPPs may apply roaming policies based on communications via the N32 interface. The PCF 520 and PCF 521 may communicate via the SEPPs to exchange policy-related signaling. The NRF 530 and NRF 531 may communicate via the SEPPs to enable service discovery of NFs in the respective PLMNs. The VPLMN and HPLMN may independently maintain NEF 540 and NEF 541. The NSSF 570 and NSSF 571 may communicate via the SEPPs to coordinate slice selection for UE 501. The HPLMN may handle all authentication and subscription related signaling. For example, when the UE 501 registers or requests service via the VPLMN, the VPLMN may authenticate UE 501 and/or obtain subscription data of UE 501 by accessing, via the SEPPs, the UDM 551 and AUSF 561 of the HPLMN.

The core network architecture 500 depicted in FIG. 5 may be referred to as a local breakout configuration, in which UE 501 accesses DN 508 using one or more UPFs of the VPLMN (i.e., UPF 505). However, other configurations are possible. For example, in a home-routed configuration (not shown in FIG. 5), UE 501 may access a DN using one or more UPFs of the HPLMN. In the home-routed configuration, an N9 interface may run parallel to the N32 interface, crossing the frontier between the VPLMN and the HPLMN to carry user plane data. One or more SMFs of the respective PLMNs may communicate via the N32 interface to coordinate session management for UE 501. The SMFs may control their respective UPFs on either side of the frontier.

Figure 6:
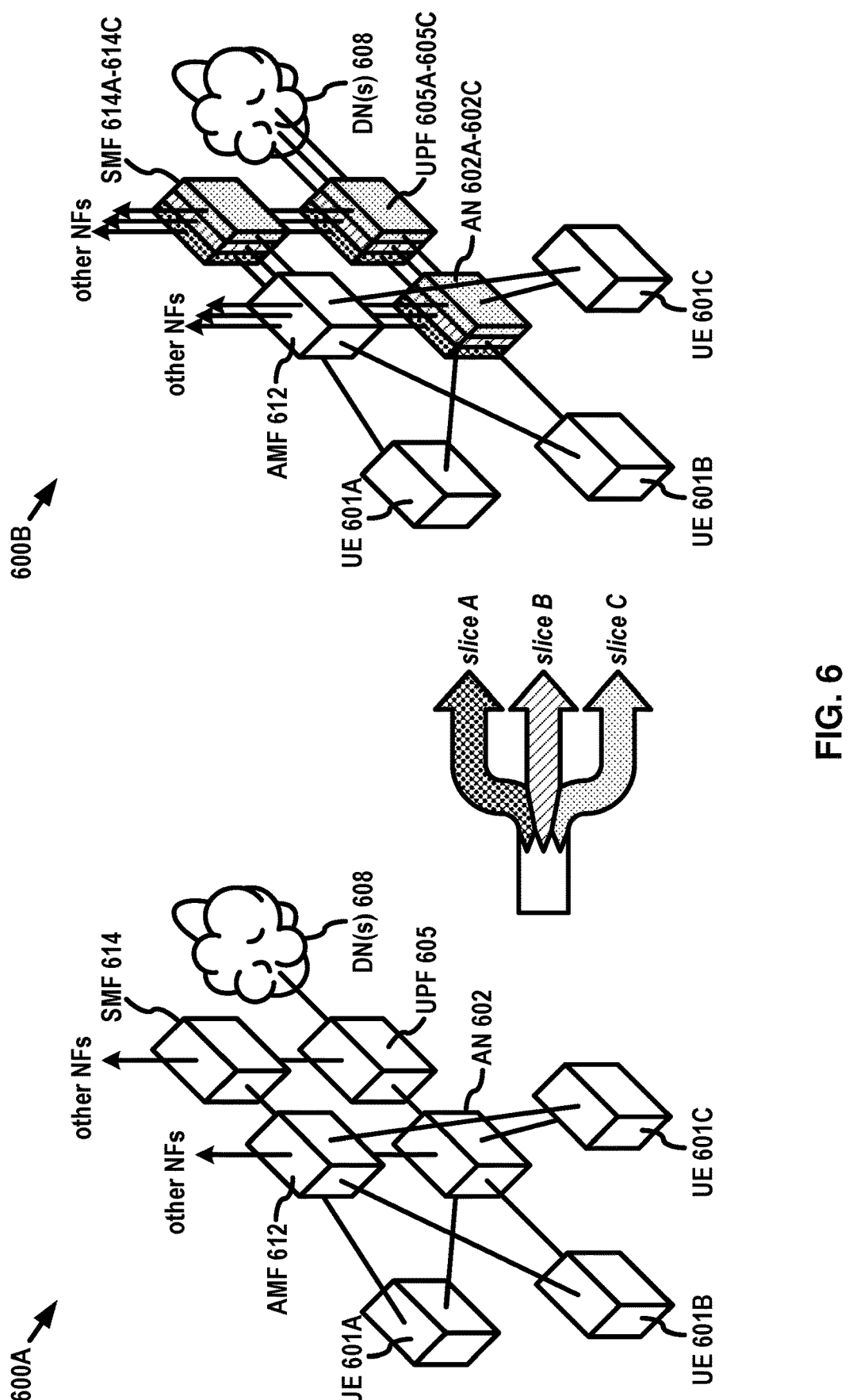
FIG. 6 illustrates an example of network slicing.

FIG. 6 illustrates an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A illustrates an un-sliced physical network corresponding to a single logical network. The network architecture 600A comprises a user plane wherein UEs 601A, 601B, 601C (collectively, UEs 601) have a physical and logical connection to a DN 608 via an AN 602 and a UPF 605. The network architecture 600A comprises a control plane wherein an AMF 612 and a SMF 614 control various aspects of the user plane.

The network architecture 600A may have a specific set of characteristics (e.g., relating to maximum bit rate, reliability, latency, bandwidth usage, power consumption, etc.). This set of characteristics may be affected by the nature of the network elements themselves (e.g., processing power, availability of free memory, proximity to other network elements, etc.) or the management thereof (e.g., optimized to maximize bit rate or reliability, reduce latency or power bandwidth usage, etc.). The characteristics of network architecture 600A may change over time, for example, by upgrading equipment or by modifying procedures to target a particular characteristic. However, at any given time, network architecture 600A will have a single set of characteristics that may or may not be optimized for a particular use case. For example, UEs 601A, 601B, 601C may have different requirements, but network architecture 600A can only be optimized for one of the three.

Network architecture 600B is an example of a sliced physical network divided into multiple logical networks. In FIG. 6, the physical network is divided into three logical networks, referred to as slice A, slice B, and slice C. For example, UE 601A may be served by AN 602A, UPF 605A, AMF 612, and SMF 614A. UE 601B may be served by AN 602B, UPF 605B, AMF 612, and SMF 614B. UE 601C may be served by AN 602C, UPF 605C, AMF 612, and SMF 614C. Although the respective UEs 601 communicate with different network elements from a logical perspective, these network elements may be deployed by a network operator using the same physical network elements.

Each network slice may be tailored to network services having different sets of characteristics. For example, slice A may correspond to enhanced mobile broadband (eMBB) service. Mobile broadband may refer to internet access by mobile users, commonly associated with smartphones. Slice B may correspond to ultra-reliable low-latency communication (URLLC), which focuses on reliability and speed. Relative to eMBB, URLLC may improve the feasibility of use cases such as autonomous driving and telesurgery. Slice C may correspond to massive machine type communication (mMTC), which focuses on low-power services delivered to a large number of users. For example, slice C may be optimized for a dense network of battery-powered sensors that provide small amounts of data at regular intervals. Many mMTC use cases would be prohibitively expensive if they operated using an eMBB or URLLC network.

If the service requirements for one of the UEs 601 changes, then the network slice serving that UE can be updated to provide better service. Moreover, the set of network characteristics corresponding to eMBB, URLLC, and mMTC may be varied, such that differentiated species of eMBB, URLLC, and mMTC are provided. Alternatively, network operators may provide entirely new services in response to, for example, customer demand.

In FIG. 6, each of the UEs 601 has its own network slice. However, it will be understood that a single slice may serve any number of UEs and a single UE may operate using any number of slices. Moreover, in the example network architecture 600B, the AN 602, UPF 605 and SMF 614 are separated into three separate slices, whereas the AMF 612 is unsliced. However, it will be understood that a network operator may deploy any architecture that selectively utilizes any mix of sliced and unsliced network elements, with different network elements divided into different numbers of slices. Although FIG. 6 only depicts three core network functions, it will be understood that other core network functions may be sliced as well. A PLMN that supports multiple network slices may maintain a separate network repository function (NFR) for each slice, enabling other NFs to discover network services associated with that slice.

Network slice selection may be controlled by an AMF, or alternatively, by a separate network slice selection function (NSSF). For example, a network operator may define and implement distinct network slice instances (NSIs). Each NSI may be associated with single network slice selection assistance information (S-NSSAI). The S-NSSAI may include a particular slice/service type (SST) indicator (indicating eMBB, URLLC, mMTC, etc.), as an example, a particular tracking area may be associated with one or more configured S-NSSAIs. UEs may identify one or more requested and/or subscribed S-NSSAIs (e.g., during registration). The network may indicate to the UE one or more allowed and/or rejected S-NSSAIs.

The S-NSSAI may further include a slice differentiator (SD) to distinguish between different tenants of a particular slice and/or service type. For example, a tenant may be a customer (e.g., vehicle manufacture, service provider, etc.) of a network operator that obtains (for example, purchases) guaranteed network resources and/or specific policies for handling its subscribers. The network operator may configure different slices and/or slice types, and use the SD to determine which tenant is associated with a particular slice.

FIG. 7A, FIG. 7B, and FIG. 7C illustrate a user plane (UP) protocol stack, a control plane (CP) protocol stack, and services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a physical layer, which is concerned with the physical infrastructure used for transfer of signals (for example, cables, fiber optics, and/or radio frequency transceivers). In New Radio (NR), layer 1 may comprise a physical layer (PHY). Layer 2 may correspond to a data link layer. Layer 2 may be concerned with packaging of data (into, e.g., data frames) for transfer, between nodes of the network, using the physical infrastructure of layer 1. In NR, layer 2 may comprise a media access control layer (MAC), a radio link control layer (RLC), a packet data convergence layer (PDCP), and a service data application protocol layer (SDAP).

Layer 3 may correspond to a network layer. Layer 3 may be concerned with routing of the data which has been packaged in layer 2. Layer 3 may handle prioritization of data and traffic avoidance. In NR, layer 3 may comprise a radio resource control layer (RRC) and a non-access stratum layer (NAS). Layers 4 through 7 may correspond to a transport layer, a session layer, a presentation layer, and an application layer. The application layer interacts with an end user to provide data associated with an application. In an example, an end user implementing the application may generate data associated with the application and initiate sending of that information to a targeted data network (e.g., the Internet, an application server, etc.). Starting at the application layer, each layer in the OSI model may manipulate and/or repackage the information and deliver it to a lower layer. At the lowest layer, the manipulated and/or repackaged information may be exchanged via physical infrastructure (for example, electrically, optically, and/or electromagnetically). As it approaches the targeted data network, the information will be unpackaged and provided to higher and higher layers, until it once again reaches the application layer in a form that is usable by the targeted data network (e.g., the same form in which it was provided by the end user). To respond to the end user, the data network may perform this procedure in reverse.

FIG. 7A illustrates a user plane protocol stack. The user plane protocol stack may be a new radio (NR) protocol stack for a Uu interface between a UE 701 and a gNB 702. In layer 1 of the UP protocol stack, the UE 701 may implement PHY 731 and the gNB 702 may implement PHY 732. In layer 2 of the UP protocol stack, the UE 701 may implement MAC 741, RLC 751, PDCP 761, and SDAP 771. The gNB 702 may implement MAC 742, RLC 752, PDCP 762, and SDAP 772.

FIG. 7B illustrates a control plane protocol stack. The control plane protocol stack may be an NR protocol stack for the Uu interface between the UE 701 and the gNB 702 and/or an N1 interface between the UE 701 and an AMF 712. In layer 1 of the CP protocol stack, the UE 701 may implement PHY 731 and the gNB 702 may implement PHY 732. In layer 2 of the CP protocol stack, the UE 701 may implement MAC 741, RLC 751, PDCP 761, RRC 781, and NAS 791. The gNB 702 may implement MAC 742, RLC 752, PDCP 762, and RRC 782. The AMF 712 may implement NAS 792.

The NAS may be concerned with the non-access stratum, in particular, communication between the UE 701 and the core network (e.g., the AMF 712). Lower layers may be concerned with the access stratum, for example, communication between the UE 701 and the gNB 702. Messages sent between the UE 701 and the core network may be referred to as NAS messages. In an example, a NAS message may be relayed by the gNB 702, but the content of the NAS message (e.g., information elements of the NAS message) may not be visible to the gNB 702.

FIG. 7C illustrates an example of services provided between protocol layers of the NR user plane protocol stack illustrated in FIG. 7A. The UE 701 may receive services through a PDU session, which may be a logical connection between the UE 701 and a data network (DN). The UE 701 and the DN may exchange data packets associated with the PDU session. The PDU session may comprise one or more quality of service (QoS) flows. SDAP 771 and SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the gNB 702, and the UE 701 may be notified of the mapping (e.g., based on control signaling and/or reflective mapping). For reflective mapping, the SDAP 772 of the gNB 220 may mark downlink packets with a QoS flow indicator (QFI) and deliver the downlink packets to the UE 701. The UE 701 may determine the mapping based on the QFI of the downlink packets.

PDCP 761 and PDCP 762 may perform header compression and/or decompression. Header compression may reduce the amount of data transmitted over the physical layer. The PDCP 761 and PDCP 762 may perform ciphering and/or deciphering. Ciphering may reduce unauthorized decoding of data transmitted over the physical layer (e.g., intercepted on an air interface), and protect data integrity (e.g., to ensure control messages originate from intended sources). The PDCP 761 and PDCP 762 may perform retransmissions of undelivered packets, in-sequence delivery and reordering of packets, duplication of packets, and/or identification and removal of duplicate packets. In a dual connectivity scenario, PDCP 761 and PDCP 762 may perform mapping between a split radio bearer and RLC channels.

RLC 751 and RLC 752 may perform segmentation, retransmission through Automatic Repeat Request (ARQ). The RLC 751 and RLC 752 may perform removal of duplicate data units received from MAC 741 and MAC 742, respectively. The RLCs 213 and 223 may provide RLC channels as a service to PDCPs 214 and 224, respectively.

MAC 741 and MAC 742 may perform multiplexing and/or demultiplexing of logical channels. MAC 741 and MAC 742 may map logical channels to transport channels. In an example, UE 701 may, in MAC 741, multiplex data units of one or more logical channels into a transport block. The UE 701 may transmit the transport block to the gNB 702 using PHY 731. The gNB 702 may receive the transport block using PHY 732 and demultiplex data units of the transport blocks back into logical channels. MAC 741 and MAC 742 may perform error correction through Hybrid Automatic Repeat Request (HARQ), logical channel prioritization, and/or padding.

PHY 731 and PHY 732 may perform mapping of transport channels to physical channels. PHY 731 and PHY 732 may perform digital and analog signal processing functions (e.g., coding/decoding and modulation/demodulation) for sending and receiving information (e.g., transmission via an air interface). PHY 731 and PHY 732 may perform multi-antenna mapping.

Figure 8:
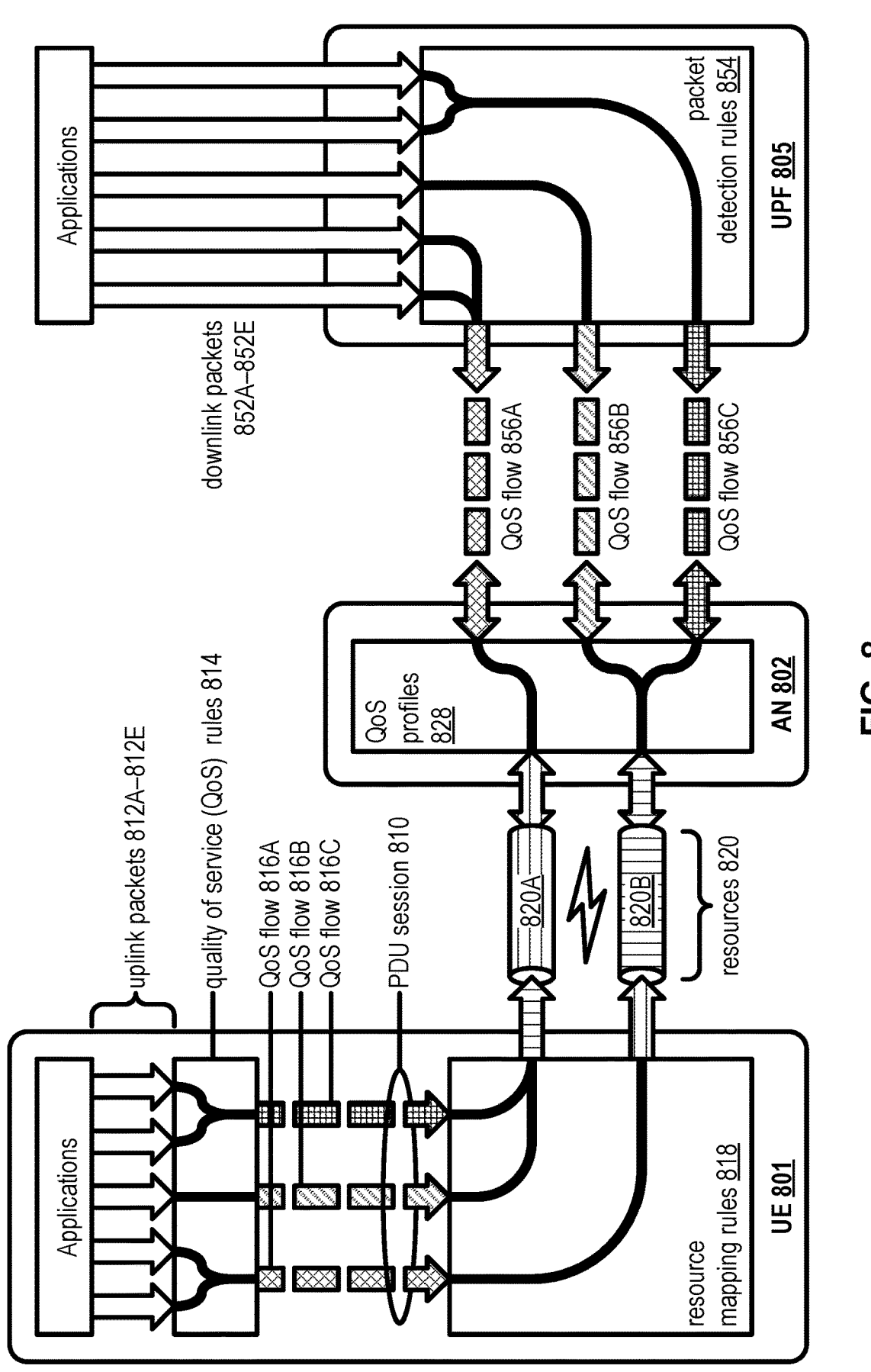
FIG. 8 illustrates an example of a quality of service model for data exchange.

FIG. 8 illustrates an example of a quality of service (QoS) model for differentiated data exchange. In the QoS model of FIG. 8, there are a UE 801, a AN 802, and a UPF 805. The QoS model facilitates prioritization of certain packet or protocol data units (PDUs), also referred to as packets. For example, higher-priority packets may be exchanged faster and/or more reliably than lower-priority packets. The network may devote more resources to exchange of high-QoS packets.

In the example of FIG. 8, a PDU session 810 is established between UE 801 and UPF 805. The PDU session 810 may be a logical connection enabling the UE 801 to exchange data with a particular data network (for example, the Internet). The UE 801 may request establishment of the PDU session 810. At the time that the PDU session 810 is established, the UE 801 may, for example, identify the targeted data network based on its data network name (DNN). The PDU session 810 may be managed, for example, by a session management function (SMF, not shown). In order to facilitate exchange of data associated with the PDU session 810, between the UE 801 and the data network, the SMF may select the UPF 805 (and optionally, one or more other UPFs, not shown).

One or more applications associated with UE 801 may generate uplink packets 812A-812E associated with the PDU session 810. In order to work within the QoS model, UE 801 may apply QoS rules 814 to uplink packets 812A-812E. The QoS rules 814 may be associated with PDU session 810 and may be determined and/or provided to the UE 801 when PDU session 810 is established and/or modified. Based on QoS rules 814, UE 801 may classify uplink packets 812A-812E, map each of the uplink packets 812A-812E to a QoS flow, and/or mark uplink packets 812A-812E with a QoS flow indicator (QFI). As a packet travels through the network, and potentially mixes with other packets from other UEs having potentially different priorities, the QFI indicates how the packet should be handled in accordance with the QoS model. In the present illustration, uplink packets 812A, 812B are mapped to QoS flow 816A, uplink packet 812C is mapped to QoS flow 816B, and the remaining packets are mapped to QoS flow 816C.

The QoS flows may be the finest granularity of QoS differentiation in a PDU session. In the figure, three QoS flows 816A-816C are illustrated. However, it will be understood that there may be any number of QoS flows. Some QoS flows may be associated with a guaranteed bit rate (GBR QoS flows) and others may have bit rates that are not guaranteed (non-GBR QoS flows). QoS flows may also be subject to per-UE and per-session aggregate bit rates. One of the QoS flows may be a default QoS flow. The QoS flows may have different priorities. For example, QoS flow 816A may have a higher priority than QoS flow 816B, which may have a higher priority than QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may also be subject to per-UE and per-session aggregate bit rates.

In order to work within the QoS model, UE 801 may apply resource mapping rules 818 to the QoS flows 816A-816C. The air interface between UE 801 and AN 802 may be associated with resources 820. In the present illustration, QoS flow 816A is mapped to resource 820A, whereas QoS flows 816B, 816C are mapped to resource 820B. The resource mapping rules 818 may be provided by the AN 802. In order to meet QoS requirements, the resource mapping rules 818 may designate more resources for relatively high-priority QoS flows. With more resources, a high-priority QoS flow such as QoS flow 816A may be more likely to obtain the high flow bit rate, low packet delay budget, or other characteristic associated with QoS rules 814. The resources 820 may comprise, for example, radio bearers. The radio bearers (e.g., data radio bearers) may be established between the UE 801 and the AN 802. The radio bearers in 5G, between the UE 801 and the AN 802, may be distinct from bearers in LTE, for example, Evolved Packet System (EPS) bearers between a UE and a packet data network gateway (PGW), S1 bearers between an eNB and a serving gateway (SGW), and/or an S5/S8 bearer between an SGW and a PGW.

Once a packet associated with a particular QoS flow is received at AN 802 via resource 820A or resource 820B, AN 802 may separate packets into respective QoS flows 856A-856C based on QoS profiles 828. The QoS profiles 828 may be received from an SMF. Each QoS profile may correspond to a QFI, for example, the QFI marked on the uplink packets 812A-812E. Each QoS profile may include QoS parameters such as 5G QoS identifier (5QI) and an allocation and retention priority (ARP). The QoS profile for non-GBR QoS flows may further include additional QoS parameters such as a reflective QoS attribute (RQA). The QoS profile for GBR QoS flows may further include additional QoS parameters such as a guaranteed flow bit rate (GFBR), a maximum flow bit rate (MFBR), and/or a maximum packet loss rate. The 5QI may be a standardized 5QI which have one-to-one mapping to a standardized combination of 5G QoS characteristics per well-known services. The 5QI may be a dynamically assigned 5QI which the standardized 5QI values are not defined. The 5QI may represent 5G QoS characteristics. The 5QI may comprise a resource type, a default priority level, a packet delay budget (PDB), a packet error rate (PER), a maximum data burst volume, and/or an averaging window. The resource type may indicate a non-GBR QoS flow, a GBR QoS flow or a delay-critical GBR QoS flow. The averaging window may represent a duration over which the GFBR and/or MFBR is calculated. ARP may be a priority level comprising pre-emption capability and a pre-emption vulnerability. Based on the ARP, the AN 802 may apply admission control for the QoS flows in a case of resource limitations.

The AN 802 may select one or more N3 tunnels 850 for transmission of the QoS flows 856A-856C. After the packets are divided into QoS flows 856A-856C, the packet may be sent to UPF 805 (e.g., towards a DN) via the selected one or more N3 tunnels 850. The UPF 805 may verify that the QFIs of the uplink packets 812A-812E are aligned with the QoS rules 814 provided to the UE 801. The UPF 805 may measure and/or count packets and/or provide packet metrics to, for example, a PCF.

The figure also illustrates a process for downlink. In particular, one or more applications may generate downlink packets 852A-852E. The UPF 805 may receive downlink packets 852A-852E from one or more DNs and/or one or more other UPFs. As per the QoS model, UPF 805 may apply packet detection rules (PDRs) 854 to downlink packets 852A-852E. Based on PDRs 854, UPF 805 may map packets 852A-852E into QoS flows. In the present illustration, downlink packets 852A, 852B are mapped to QoS flow 856A, downlink packet 852C is mapped to QoS flow 856B, and the remaining packets are mapped to QoS flow 856C.

The QoS flows 856A-856C may be sent to AN 802. The AN 802 may apply resource mapping rules to the QoS flows 856A-856C. In the present illustration, QoS flow 856A is mapped to resource 820A, whereas QoS flows 856B, 856C are mapped to resource 820B. In order to meet QoS requirements, the resource mapping rules may designate more resources to high-priority QoS flows.

FIGS. 9A-9D illustrate example states and state transitions of a wireless device (e.g., a UE). At any given time, the wireless device may have a radio resource control (RRC) state, a registration management (RM) state, and a connection management (CM) state.

Figure 9A:
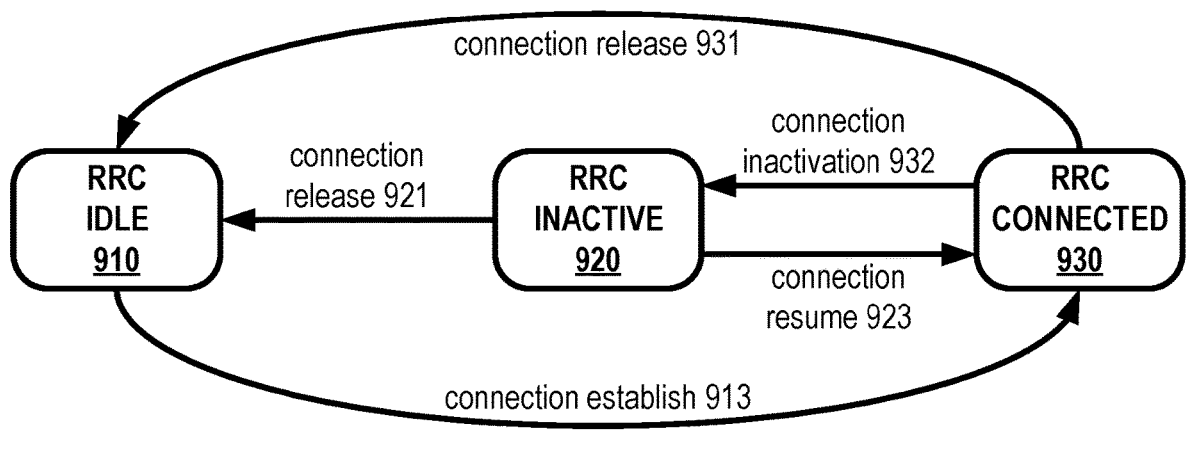
FIG. 9A, FIG. 9B, FIG. 9C, and FIG. 9D illustrate example states and state transitions of a wireless device.

FIG. 9A is an example diagram showing RRC state transitions of a wireless device (e.g., a UE). The UE may be in one of three RRC states: RRC idle 910, (e.g., RRC_IDLE), RRC inactive 920 (e.g., RRC_INACTIVE), or RRC connected 930 (e.g., RRC_CONNECTED). The UE may implement different RAN-related control-plane procedures depending on its RRC state. Other elements of the network, for example, a base station, may track the RRC state of one or more UEs and implement RAN-related control-plane procedures appropriate to the RRC state of each.

In RRC connected 930, it may be possible for the UE to exchange data with the network (for example, the base station). The parameters necessary for exchange of data may be established and known to both the UE and the network. The parameters may be referred to and/or included in an RRC context of the UE (sometimes referred to as a UE context). These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. The base station with which the UE is connected may store the RRC context of the UE.

While in RRC connected 930, mobility of the UE may be managed by the access network, whereas the UE itself may manage mobility while in RRC idle 910 and/or RRC inactive 920. While in RRC connected 930, the UE may manage mobility by measuring signal levels (e.g., reference signal levels) from a serving cell and neighboring cells and reporting these measurements to the base station currently serving the UE. The network may initiate handover based on the reported measurements. The RRC state may transition from RRC connected 930 to RRC idle 910 through a connection release procedure 930 or to RRC inactive 920 through a connection inactivation procedure 932.

In RRC idle 910, an RRC context may not be established for the UE. In RRC idle 910, the UE may not have an RRC connection with a base station. While in RRC idle 910, the UE may be in a sleep state for a majority of the time (e.g., to conserve battery power). The UE may wake up periodically (e.g., once in every discontinuous reception cycle) to monitor for paging messages from the access network. Mobility of the UE may be managed by the UE through a procedure known as cell reselection. The RRC state may transition from RRC idle 910 to RRC connected 930 through a connection establishment procedure 913, which may involve a random access procedure, as discussed in greater detail below.

In RRC inactive 920, the RRC context previously established is maintained in the UE and the base station. This may allow for a fast transition to RRC connected 930 with reduced signaling overhead as compared to the transition from RRC idle 910 to RRC connected 930. The RRC state may transition to RRC connected 930 through a connection resume procedure 923. The RRC state may transition to RRC idle 910 though a connection release procedure 921 that may be the same as or similar to connection release procedure 931.

An RRC state may be associated with a mobility management mechanism. In RRC idle 910 and RRC inactive 920, mobility may be managed by the UE through cell reselection. The purpose of mobility management in RRC idle 910 and/or RRC inactive 920 is to allow the network to be able to notify the UE of an event via a paging message without having to broadcast the paging message over the entire mobile communications network. The mobility management mechanism used in RRC idle 910 and/or RRC inactive 920 may allow the network to track the UE on a cell-group level so that the paging message may be broadcast over the cells of the cell group that the UE currently resides within instead of the entire communication network. Tracking may be based on different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 920 state, the UE may be assigned a RAN notification area. A RAN notification area may comprise one or more cell identities, a list of RAIs, and/or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 920.

Figure 9B:
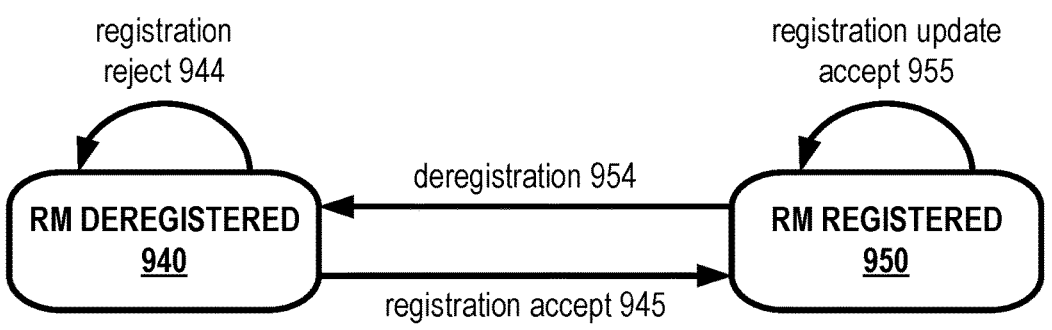

FIG. 9B is an example diagram showing registration management (RM) state transitions of a wireless device (e.g., a UE). The states are RM deregistered 940, (e.g., RM-DEREGISTERED) and RM registered 950 (e.g., RM-REGISTERED).

In RM deregistered 940, the UE is not registered with the network, and the UE is not reachable by the network. In order to be reachable by the network, the UE must perform an initial registration. As an example, the UE may register with an AMF of the network. If registration is rejected (registration reject 944), then the UE remains in RM deregistered 940. If registration is accepted (registration accept 945), then the UE transitions to RM registered 950. While the UE is RM registered 950, the network may store, keep, and/or maintain a UE context for the UE. The UE context may be referred to as wireless device context. The UE context corresponding to network registration (maintained by the core network) may be different from the RRC context corresponding to RRC state (maintained by an access network, e.g., a base station). The UE context may comprise a UE identifier and a record of various information relating to the UE, for example, UE capability information, policy information for access and mobility management of the UE, lists of allowed or established slices or PDU sessions, and/or a registration area of the UE (i.e., a list of tracking areas covering the geographical area where the wireless device is likely to be found).

While the UE is RM registered 950, the network may store the UE context of the UE, and if necessary use the UE context to reach the UE. Moreover, some services may not be provided by the network unless the UE is registered. The UE may update its UE context while remaining in RM registered 950 (registration update accept 955). For example, if the UE leaves one tracking area and enters another tracking area, the UE may provide a tracking area identifier to the network. The network may deregister the UE, or the UE may deregister itself (deregistration 954). For example, the network may automatically deregister the wireless device if the wireless device is inactive for a certain amount of time. Upon deregistration, the UE may transition to RM deregistered 940.

Figure 9C:
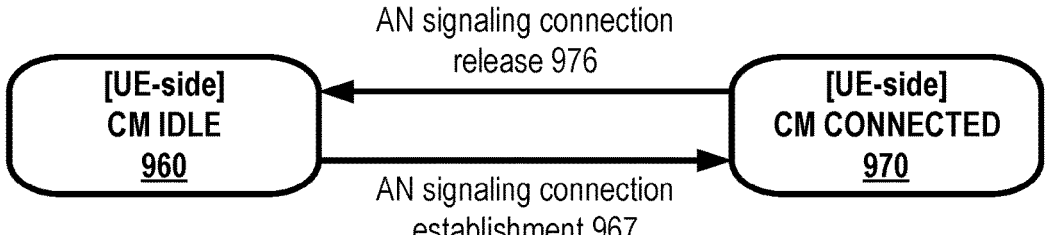

FIG. 9C is an example diagram showing connection management (CM) state transitions of a wireless device (e.g., a UE), shown from a perspective of the wireless device. The UE may be in CM idle 960 (e.g., CM-IDLE) or CM connected 970 (e.g., CM-CONNECTED).

In CM idle 960, the UE does not have a non access stratum (NAS) signaling connection with the network. As a result, the UE can not communicate with core network functions. The UE may transition to CM connected 970 by establishing an AN signaling connection (AN signaling connection establishment 967). This transition may be initiated by sending an initial NAS message. The initial NAS message may be a registration request (e.g., if the UE is RM deregistered 940) or a service request (e.g., if the UE is RM registered 950). If the UE is RM registered 950, then the UE may initiate the AN signaling connection establishment by sending a service request, or the network may send a page, thereby triggering the UE to send the service request.

In CM connected 970, the UE can communicate with core network functions using NAS signaling. As an example, the UE may exchange NAS signaling with an AMF for registration management purposes, service request procedures, and/or authentication procedures. As another example, the UE may exchange NAS signaling, with an SMF, to establish and/or modify a PDU session. The network may disconnect the UE, or the UE may disconnect itself (AN signaling connection release 976). For example, if the UE transitions to RM deregistered 940, then the UE may also transition to CM idle 960. When the UE transitions to CM idle 960, the network may deactivate a user plane connection of a PDU session of the UE.

Figure 9D:
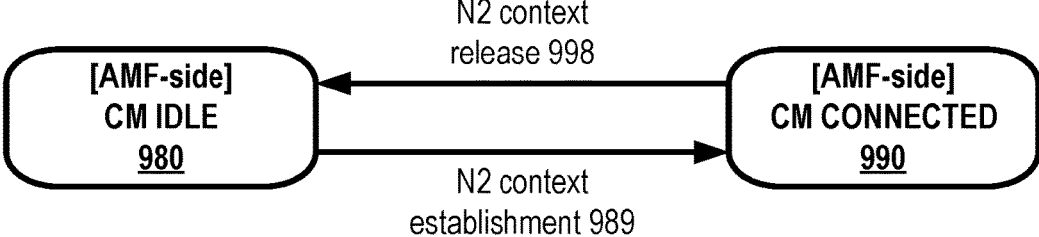

FIG. 9D is an example diagram showing CM state transitions of the wireless device (e.g., a UE), shown from a network perspective (e.g., an AMF). The CM state of the UE, as tracked by the AMF, may be in CM idle 980 (e.g., CM-IDLE) or CM connected 990 (e.g., CM-CONNECTED). When the UE transitions from CM idle 980 to CM connected 990, the AMF many establish an N2 context of the UE (N2 context establishment 989). When the UE transitions from CM connected 990 to CM idle 980, the AMF many release the N2 context of the UE (N2 context release 998).

Figure 10:
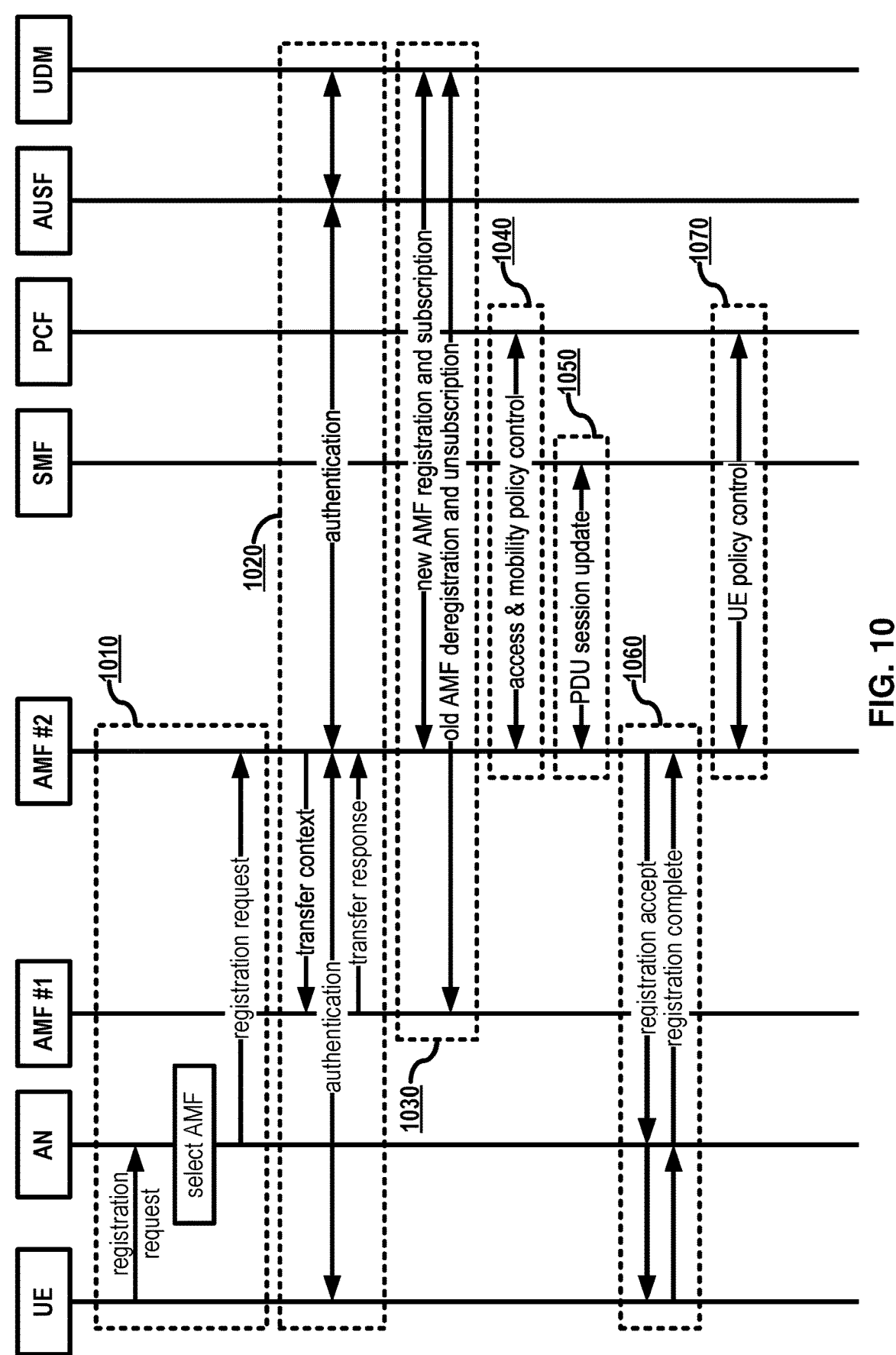
FIG. 10 illustrates an example of a registration procedure for a wireless device.
Figure 11:
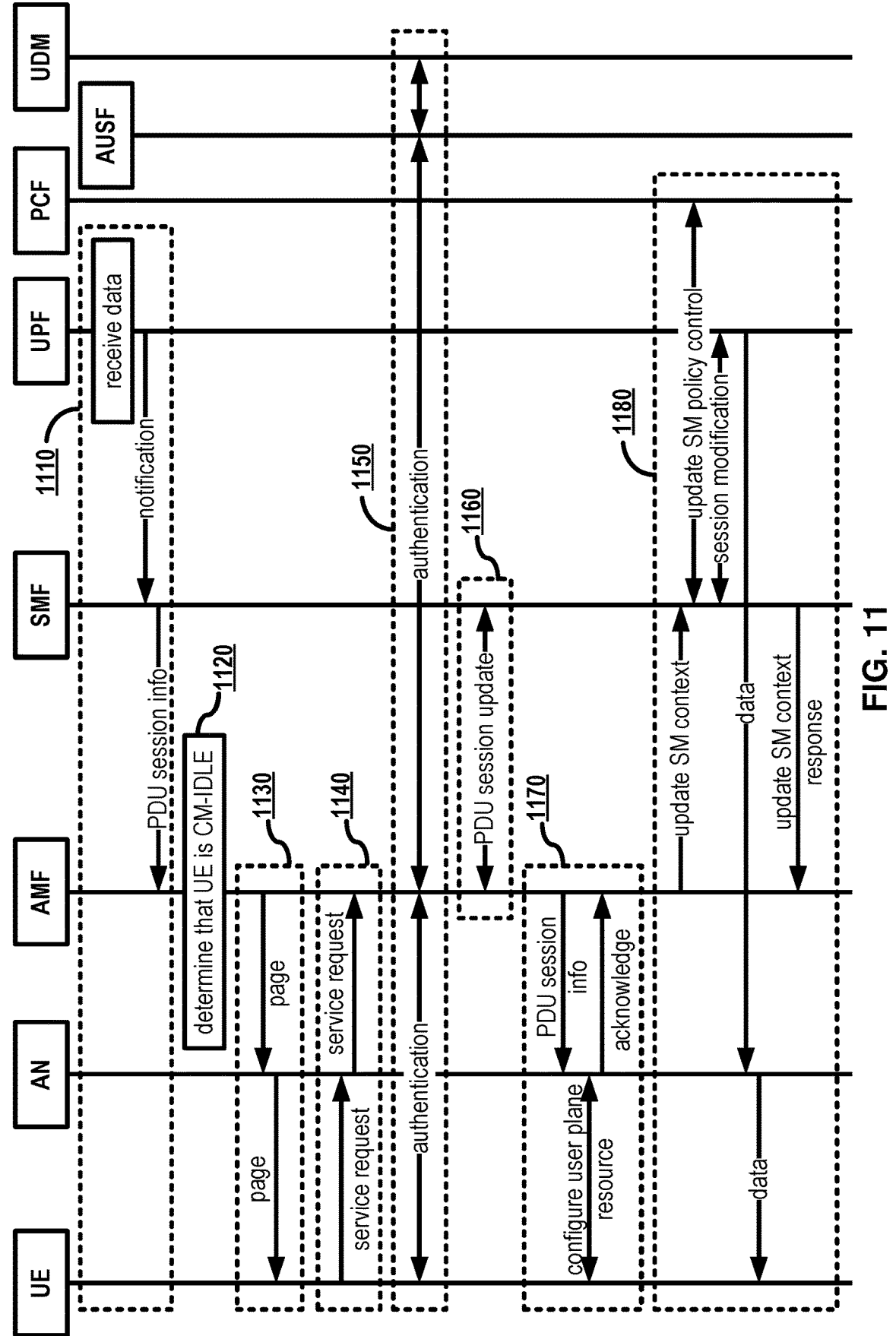
FIG. 11 illustrates an example of a service request procedure for a wireless device.
Figure 12:
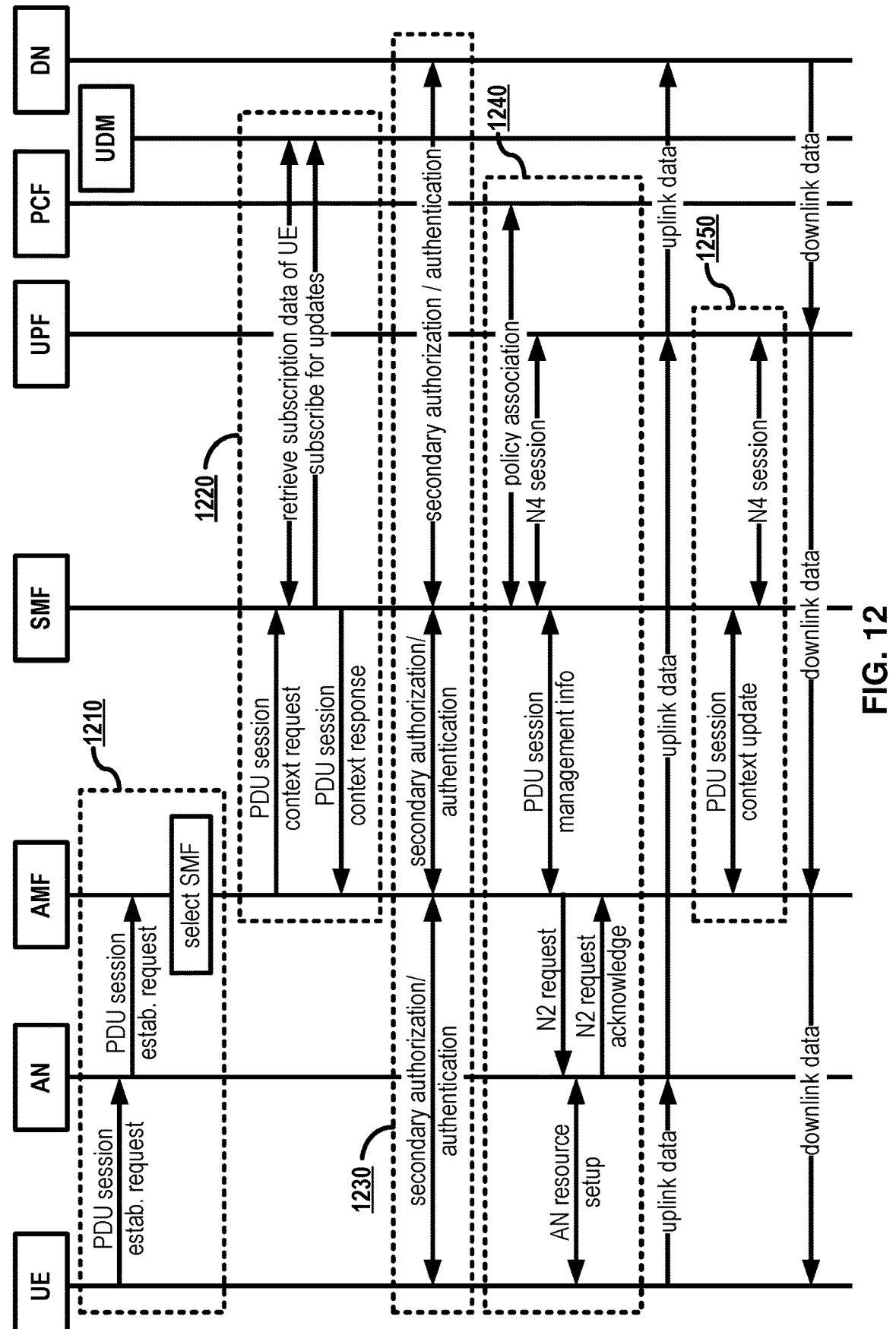
FIG. 12 illustrates an example of a protocol data unit session establishment procedure for a wireless device.

FIGS. 10-12 illustrate example procedures for registering, service request, and PDU session establishment of a UE.

FIG. 10 illustrates an example of a registration procedure for a wireless device (e.g., a UE). Based on the registration procedure, the UE may transition from, for example, RM deregistered 940 to RM registered 950.

Registration may be initiated by a UE for the purposes of obtaining authorization to receive services, enabling mobility tracking, enabling reachability, or other purposes. The UE may perform an initial registration as a first step toward connection to the network (for example, if the UE is powered on, airplane mode is turned off, etc.). Registration may also be performed periodically to keep the network informed of the UE's presence (for example, while in CM-IDLE state), or in response to a change in UE capability or registration area. Deregistration (not shown in FIG. 10) may be performed to stop network access.

At 1010, the UE transmits a registration request to an AN. As an example, the UE may have moved from a coverage area of a previous AMF (illustrated as AMF #1) into a coverage area of a new AMF (illustrated as AMF #2). The registration request may be a NAS message. The registration request may include a UE identifier. The AN may select an AMF for registration of the UE. For example, the AN may select a default AMF. For example, the AN may select an AMF that is already mapped to the UE (e.g., a previous AMF). The NAS registration request may include a network slice identifier and the AN may select an AMF based on the requested slice. After the AMF is selected, the AN may send the registration request to the selected AMF.

At 1020, the AMF that receives the registration request (AMF #2) performs a context transfer. The context may be a UE context, for example, an RRC context for the UE. As an example, AMF #2 may send AMF #1 a message requesting a context of the UE. The message may include the UE identifier. The message may be a Namf_Communication_UEContextTransfer message. AMF #1 may send to AMF #2 a message that includes the requested UE context. This message may be a Namf_Communication_UEContextTransfer message. After the UE context is received, the AMF #2 may coordinate authentication of the UE. After authentication is complete, AMF #2 may send to AMF #1 a message indicating that the UE context transfer is complete. This message may be a Namf_Communication_UEContextTransfer Response message.

Authentication may require participation of the UE, an AUSF, a UDM and/or a UDR (not shown). For example, the AMF may request that the AUSF authenticate the UE. For example, the AUSF may execute authentication of the UE. For example, the AUSF may get authentication data from UDM. For example, the AUSF may send a subscription permanent identifier (SUPI) to the AMF based on the authentication being successful. For example, the AUSF may provide an intermediate key to the AMF. The intermediate key may be used to derive an access-specific security key for the UE, enabling the AMF to perform security context management (SCM). The AUSF may obtain subscription data from the UDM. The subscription data may be based on information obtained from the UDM (and/or the UDR). The subscription data may include subscription identifiers, security credentials, access and mobility related subscription data and/or session related data.

At 1030, the new AMF, AMF #2, registers and/or subscribes with the UDM. AMF #2 may perform registration using a UE context management service of the UDM (Nudm_UECM). AMF #2 may obtain subscription information of the UE using a subscriber data management service of the UDM (Nudm_SDM). AMF #2 may further request that the UDM notify AMF #2 if the subscription information of the UE changes. As the new AMF registers and subscribes, the old AMF, AMF #1, may deregister and unsubscribe. After deregistration, AMF #1 is free of responsibility for mobility management of the UE.

At 1040, AMF #2 retrieves access and mobility (AM) policies from the PCF. As an example, the AMF #2 may provide subscription data of the UE to the PCF. The PCF may determine access and mobility policies for the UE based on the subscription data, network operator data, current network conditions, and/or other suitable information. For example, the owner of a first UE may purchase a higher level of service than the owner of a second UE. The PCF may provide the rules associated with the different levels of service. Based on the subscription data of the respective UEs, the network may apply different policies which facilitate different levels of service.

For example, access and mobility policies may relate to service area restrictions, RAT/frequency selection priority (RFSP, where RAT stands for radio access technology), authorization and prioritization of access type (e.g., LTE versus NR), and/or selection of non-3GPP access (e.g., Access Network Discovery and Selection Policy (ANDSP)). The service area restrictions may comprise a list of tracking areas where the UE is allowed to be served (or forbidden from being served). The access and mobility policies may include a UE route selection policy (URSP)) that influences routing to an established PDU session or a new PDU session. As noted above, different policies may be obtained and/or enforced based on subscription data of the UE, location of the UE (i.e., location of the AN and/or AMF), or other suitable factors.

At 1050, AMF #2 may update a context of a PDU session. For example, if the UE has an existing PDU session, the AMF #2 may coordinate with an SMF to activate a user plane connection associated with the existing PDU session. The SMF may update and/or release a session management context of the PDU session (Nsmf_PDUSession_Up-dateSMContext, Nsmf_PDUSession_ReleaseSMContext).

At 1060, AMF #2 sends a registration accept message to the AN, which forwards the registration accept message to the UE. The registration accept message may include a new UE identifier and/or a new configured slice identifier. The UE may transmit a registration complete message to the AN, which forwards the registration complete message to the AMF #2. The registration complete message may acknowledge receipt of the new UE identifier and/or new configured slice identifier.

At 1070, AMF #2 may obtain UE policy control information from the PCF. The PCF may provide an access network discovery and selection policy (ANDSP) to facilitate non-3GPP access. The PCF may provide a UE route selection policy (URSP) to facilitate mapping of particular data traffic to particular PDU session connectivity parameters. As an example, the URSP may indicate that data traffic associated with a particular application should be mapped to a particular SSC mode, network slice, PDU session type, or preferred access type (3GPP or non-3GPP).

FIG. 11 illustrates an example of a service request procedure for a wireless device (e.g., a UE). The service request procedure depicted in FIG. 11 is a network-triggered service request procedure for a UE in a CM-IDLE state. However, other service request procedures (e.g., a UE-triggered service request procedure) may also be understood by reference to FIG. 11, as will be discussed in greater detail below.

At 1110, a UPF receives data. The data may be downlink data for transmission to a UE. The data may be associated with an existing PDU session between the UE and a DN. The data may be received, for example, from a DN and/or another UPF. The UPF may buffer the received data. In response to the receiving of the data, the UPF may notify an SMF of the received data. The identity of the SMF to be notified may be determined based on the received data. The notification may be, for example, an N4 session report. The notification may indicate that the UPF has received data associated with the UE and/or a particular PDU session associated with the UE. In response to receiving the notification, the SMF may send PDU session information to an AMF. The PDU session information may be sent in an N1N2 message transfer for forwarding to an AN. The PDU session information may include, for example, UPF tunnel endpoint information and/or QoS information.

At 1120, the AMF determines that the UE is in a CM-IDLE state. The determining at 1120 may be in response to the receiving of the PDU session information. Based on the determination that the UE is CM-IDLE, the service request procedure may proceed to 1130 and 1140, as depicted in FIG. 11. However, if the UE is not CM-IDLE (e.g., the UE is CM-CONNECTED), then 1130 and 1140 may be skipped, and the service request procedure may proceed directly to 1150.

At 1130, the AMF pages the UE. The paging at 1130 may be performed based on the UE being CM-IDLE. To perform the paging, the AMF may send a page to the AN. The page may be referred to as a paging or a paging message. The page may be an N2 request message. The AN may be one of a plurality of ANs in a RAN notification area of the UE. The AN may send a page to the UE. The UE may be in a coverage area of the AN and may receive the page.

At 1140, the UE may request service. The UE may transmit a service request to the AMF via the AN. As depicted in FIG. 11, the UE may request service at 1140 in response to receiving the paging at 1130. However, as noted above, this is for the specific case of a network-triggered service request procedure. In some scenarios (for example, if uplink data becomes available at the UE), then the UE may commence a UE-triggered service request procedure. The UE-triggered service request procedure may commence starting at 1140.

At 1150, the network may authenticate the UE. Authentication may require participation of the UE, an AUSF, and/or a UDM, for example, similar to authentication described elsewhere in the present disclosure. In some cases (for example, if the UE has recently been authenticated), the authentication at 1150 may be skipped.

At 1160, the AMF and SMF may perform a PDU session update. As part of the PDU session update, the SMF may provide the AMF with one or more UPF tunnel endpoint identifiers. In some cases (not shown in FIG. 11), it may be necessary for the SMF to coordinate with one or more other SMFs and/or one or more other UPFs to set up a user plane.

At 1170, the AMF may send PDU session information to the AN. The PDU session information may be included in an N2 request message. Based on the PDU session information, the AN may configure a user plane resource for the UE. To configure the user plane resource, the AN may, for example, perform an RRC reconfiguration of the UE. The AN may acknowledge to the AMF that the PDU session information has been received. The AN may notify the AMF that the user plane resource has been configured, and/or provide information relating to the user plane resource configuration.

In the case of a UE-triggered service request procedure, the UE may receive, at 1170, a NAS service accept message from the AMF via the AN. After the user plane resource is configured, the UE may transmit uplink data (for example, the uplink data that caused the UE to trigger the service request procedure).

At 1180, the AMF may update a session management (SM) context of the PDU session. For example, the AMF may notify the SMF (and/or one or more other associated SMFs) that the user plane resource has been configured, and/or provide information relating to the user plane resource configuration. The AMF may provide the SMF (and/or one or more other associated SMFs) with one or more AN tunnel endpoint identifiers of the AN. After the SM context update is complete, the SMF may send an update SM context response message to the AMF.

Based on the update of the session management context, the SMF may update a PCF for purposes of policy control. For example, if a location of the UE has changed, the SMF may notify the PCF of the UE's a new location.

Based on the update of the session management context, the SMF and UPF may perform a session modification. The session modification may be performed using N4 session modification messages. After the session modification is complete, the UPF may transmit downlink data (for example, the downlink data that caused the UPF to trigger the network-triggered service request procedure) to the UE. The transmitting of the downlink data may be based on the one or more AN tunnel endpoint identifiers of the AN.

FIG. 12 illustrates an example of a protocol data unit (PDU) session establishment procedure for a wireless device (e.g., a UE). The UE may determine to transmit the PDU session establishment request to create a new PDU session, to hand over an existing PDU session to a 3GPP network, or for any other suitable reason.

At 1210, the UE initiates PDU session establishment. The UE may transmit a PDU session establishment request to an AMF via an AN. The PDU session establishment request may be a NAS message. The PDU session establishment request may indicate: a PDU session ID; a requested PDU session type (new or existing); a requested DN (DNN); a requested network slice (S-NSSAI); a requested SSC mode; and/or any other suitable information. The PDU session ID may be generated by the UE. The PDU session type may be, for example, an Internet Protocol (IP)-based type (e.g., IPv4, IPv6, or dual stack IPv4/IPv6), an Ethernet type, or an unstructured type.

The AMF may select an SMF based on the PDU session establishment request. In some scenarios, the requested PDU session may already be associated with a particular SMF. For example, the AMF may store a UE context of the UE, and the UE context may indicate that the PDU session ID of the requested PDU session is already associated with the particular SMF. In some scenarios, the AMF may select the SMF based on a determination that the SMF is prepared to handle the requested PDU session. For example, the requested PDU session may be associated with a particular DNN and/or S-NSSAI, and the SMF may be selected based on a determination that the SMF can manage a PDU session associated with the particular DNN and/or S-NSSAI.

At 1220, the network manages a context of the PDU session. After selecting the SMF at 1210, the AMF sends a PDU session context request to the SMF. The PDU session context request may include the PDU session establishment request received from the UE at 1210. The PDU session context request may be a Nsmf_PDUSession_CreateSM-Context Request and/or a Nsmf_PDUSession_UpdateSM-Context Request. The PDU session context request may indicate identifiers of the UE; the requested DN; and/or the requested network slice. Based on the PDU session context request, the SMF may retrieve subscription data from a UDM. The subscription data may be session management subscription data of the UE. The SMF may subscribe for updates to the subscription data, so that the PCF will send new information if the subscription data of the UE changes. After the subscription data of the UE is obtained, the SMF may transmit a PDU session context response to the AMG. The PDU session context response may be a Nsmf_P-DUSession_CreateSMContext Response and/or a Nsmf_P-DUSession_UpdateSMContext Response. The PDU session context response may include a session management context ID.

At 1230, secondary authorization/authentication may be performed, if necessary. The secondary authorization/authentication may involve the UE, the AMF, the SMF, and the DN. The SMF may access the DN via a Data Network Authentication, Authorization and Accounting (DN AAA) server.

At 1240, the network sets up a data path for uplink data associated with the PDU session. The SMF may select a PCF and establish a session management policy association. Based on the association, the PCF may provide an initial set of policy control and charging rules (PCC rules) for the PDU session. When targeting a particular PDU session, the PCF may indicate, to the SMF, a method for allocating an IP address to the PDU Session, a default charging method for the PDU session, an address of the corresponding charging entity, triggers for requesting new policies, etc. The PCF may also target a service data flow (SDF) comprising one or more PDU sessions. When targeting an SDF, the PCF may indicate, to the SMF, policies for applying QoS requirements, monitoring traffic (e.g., for charging purposes), and/or steering traffic (e.g., by using one or more particular N6 interfaces).

The SMF may determine and/or allocate an IP address for the PDU session. The SMF may select one or more UPFs (a single UPF in the example of FIG. 12) to handle the PDU session. The SMF may send an N4 session message to the selected UPF. The N4 session message may be an N4 Session Establishment Request and/or an N4 Session Modification Request. The N4 session message may include packet detection, enforcement, and reporting rules associated with the PDU session. In response, the UPF may acknowledge by sending an N4 session establishment response and/or an N4 session modification response.

The SMF may send PDU session management information to the AMF. The PDU session management information may be a session service request (e.g., Namf_Communication_N1N2MessageTransfer) message. The PDU session management information may include the PDU session ID. The PDU session management information may be a NAS message. The PDU session management information may include N1 session management information and/or N2 session management information. The N1 session management information may include a PDU session establishment accept message. The PDU session establishment accept message may include tunneling endpoint information of the UPF and quality of service (QoS) information associated with the PDU session.

The AMF may send an N2 request to the AN. The N2 request may include the PDU session establishment accept message. Based on the N2 request, the AN may determine AN resources for the UE. The AN resources may be used by the UE to establish the PDU session, via the AN, with the DN. The AN may determine resources to be used for the PDU session and indicate the determined resources to the UE. The AN may send the PDU session establishment accept message to the UE. For example, the AN may perform an RRC reconfiguration of the UE. After the AN resources are set up, the AN may send an N2 request acknowledge to the AMF. The N2 request acknowledge may include N2 session management information, for example, the PDU session ID and tunneling endpoint information of the AN.

After the data path for uplink data is set up at 1240, the UE may optionally send uplink data associated with the PDU session. As shown in FIG. 12, the uplink data may be sent to a DN associated with the PDU session via the AN and the UPF.

At 1250, the network may update the PDU session context. The AMF may transmit a PDU session context update request to the SMF. The PDU session context update request may be a Nsmf_PDUSession_UpdateSMContext Request. The PDU session context update request may include the N2 session management information received from the AN. The SMF may acknowledge the PDU session context update. The acknowledgement may be a Nsmf_P-DUSession_UpdateSMContext Response. The acknowledgement may include a subscription requesting that the SMF be notified of any UE mobility event. Based on the PDU session context update request, the SMF may send an N4 session message to the UPF. The N4 session message may be an N4 Session Modification Request. The N4 session message may include tunneling endpoint information of the AN. The N4 session message may include forwarding rules associated with the PDU session. In response, the UPF may acknowledge by sending an N4 session modification response.

After the UPF receives the tunneling endpoint information of the AN, the UPF may relay downlink data associated with the PDU session. As shown in FIG. 12, the downlink data may be received from a DN associated with the PDU session via the AN and the UPF.

Figure 13:
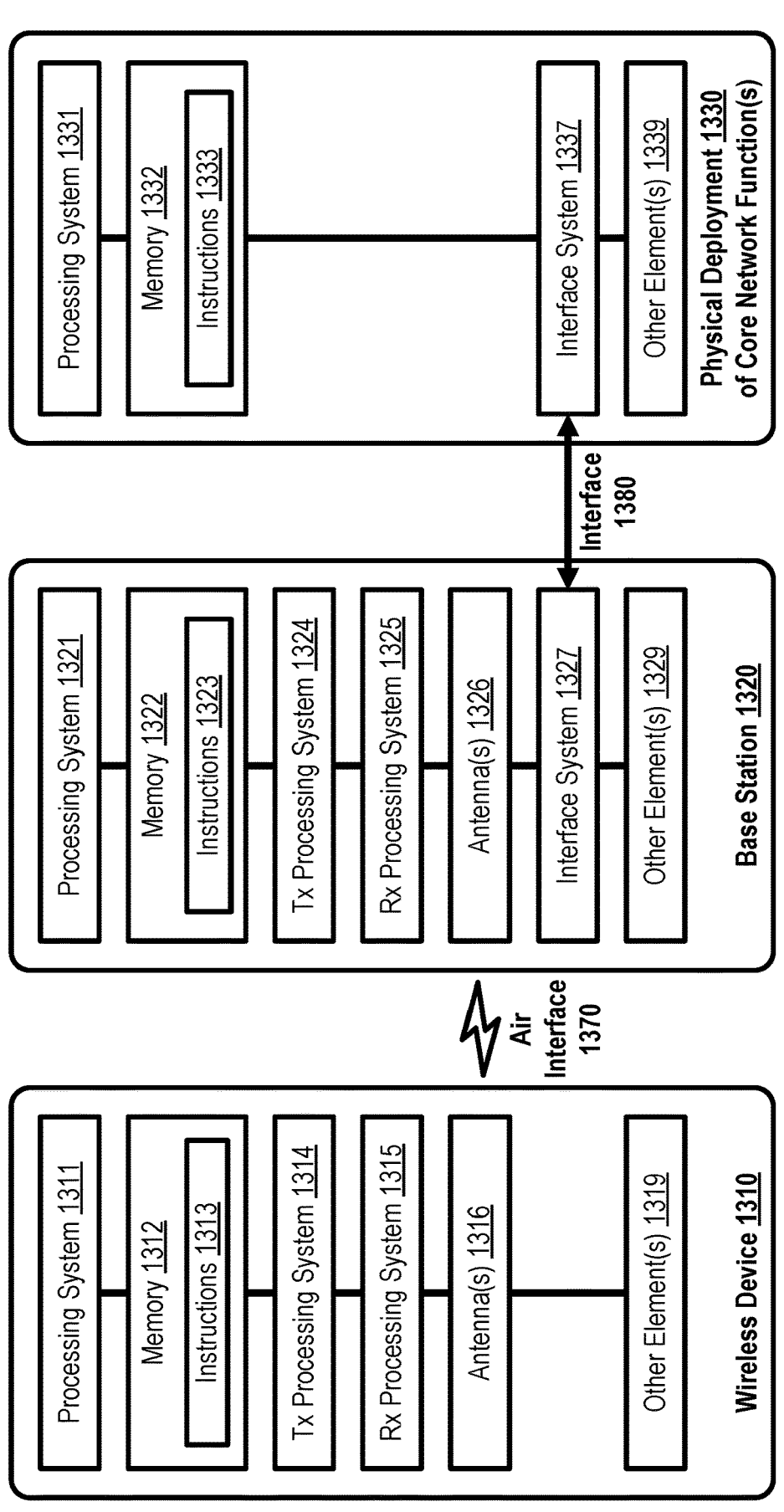
FIG. 13 illustrates examples of components of the elements in a communications network.

FIG. 13 illustrates examples of components of the elements in a communications network. FIG. 13 includes a wireless device 1310, a base station 1320, and a physical deployment of one or more network functions 1330 (henceforth "deployment 1330"). Any wireless device described in the present disclosure may have similar components and may be implemented in a similar manner as the wireless device 1310. Any other base station described in the present disclosure (or any portion thereof, depending on the architecture of the base station) may have similar components and may be implemented in a similar manner as the base station 1320. Any physical core network deployment in the present disclosure (or any portion thereof, depending on the architecture of the base station) may have similar components and may be implemented in a similar manner as the deployment 1330.

The wireless device 1310 may communicate with base station 1320 over an air interface 1370. The communication direction from wireless device 1310 to base station 1320 over air interface 1370 is known as uplink, and the communication direction from base station 1320 to wireless device 1310 over air interface 1370 is known as downlink. Downlink transmissions may be separated from uplink transmissions using FDD, TDD, and/or some combination of duplexing techniques. FIG. 13 shows a single wireless device 1310 and a single base station 1320, but it will be understood that wireless device 1310 may communicate with any number of base stations or other access network components over air interface 1370, and that base station 1320 may communicate with any number of wireless devices over air interface 1370.

The wireless device 1310 may comprise a processing system 1311 and a memory 1312. The memory 1312 may comprise one or more computer-readable media, for example, one or more non-transitory computer readable media. The memory 1312 may include instructions 1313. The processing system 1311 may process and/or execute instructions 1313. Processing and/or execution of instructions 1313 may cause wireless device 1310 and/or processing system 1311 to perform one or more functions or activities. The memory 1312 may include data (not shown). One of the functions or activities performed by processing system 1311 may be to store data in memory 1312 and/or retrieve previously-stored data from memory 1312. In an example, downlink data received from base station 1320 may be stored in memory 1312, and uplink data for transmission to base station 1320 may be retrieved from memory 1312. As illustrated in FIG. 13, the wireless device 1310 may communicate with base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13, transmission processing system 1314 and/or reception processing system 1315 may be coupled to a dedicated memory that is analogous to but separate from memory 1312, and comprises instructions that may be processed and/or executed to carry out one or more of their respective functionalities. The wireless device 1310 may comprise one or more antennas 1316 to access air interface 1370.

The wireless device 1310 may comprise one or more other elements 1319. The one or more other elements 1319 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise one or more sources of power, for example, a battery, a solar cell, a fuel cell, or any combination thereof.

The wireless device 1310 may transmit uplink data to and/or receive downlink data from base station 1320 via air interface 1370. To perform the transmission and/or reception, one or more of the processing system 1311, transmission processing system 1314, and/or reception system 1315 may implement open systems interconnection (OSI) functionality. As an example, transmission processing system 1314 and/or reception system 1315 may perform layer 1 OSI functionality, and processing system 1311 may perform higher layer functionality. The wireless device 1310 may transmit and/or receive data over air interface 1370 using one or more antennas 1316. For scenarios where the one or more antennas 1316 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media, for example, one or more non-transitory computer readable media. The memory 1322 may include instructions 1323. The processing system 1321 may process and/or execute instructions 1323. Processing and/or execution of instructions 1323 may cause base station 1320 and/or processing system 1321 to perform one or more functions or activities. The memory 1322 may include data (not shown). One of the functions or activities performed by processing system 1321 may be to store data in memory 1322 and/or retrieve previously-stored data from memory 1322. The base station 1320 may communicate with wireless device 1310 using a transmission processing system 1324 and a reception processing system 1325. Although not shown in FIG. 13, transmission processing system 1324 and/or reception processing system 1325 may be coupled to a dedicated memory that is analogous to but separate from memory 1322, and comprises instructions that may be processed and/or executed to carry out one or more of their respective functionalities. The wireless device 1320 may comprise one or more antennas 1326 to access air interface 1370.

The base station 1320 may transmit downlink data to and/or receive uplink data from wireless device 1310 via air interface 1370. To perform the transmission and/or reception, one or more of the processing system 1321, transmission processing system 1324, and/or reception system 1325 may implement OSI functionality. As an example, transmission processing system 1324 and/or reception system 1325 may perform layer 1 OSI functionality, and processing system 1321 may perform higher layer functionality. The base station 1320 may transmit and/or receive data over air interface 1370 using one or more antennas 1326. For scenarios where the one or more antennas 1326 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless and interface system 1327 may include one or more components suitable for communicating via interface 1380. In FIG. 13, interface 1380 connects base station 1320 to a single deployment 1330, but it will be understood that wireless device 1310 may communicate with any number of base stations and/or CN deployments over interface 1380, and that deployment 1330 may communicate with any number of base stations and/or other CN deployments over interface 1380. The base station 1320 may comprise one or more other elements 1329 analogous to one or more of the one or more other elements 1319.

The deployment 1330 may comprise any number of portions of any number of instances of one or more network functions (NFs). The deployment 1330 may comprise a processing system 1331 and a memory 1332. The memory 1332 may comprise one or more computer-readable media, for example, one or more non-transitory computer readable media. The memory 1332 may include instructions 1333. The processing system 1331 may process and/or execute instructions 1333. Processing and/or execution of instructions 1333 may cause the deployment 1330 and/or processing system 1331 to perform one or more functions or activities. The memory 1332 may include data (not shown). One of the functions or activities performed by processing system 1331 may be to store data in memory 1332 and/or retrieve previously-stored data from memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab and/or the like) or a modeling/simulation program such as Simulink, Stateflow, GNU Octave, or Lab VIEWMathScript. It may be possible to implement modules using physical hardware that incorporates discrete or programmable analog, digital and/or quantum hardware. Examples of programmable hardware comprise computers, microcontrollers, microprocessors, DSPs, ASICs, FPGAs, and complex programmable logic devices (CPLDs). Computers, microcontrollers and microprocessors may be programmed using languages such as assembly, C, C++ and/or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

The wireless device 1310, base station 1320, and/or deployment 1330 may implement timers and/or counters. A timer/counter may start at an initial value. As used herein, starting may comprise restarting. Once started, the timer/counter may run. Running of the timer/counter may be associated with an occurrence. When the occurrence occurs, the value of the timer/counter may change (for example, increment or decrement). The occurrence may be, for example, an exogenous event (for example, a reception of a signal, a measurement of a condition, etc.), an endogenous event (for example, a transmission of a signal, a calculation, a comparison, a performance of an action or a decision to so perform, etc.), or any combination thereof. In the case of a timer, the occurrence may be the passage of a particular amount of time. However, it will be understood that a timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused, wherein the present value of the timer/counter is held, maintained, and/or carried over, even upon the occurrence of one or more occurrences that would otherwise cause the value of the timer/counter to change. The timer/counter may be un-paused or continued, wherein the value that was held, maintained, and/or carried over begins changing again when the one or more occurrence occur. A timer/counter may be set and/or reset. As used herein, setting may comprise resetting. When the timer/counter sets and/or resets, the value of the timer/counter may be set to the initial value. A timer/counter may be started and/or restarted. As used herein, starting may comprise restarting. In some embodiments, when the timer/counter restarts, the value of the timer/counter may be set to the initial value and the timer/counter may begin to run.

FIGS. 14A, 14B, 14C, and 14D illustrate various example arrangements of physical core network deployments, each having one or more network functions or portions thereof. The core network deployments comprise a deployment 1410, a deployment 1420, a deployment 1430, a deployment 1440, and/or a deployment 1450. Each deployment may be analogous to, for example, the deployment 1330 depicted in FIG. 13. In particular, each deployment may comprise a processing system for performing one or more functions or activities, memory for storing data and/or instructions, and an interface system for communicating with other network elements (for example, other core network deployments). Each deployment may comprise one or more network functions (NFs). The term NF may refer to a particular set of functionalities and/or one or more physical elements configured to perform those functionalities (e.g., a processing system and memory comprising instructions that, when executed by the processing system, cause the processing system to perform the functionalities). For example, in the present disclosure, when a network function is described as performing X, Y, and Z, it will be understood that this refers to the one or more physical elements configured to perform X, Y, and Z, no matter how or where the one or more physical elements are deployed. The term NF may refer to a network node, network element, and/or network device.

As will be discussed in greater detail below, there are many different types of NF and each type of NF may be associated with a different set of functionalities. A plurality of different NFs may be flexibly deployed at different locations (for example, in different physical core network deployments) or in a same location (for example, co-located in a same deployment). A single NF may be flexibly deployed at different locations (implemented using different physical core network deployments) or in a same location. Moreover, physical core network deployments may also implement one or more base stations, application functions (AFs), data networks (DNs), or any portions thereof. NFs may be implemented in many ways, including as network elements on dedicated or shared hardware, as software instances running on dedicated or shared hardware, or as virtualized functions instantiated on a platform (e.g., a cloud-based platform).

FIG. 14A illustrates an example arrangement of core network deployments in which each deployment comprises one network function. A deployment 1410 comprises an NF 1411, a deployment 1420 comprises an NF 1421, and a deployment 1430 comprises an NF 1431. The deployments 1410, 1420, 1430 communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

FIG. 14B illustrates an example arrangement wherein a single deployment comprises more than one NF. Unlike FIG. 14A, where each NF is deployed in a separate deployment, FIG. 14B illustrates multiple NFs in deployments 1410, 1420. In an example, deployments 1410, 1420 may implement a software-defined network (SDN) and/or a network function virtualization (NFV).

For example, deployment 1410 comprises an additional network function, NF 1411A. The NFs 1411, 1411A may consist of multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. In an example, NFs 1411, 1411A may be associated with different PLMNs, but deployment 1410, which implements NFs 1411, 1411A, may be owned and/or operated by a single entity.

Elsewhere in FIG. 14B, deployment 1420 comprises NF 1421 and an additional network function, NF 1422. The NFs 1421, 1422 may be different NF types. Similar to NFs 1411, 1411A, the NFs 1421, 1422 may be co-located within the same deployment 1420, but separately implemented. As an example, a first PLMN may own and/or operate deployment 1420 having NFs 1421, 1422. As another example, the first PLMN may implement NF 1421 and a second PLMN may obtain from the first PLMN (e.g., rent, lease, procure, etc.) at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. When multiple NFs are provided at a single deployment, networks may operate with greater speed, coverage, security, and/or efficiency.

FIG. 14C illustrates an example arrangement of core network deployments in which a single instance of an NF is implemented using a plurality of different deployments. In particular, a single instance of NF 1422 is implemented at deployments 1420, 1440. As an example, the functionality provided by NF 1422 may be implemented as a bundle or sequence of subservices. Each subservice may be implemented independently, for example, at a different deployment. Each subservices may be implemented in a different physical location. By distributing implementation of subservices of a single NF across different physical locations, the mobile communications network may operate with greater speed, coverage, security, and/or efficiency.

FIG. 14D illustrates an example arrangement of core network deployments in which one or more network functions are implemented using a data processing service. In FIG. 14D, NFs 1411, 1411A, 1421, 1422 are included in a deployment 1450 that is implemented as a data processing service. The deployment 1450 may comprise, for example, a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the figures, different network elements (e.g., NFs) may be located in different physical deployments, or co-located in a single physical deployment. It will be understood that in the present disclosure, the sending and receiving of messages among different network elements is not limited to inter-deployment transmission or intra-deployment transmission, unless explicitly indicated.

In an example, a deployment may be a 'black box' that is preconfigured with one or more NFs and preconfigured to communicate, in a prescribed manner, with other 'black box' deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

Figure 15A:
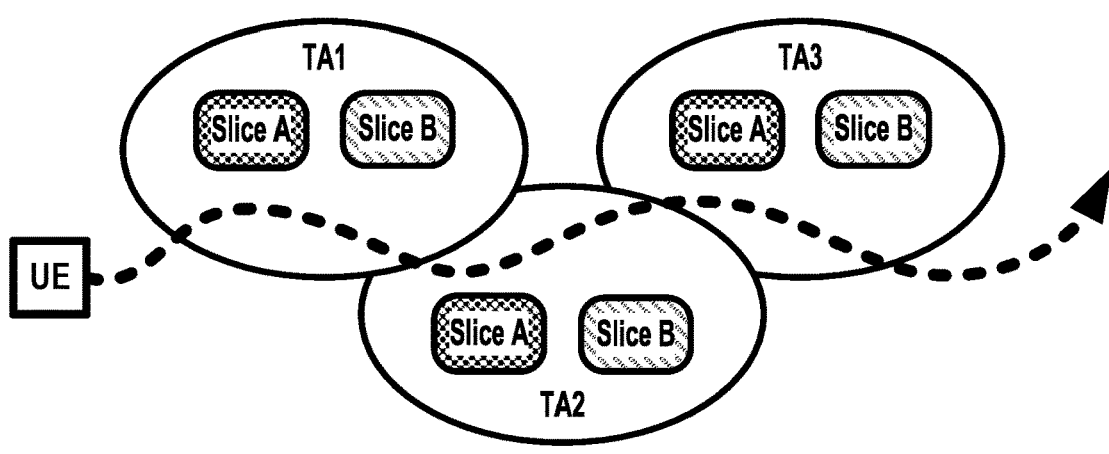
FIG. 15A, FIG. 15B, and FIG. 15C illustrate various examples of network slice deployments.
Figure 15B:
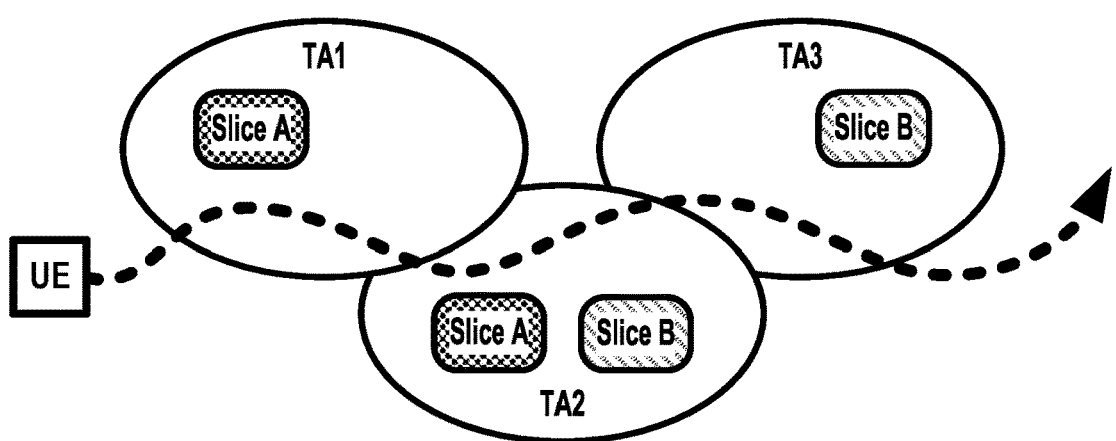
Figure 15C:
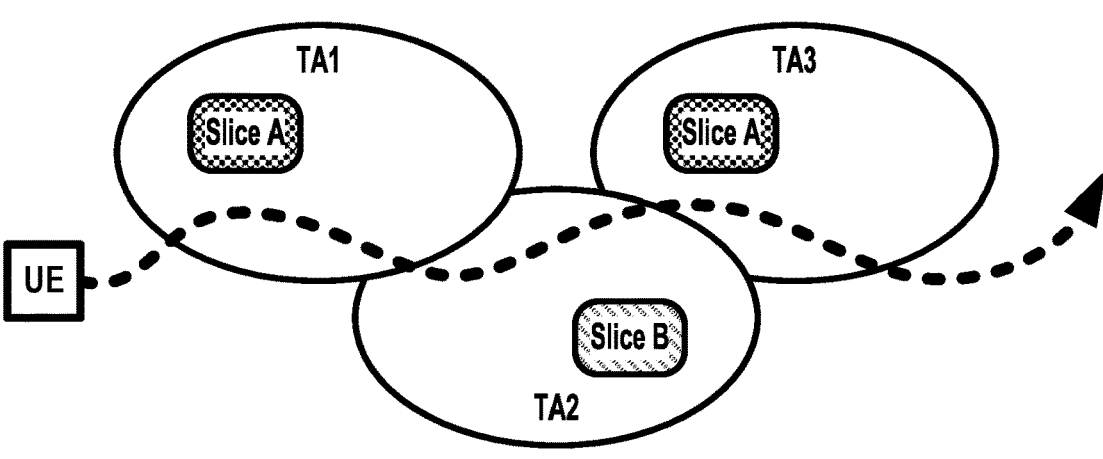

In example embodiments as depicted in FIG. 15A, FIG. 15B, FIG. 15C, different tracking areas may support different slices (e.g., different network slices, different network services, etc.) and/or different combinations of slices. A tracking area (TA) may correspond to the (combined) coverage areas of one or more cells of one or more base stations. A TA may comprise one or more NG-RANs, one or more gNBs, and/or one or more ng-eNBs and/or the like. A NG-RAN may comprise one or more gNBs, and/or one or more ng-eNBs, one or more N3IWFs and/or the like. A gNB may comprise one or more gNB-CU and/or one or more gNB-DUs. A gNB-CU may comprise a gNB-CU-CP and/or one or more gNB-CU-UPs.

FIG. 15A illustrates an example of TAs that are undifferentiated with respect to slice support. For example, all the TAs depicted in FIG. 15A (TA1, TA2, TA3) support the same combination of slices (slice A and slice B). When a wireless device (e.g., UE) enters a TA (e.g., TA1), the UE may send a registration request, via TA1 (e.g., a base station associated with TA1), to a mobility management function (e.g., MME, AMF, etc.). The registration request may indicate a requested slice (e.g., slice A). The AMF may determine that TA1 supports the requested slice (slice A) and may determine to accept the registration. The AMF may determine a registration area of the UE. The registration area includes TA1 and may include other tracking areas. Support for the requested slice (slice A) may be one factor for determining the addition of other tracking areas to the registration area. For example, the AMF may add TA2 and TA3 to the registration area based on TA2 and TA3 both supporting the requested slice (slice A). The AMF may send a registration accept to the wireless device. The registration accept may indicate the registration area. For example, the registration accept may comprise a tracking area list indicating the TAs in the registration area (e.g., TA1, TA2, and TA3). If the UE exits the registration area, it may need to perform the registration update procedure. The UE may be able to avoid registration update procedures for as long as it remains in the registration area.

FIG. 15B illustrates an example of TAs that are differentiated with respect to slice support. In particular, the TAs support different slices and/or combinations of slices. When the wireless device enters TA1, the UE may send a registration request, via TA1, to the mobility management function. The registration request may indicate a request for slice A. The AMF may determine that TA1 supports slice A and may determine to accept the registration. The AMF may determine that an adjacent tracking area also supports slice A (e.g., TA2), and that some other tracking areas do not support slice A (e.g., TA3). The AMF may send a registration accept to the wireless device indicating a registration area that is restricted to TAs which support slice A (TA1 and TA2).

FIG. 15C illustrates another example of TAs that are differentiated with respect to slice support. When the wireless device enters TA1, the UE may send a registration request, via TA1, to the mobility management function. The registration request may indicate a request for slice A. The AMF may determine that TA1 supports slice A and may determine to accept the registration. The AMF may determine that there are no adjacent tracking areas which support slice A. The AMF may send a registration accept to the wireless device indicating a registration area that is restricted to adjacent TAs which support slice A (TA1 only).

In existing technologies, the network may be substantially undifferentiated with respect to slice support. However, as new use cases emerge, it is possible that differentiation based on slice support increases. For example, as shown in FIG. 15A, from the perspective of slice support, one TA may be no more or less suitable than the others. This may enable the AMF to indicate a wide registration area (including TA1, TA2, TA3). However, there may be advantages to network differentiation, which may lead to the scenarios depicted in FIG. 15B and FIG. 15C. For example, a network operator may customize and/or fine-tune one or more network components of a first TA (e.g., base stations) to serve a particular network slice (e.g., slice A). As network components are increasingly customized to support a specific slice (e.g., slice A), they may become less suited to serve other slices (e.g., slice B). To compensate, the network operator may customize a different set of network components to serve slice B. In this way, slice support differentiation may proliferate within the network. Slice support differentiation may improve network service in many respects. But many existing mechanisms assume that TAs are undifferentiated. Existing approaches fail to address the unintended consequences of network differentiation with respect to slice support, as will be discussed in greater detail below.

Figure 16:
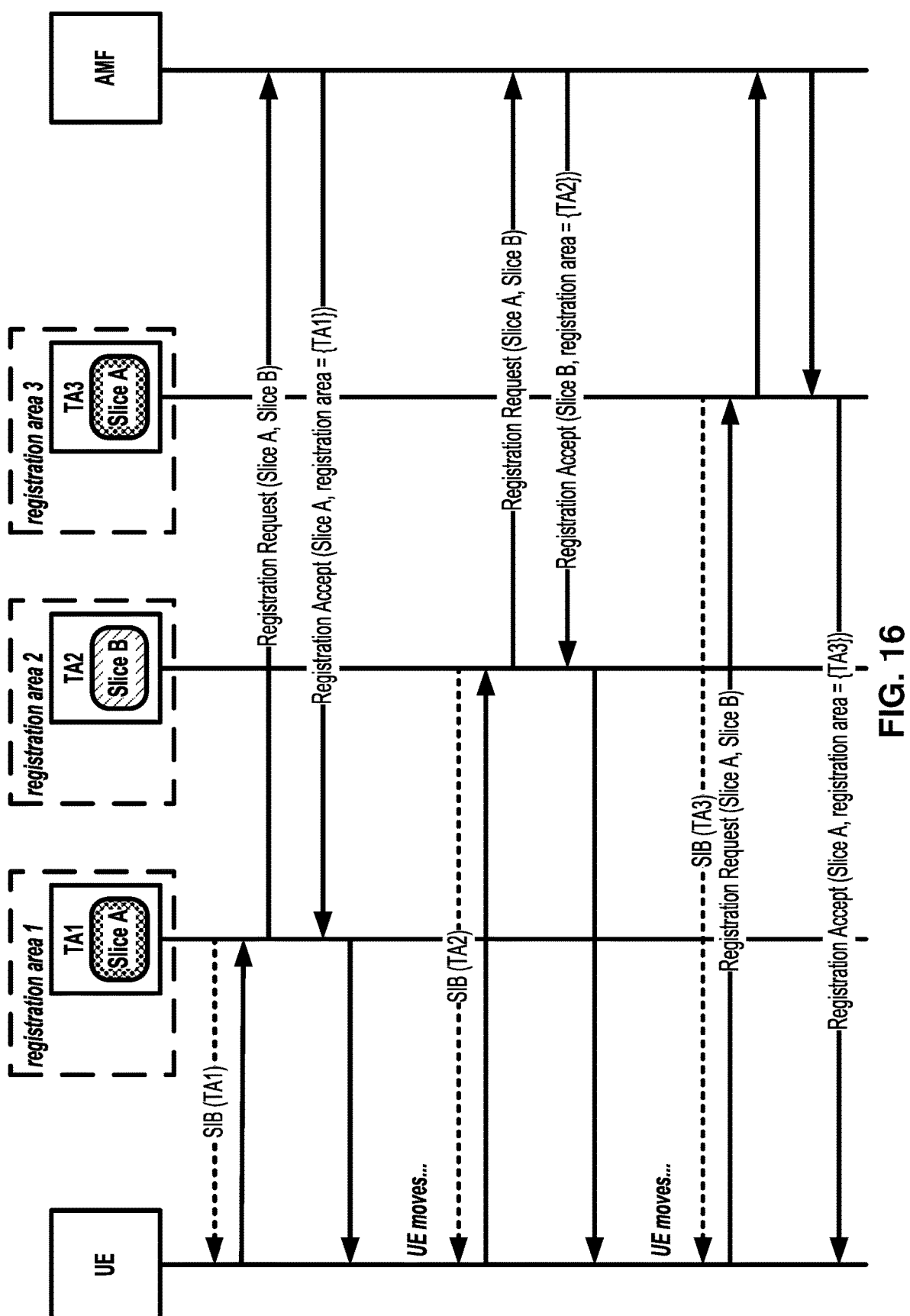
FIG. 16 illustrates examples of signaling for example network slice deployments.

FIG. 16 illustrates an example of wireless device registration update as the wireless device moves through several tracking areas (TA1, TA2, TA3). In FIG. 16, the TAs may have the same slice support characteristics as depicted in FIG. 15C. In particular, TA1 supports only slice A, TA2 supports only slice B, and TA3 supports only slice A. Due to the high level of slice differentiation among the tracking areas, they can not be added to the same registration area. To best illustrate the problem, the level of slice differentiation in FIG. 16 is so high that each TA constitutes its own registration area. As a result, every movement of the UE from one TA to another TA necessitates a registration update procedure. This causes high levels of power consumption and signaling overhead.

For example, when a wireless device (e.g., UE) moves into TA1, the UE may send a registration request to the network via TA1. In an example, the registration request may be based on reception of a system information block (SIB) received from a base station within the TA. The SIB may indicate that the base station is associated with the TA.

The registration request may indicate that the UE requests slice A and slice B. The registration request may be received by a mobility management function (e.g., AMF). The AMF may determine that requested slice A is supported by TA1. The AMF may send a registration accept indicating slice A. The registration accept may also indicate a registration area of the UE (e.g., comprise a tracking area list). The tracking area list may include TA1, because the registration request was received via TA1 and because TA1 supports a requested slice (slice A). The tracking area list may exclude TA2 because TA2 does not support slice A. The registration area may exclude TA3 because TA3 is not adjacent to TA1.

The UE may later move into TA2. Because the UE's registration area (registration area 1) does not include TA2, the UE may be forced to re-register (e.g., initiate/perform a registration update procedure). As shown in FIG. 16, a registration request may be sent to the AMF via TA2, and may indicate that the UE requests slice A and slice B. The AMF may send a registration accept indicating slice B. The registration accept may indicate a new registration area of the UE (registration area 2). The new registration area includes TA2, because the registration request was received via TA2 and because TA2 supports a requested slice (slice B). The tracking area list may exclude TA1 and TA3 because TA1 and TA3 do not support slice B.

The UE may later move into TA3. Because the UE's registration area (registration area 2) does not include TA3, the UE may be forced to re-register (e.g., initiate/perform a registration update procedure). As shown in FIG. 16, yet another registration request may be sent to the AMF via TA3, and may indicate that the UE requests slice A and slice B. The AMF may send a registration accept indicating slice A. The registration accept may indicate that the registration area of the UE includes TA3, because the registration request was received via TA3 and because TA3 supports a requested slice (slice A). The tracking area list may exclude TA2 because TA2 does not support slice A and may exclude TA1 because TA1 is not adjacent to TA3.

The example of FIG. 16 illustrates the challenges presented by a highly differentiated network. In existing, undifferentiated networks (e.g., analogous to FIG. 15A), a registration area may encompass several adjacent tracking areas, and a UE can move from TA1 to TA2 to TA3 without leaving the registration area. Increased slice differentiation may have benefits, but as FIG. 16 demonstrates, there are new issues which arise.

Figure 17:
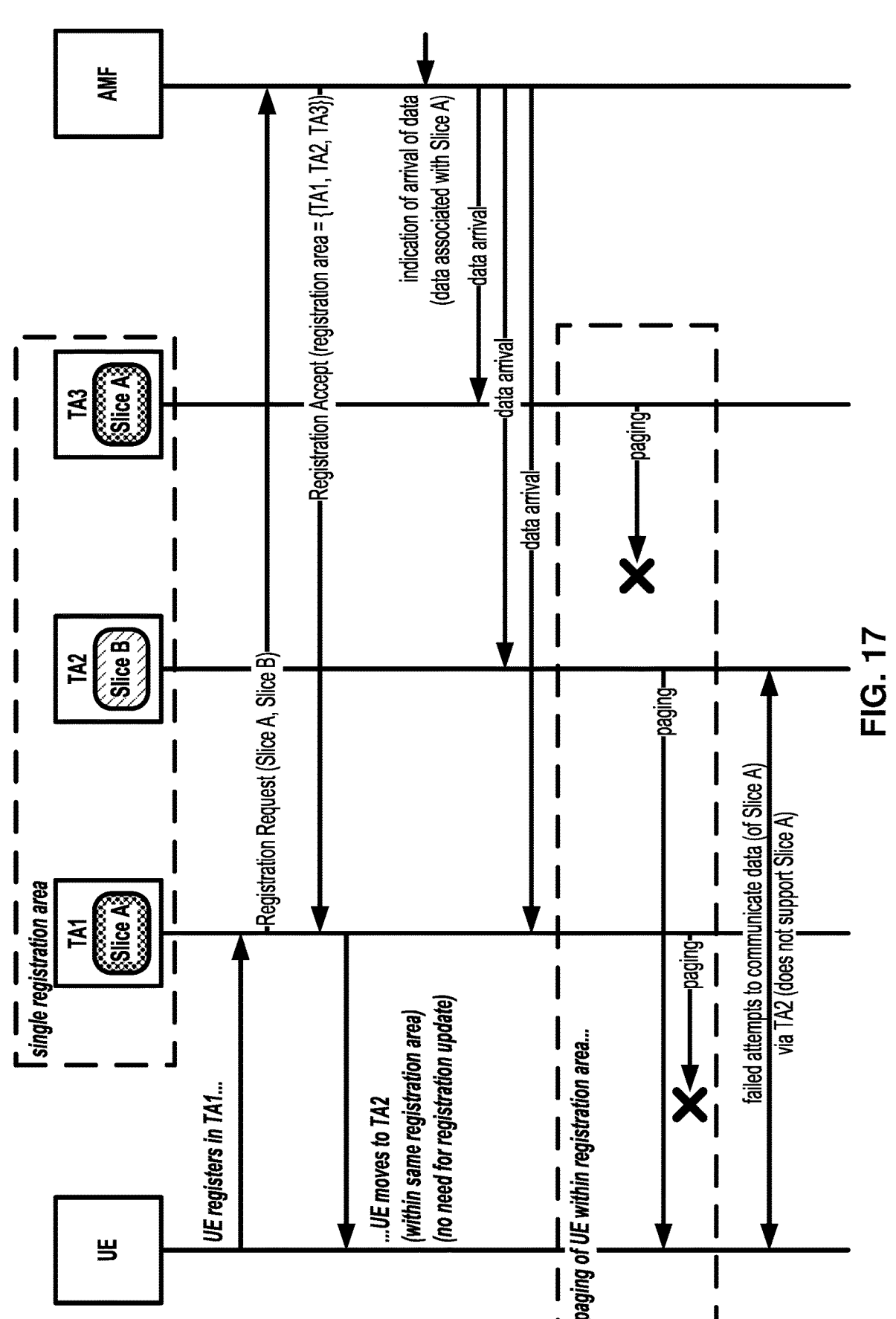
FIG. 17 illustrates examples of signaling for example network slice deployments.

FIG. 17 illustrates one possible method of addressing the problem of over-frequent registration updates. In particular, registration areas may be determined without necessarily considering slice support. For example, TA1, TA2, TA3 may be added to a single registration area, even though TA1, TA2, TA3 are not adjacent and undifferentiated. This approach reduces the number of registration updates because a UE which leaves TA1 and enters TA2 has not changed its registration area. However, this approach can cause problems with existing paging mechanisms, as will be discussed in greater detail below.

In the example of FIG. 17, a wireless device (e.g., UE) registers in TA1. The UE requests slice support for slice A and slice B. The mobility management function (e.g., AMF) accepts the registration request. The acceptance may be based on support for slice A within TA1. The AMF indicates that the registration area corresponds to a tracking area list which includes TA1, TA2, and TA3.

The UE may later move to TA2. Because TA2 is in the UE's registration area (i.e., in the UE's TA list), there is no need for the UE to perform a registration update procedure. This helps to alleviate the problem of over-frequent registration update, but creates a new problem relating to paging.

The paging process may begin when the AMF receives an indication of data arrival for the UE (e.g., downlink data is available for the UE). For example, data may arrive at a user plane function (UPF, not shown), and the UPF notify the AMF that data has arrived. Based on the indication of data arrival, the AMF notifies network components (e.g., base stations, NG-RANs) within the UE's registration area (i.e., TA1, TA2, TA3). Upon receiving the respective notifications, the network components within the UE's registration area send paging messages for the UE within their respective coverage areas. Since the UE is in the coverage area of TA2, the paging message sent via TA2 is received by the UE.

However, suppose that the data is associated with a specific slice (e.g., slice A). In the example of FIG. 17, the UE finds itself in a tracking area (TA2) which does not support slice A. The UE and network may attempt to communicate the data of slice A via TA2. But since TA2 does not support slice A, the data may not be communicated in accordance with the requirements of slice A, or may not be communicated at all. Moreover, the problem may not be recognized, so the network and UE may attempt and reattempt to communicate the data without success, a futile waste of additional resources.

Accordingly, existing technologies are not prepared for the implementation of areas which are differentiated with respect to slice support (e.g., support for different combination of network slices and/or network services). Network operators may reduce the frequency of registration updating in differentiated networks by relaxing the constraints on registration areas. For example, a single registration area may be allowed to include differentiated tracking areas which support different slices. However, while relaxation of this constraint can reduce over-frequent registration updates, it can cause other problems to arise, for example, in the context of paging. In particular, the network may receive data for a wireless device. The data may be associated with a particular slice. The network may page the wireless device via the tracking areas within the wireless device's registration area. But the registration area may include tracking areas that do not support the particular slice. As a result, the paging mechanisms may fail, or may lead to failed communication of the data.

In an example, during a registration procedure for a UE, the AMF may send a Registration Accept message. The Registration Accept message comprise a list of TAIs associated with a registration area and/or a list of allowed network slice. The list of TAIs may comprise a first TA and/or a second TA. The first TA may support a first network slice and/or may not support may support a second network slice. The second TA may not support the first network slice and/or may support the second network slice. The list of allowed network slice may comprise the first network slice and the second network slice. The UE may establish one or more PDU sessions for the one or more network slices in the list of allowed network slices.

In an example, a data for the UE may arrive at a UPF. The UPF may indicate the data arrival to the SMF. The SMF may send an indication of data arrival to the AMF. When the AMF receives the indication of data arrival, the AMF may perform paging procedure for the UE. For example, the AMF may send one or more N2 paging messages to one or more NG-RANs supporting the one or more TAs in the list of TAIs associated with the registration area of the UE. For example, the one or more NG-RANs may comprise one or more first NG-RANs and/or one or more second NG-RANs. The one or more first NG-RANs may support the first network slice and/or may not support the second network slice. The one or more second NG-RANs may not support the first network slice and/or may support the second network slice.

In an example, when the one or more NG-RANs receive the one or more N2 paging messages from the AMF, the one or more NG-RANs may transmit one or more paging messages via one or more cells. The one or more cells may support the one or more TAs in the list of TAIs associated with the registration area of the UE.

In an example, the data arriving at the UPF may be for the second network slice. Based on that the data is for the second network slice, the one or more N2 paging messages may comprise a network service information. The network service information may be information of a network slice associated with the data arrival. Based on the network service information of the one or more N2 paging messages, the one or more NG-RANs may send the one or more paging messages comprising the information of the network service associated with the data arrival. The UE may receive a paging message of the one or more paging messages, via a cell of the one or more first NG-RANs.

In the existing technology, when the UE receives the paging message, the UE may perform the service request procedure. To perform the service request procedure, the UE may establish a RRC connection in the cell of the one or more first NG-RANs. Though the one or more first NG-RANs do not support the second network slice, the UE may send to the cell of the one or more first NG-RANs, a RRC Setup Request message associated with the data arrival. Because the first NG-RAN does not support the second network slice, performing the service request procedure for the data associated with the second network slice may waste radio resources.

In other example, based on that the cell of the one or more first NG-RANs do not support the second network slice associated with the paging message, the UE may determine not to respond to the AMF. If the AMF does not receive a response from the UE, the AMF may determine that the transmission of the one or more paging messages is not successful and/or the AMF may repeat paging procedure. Because the UE received the paging message, repeating the paging procedure causes the AMF to waste signaling resource and/or radio resource.

Example embodiments of the present disclosure improve system efficiency by enhancement in UE's operation. In an example, based on a network service information of a paging message, the UE may perform cell reselection toward a cell supporting a network service of an arrived data. This may reduce service interruption for the UE. In an example, with the network service information, the UE may assist a NG-RAN's operation to hand over the UE to other NG-RAN supporting the network service. In an example, the UE and/or a NG-RAN may assist the AMF to manage network resource efficiently, by delivering information of network service availability. Based on the information of network service availability, the AMF may determine to terminate an ongoing procedure and/or the AMF may reduce waste of signaling resource and/or radio resource, for example, used by unnecessary paging.

Example embodiments of the present disclosure improves user experience of quality of service by reducing time period during which the UE may not send and/or receive data. For example, a network node may provide an information on alternative network slice for a network slice. The UE may use the alternative network slice, when the network slice is not available.

In the specification, a network service may comprise one or more network slices. In an example, a first network service may comprise a first network slice. In an example, a second network service may comprise a second network slice. In an example, Network Service information may comprise one or more identifiers of one or more network services. In an example, the Network Service information may comprise one or more network slice identifiers (e.g., S-NSSAI, NSSAI, etc.) of one or more network slices associated with the network services. In an example, the Network Service information may comprise a first identifier of a first network service and/or a second identifier of a second network service. In an example, the Network Service information may comprise a first network slice identifier of a first network slice associated with the first network service and/or a second network slice identifier of a second network slice associated with the second network service.

In the specification, Network Service information may comprise at least one or more of the following:

Single Network Slice Selection Assistance Information (S-NSSAI): may identify a single network slice.

Network Slice Selection Assistance Information (NS-SAI): may identify a set of one or more S-NSSAI Network Slice Group information: may identify a group of network slices.

Data Network Name: may identify a data network associated with a network slice.

Network Service identifier: may identify a network service. The network service may comprise a network slice. The Network Service Identifier may be an identifier of a network slice.

In the specification, S-NSSAI may comprise at least one of following:

Slice/Service Type (SST): may identify a type of network slice or a type of service supported by the network slice.

Slice Differentiator (SD): may complement the SST to differentiate amongst multiple network slices of the same SST.

In the specification, a term of a NG-RAN may be interpreted as a base station, which may comprise at least one of a gNB, an eNB, a ng-eNB, a NodeB, an access node, an access point, an N3IWF, a relay node, a base station central unit (e.g., gNB-CU), a base station distributed unit (e.g., gNB-DU), and/or the like. In the specification, a term of an AMF may be interpreted as a core network device, which may comprise at least one of a mobility management function/entity, an access management function, and/or the like. In the specification a term of an SMF may be interpreted as a core network device, which may comprise at least one of a session management function/entity, a serving gateway, a PDN gateway, and/or the like.

In the specification, a term of a network node may be interpreted as a core network device, which may comprise at least one of an AMF, a SMF, a NSSF, a UPF, a NRF a UDM, a PCF and/or the like. In the specification, a term of an access node may be interpreted as a base station, which may comprise a NG-RAN, and/or the like. A term of core network may be interpreted as a network node.

In the specification, a term of a PDU session may be interpreted as a packet flow, which may comprise at least one of a QoS flow, a bearer, an EPS bearer, and/or the like.

In the specification, a term Priority Network Slice information may be interpreted as a prioritized network slice. The Priority Network Slice information may use other names of similar purpose. For example, the other names may be prioritized network selection information and/or network slice cell reselection information and/or the like. The Priority Network Slice information may comprise at least one of:

information of a network slice indicated by a paging message.

information of a network slice indicated by a paging message.

a Network Service information.

information of a network slice selected by a UE.

information of a network slice prioritized a UE.

information of a network service selected a UE.

information of a network slice selected by a UE.

information of a network slice associated with a service request procedure.

information of a network slice that a service request procedure may activate.

Figure 18:
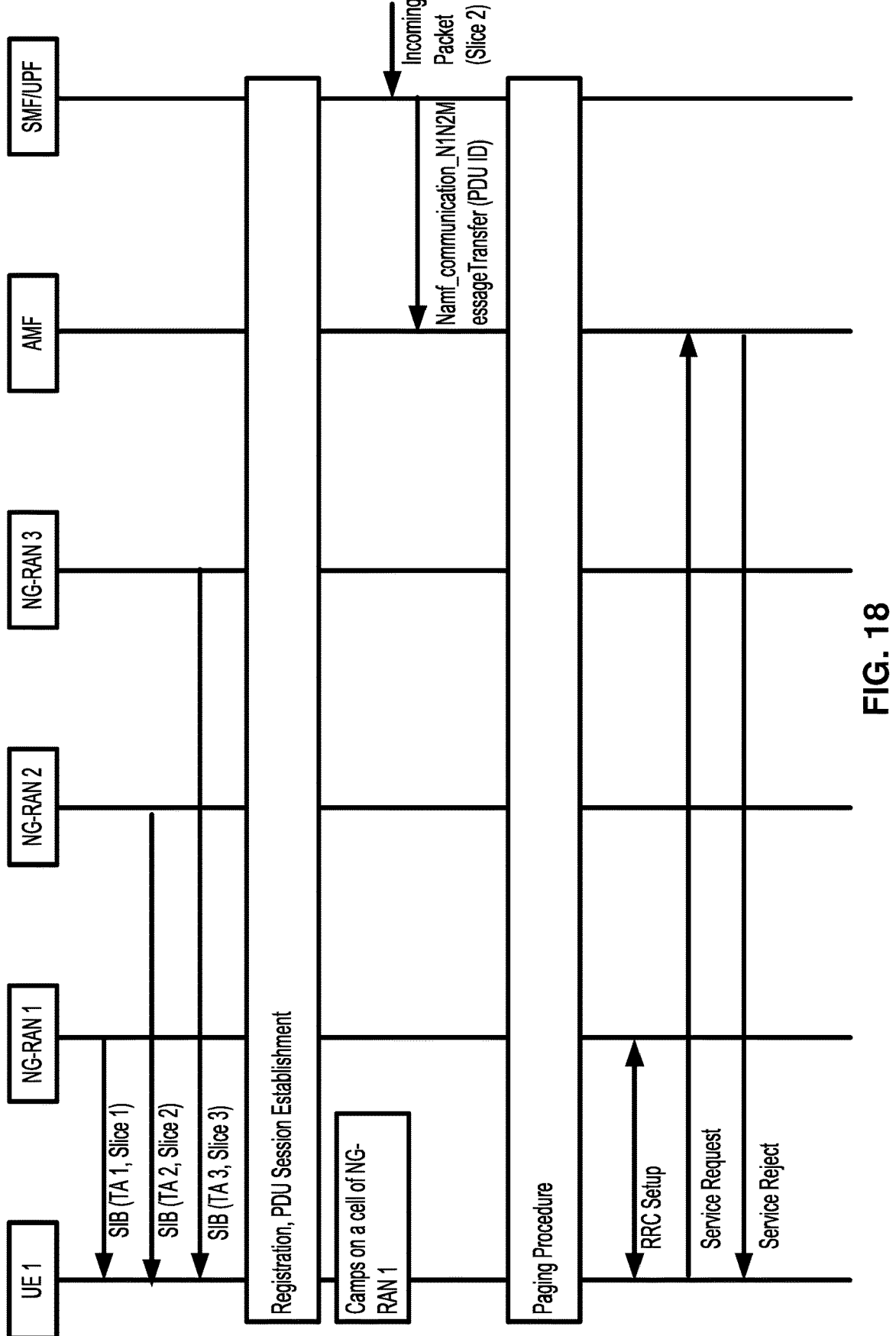
FIG. 18 is a diagram of an aspect of an example embodiment of the present disclosure.

FIG. 18 may depict an example behavior of a UE and a network. The network may comprise one or more NG-RANs and/or may support one or more network slices. The one or more NG-RANs may comprise a first NG-RAN and/or a second NG-RAN and/or a third NG-RAN. The one or more network slices may comprise a first network slice and/or a second network slice and/or a third network slice. The first NG-RAN may comprise a first cell and/or may support a first TA. The first NG-RAN may support a first network slice and/or may not support the second network slice and/or may not support the third network slice. The second NG-RAN may comprise a second cell and/or may support a second TA. The second NG-RAN may not support a first network slice and/or may support the second network slice and/or may not support the third network slice. The third NG-RAN may comprise a third cell and/or may support a third TA. The third NG-RAN may not support a first network slice and/or may not support the second network slice and/or may support the third network slice.

In an example, the UE may register to the network, by sending a Registration Request message to an AMF. The Registration Request message may comprise a list of requested network slices. The list of requested network slices may comprise the first network slice and the second network slice. In response to the Registration Request, the AMF may respond to the UE, by sending Registration Accept message The Registration Accept message may comprise a list of accepted network slices and/or a list of TAIs associated with a registration area. The list of TAIs associated with the registration area may comprise the first TA and/or the second TA. The list of accepted network slices may comprise the first network slice and/or the second network slice.

In an example, based on the received list of allowed network slices, the UE may establish one or more PDU sessions for the one or more network slice. To establish the one or more PDU sessions, the UE may send to the AMF, one or more NAS messages comprising one or more PDU Session Establishment request messages. The one or more PDU Session Establishment request messages may comprise one or more PDU Session IDs and/or information on one or more network slices associated with the one or more PDU sessions. The one or more PDU Session Establishment request message may comprise a first PDU Session Establishment request message and a second PDU Session Establishment request message. The first PDU Session Establishment request message may be associated with a first PDU session for a first network slice. The second PDU Session Establishment request message may be associated with a second PDU session for a second network slice. For the received one or more NAS messages, the AMF may select one or more SMFs for handling the one or more PDU Sessions and/or may send the one or more PDU Session Establishment request messages to the selected one or more SMFs. Based on the one or more PDU Session Establishment request messages, the one or more SMFs may configure network resources for the one or more PDU sessions. The one or more SMFs may invoke one or more a service session request (e.g., Namf_Communication_N1N2MessageTransfer) to the AMF. The one or more service session request (e.g., Namf_Communication_N1N2MessageTransfer) may comprise the one or more PDU Session Establishment accept messages. The AMF may deliver to the UE, one or more NAS messages. Based on the one or more service session request (e.g., Namf_Communication_N1N2MessageTransfer), the AMF may update a UE context data in AMF. After the UE establishes the one or more PDU session, the UE may transit to RRC idle state or RRC inactive state. The UE may camp on the first cell belonging to the first TA. To check whether there is an incoming data for the UE, the UE may monitor a paging channel of the first cell.

In an example, a data for the second PDU session may arrive at a UPF. The UPF may send indication of data arrival to a SMF of the one or more SMFs. The indication of data arrival may be a Data Notification message. In response to the indication, the SMF may send to the UPF, Data Notification Ack message, to acknowledge the reception of Data Notification message. Based on the Data Notification message from the UPF, the SMF may invoke service session request (e.g., Namf_Communication_N1N2MessageTransfer) to the AMF, to inform the data arrival for the UE. The service session request (e.g., Namf_Communication_N1N2MessageTransfer) message may comprise at least one of SUPI and/or PDU Session ID and/or N1 SM container and/or N2 SM information (QFI(s), QoS profile(s), CN N3 Tunnel Info, S-NSSAI) and/or Paging Policy Indicator and/or 5QI and/or N1N2TransferFailure Notification Target Address. The SUPI may identify the UE associated with the arrived data. The PDU Session ID may identify the PDU session associated with the arrived data. The N1 SM Container may include a message which the SMF sends to UE to control the PDU session. The N1 SM Container may be a message between the SMF and the UE using Session Management layer protocol. The AMF may not decode the N1 SM Container. The N2 SM information may include a message which the SMF sends to NG-RAN to control the N3 interface. The N2 SM Container may be a message between the SMF and the NG-RAN, and the AMF may not decode the N2 SM information. The Paging Policy Indicator may identify which paging policy may be applied. For example, the paging policy may indicate how fast paging repetition is performed if there is no response from the UE. The N1N2TransferFailre Notification Target Address may indicate where the AMF contacts if a procedure based on the service session request fails.

In an example, when the AMF receives the service session request from the SMF, the AMF may identify the Network Service information associated with the service session request. The Network Service information may comprise at least one of:

information on the network service associated with the service session request.

information on the network slice associated with the service session request.

information on the group of network slices associated with the service session request.

In an example, when the AMF receives the service session request (e.g., Namf_Communication_N1N2MessageTransfer) from the SMF, the AMF may identify one or more TAs in the list of TAIs associated with the registration area for the UE. Based on the identified one or more TAs in the list of TAIs, the AMF may send one or more N2 Paging messages to the one or more NG-RANs supporting the one or more TAs. The one or more N2 Paging messages may comprise NAS ID for paging and/or Registration Area list and/or Paging DRX length and/or Paging Priority and/or access associated to the PDU Session and/or Network Service information. The NAS ID for paging may indicate the identity of the UE for which the data arrival is associated. The Paging DRX length may indicate the interval with which the UE monitors paging channel over Uu interface. The Paging Priority may indicate whether a paging for the UE may be prioritized than a paging for other UEs. The access associated to the PDU session may indicate where the UE may use 3GPP access or Non-3GPP access when the UE responds to the paging. The Network Service information may indicate the identified network service and/or network slice associated with the data arrival. The Registration Area list may indicate the list of TAIs associated with the registration area.

In an example, when the one or more NG-RANs receives the one or more N2 Paging messages, the one or more NG-RANs may send one or more paging messages in cells supporting the one or more TAs indicated by the Registration Area list. In an example, the one or more NG-RANs may send one or more paging messages in cells supporting the network slice indicated by the Network Service information.

In an example, the UE may receive a paging message of the one or more paging messages, via the first cell where the UE camps on. The UE may trigger service request procedure to respond to the received paging message via the first cell. In an example, the first cell may not support the second network slice associated with the data arriving at the UPF. For example, the first NG-RAN associated with the first cell may not support a radio resource to deliver the data arriving at the UPF. For the service request procedure, the UE may establish a RRC connection with the first NG-RAN. Via the established RRC connection, the UE may send a service request message to the AMF. For the received service request message, based on that the first cell of the first NG-RAN does not support the second network slice, the AMF may reject the service request from the UE. Because the first cell does not support the second network slice and the data arriving at the UPF is for the second network slice, the UE cannot receive the data via the first cell. The establishment of the RRC connection with NG-RAN not supporting the network slice may cause waste of signaling resource and the network resources.

Figure 19:
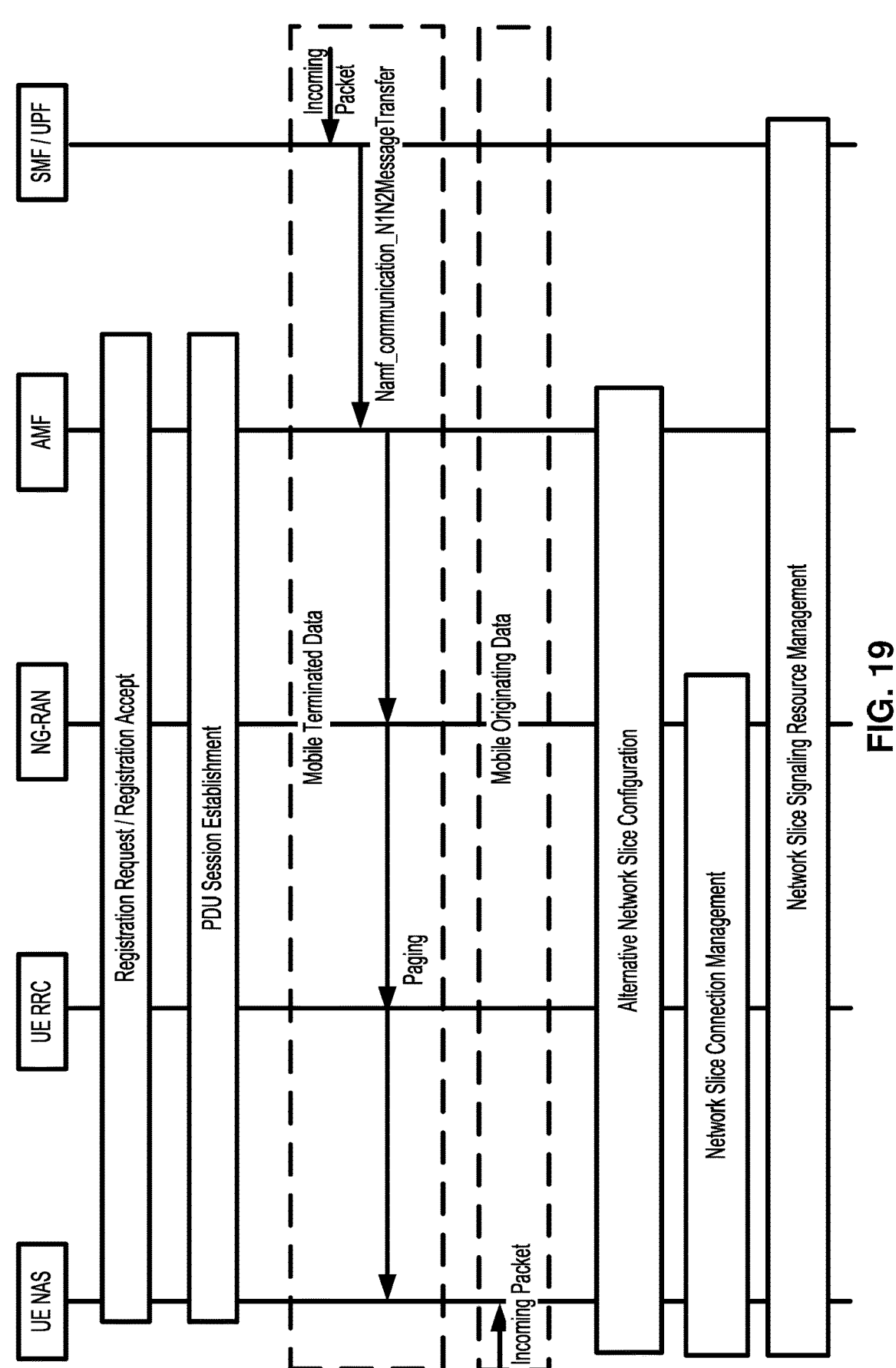
FIG. 19 is a diagram of an aspect of an example embodiment of the present disclosure.

FIG. 19 may depict example embodiments of the present disclosure.

In an example, a UE may initiate a registration procedure to a network, by sending a Registration Request message. The Registration Request message may comprise a list of requested network slices, which may indicate one or more network slices which the UE may use. After the AMF receives the Registration Request message, the AMF may respond to the UE by sending a Registration Accept message. The Registration Accept message may comprise a list of allowed network slices.

In an example, after receiving the list of allowed network slices, the UE may trigger establishment of one or more PDU sessions for the one or more network slices in the list of allowed network slices. To establish the one or more PDU sessions, the UE may send to the AMF, one or more NAS messages. The one or more NAS messages may comprise one or more S-NSSAIs, one or more UE Requested DNNs, one or more PDU Session IDs, one or more N1 SM Containers. The one or more S-NSSAIs may indicate the one or more network slices within which the one or more PDU sessions are established. The one or more UE Requested DNNs may identify the one or more data networks to which the one or more PDU sessions are connected. The one or more PDU Session IDs may identify the one or more PDU sessions which are to be established. The one or more N1 SM Containers may comprise one or more PDU Session Establishment Request messages. The one or more PDU Session Establishment Request messages may be one or more messages between the UE and one or more SMF. When the AMF receives the one or more NAS messages from the UE, the AMF may deliver to the one or more SMFs, the one or more N1 SM Containers of the one or more NAS messages. Based on the one or more PDU Session Establishment Request messages of the one or more N1 SM Containers, the one or more SMFs may perform network resource configuration for the one or more PDU sessions. The one or more SMFs may construct one or more PDU Session Establishment Accept messages. The one or more SMFs may trigger one or more service session request (e.g., Namf_Communication_N1N2MessageTransfer) toward the AMF. The one or more service session request (e.g., Namf_Communication_N1N2MessageTransfer) may comprise the one or more PDU Session IDs and/or one or more N2 SM Information and/or one or more N1 SM Containers. The one or more N1 SM Containers may comprise the one or more PDU Session Establishment Accept messages. The one or more N2 SM Information may comprise information for setting up one or more N3 interface. The AMF may not process the information in the one or more N2 SM information and/or the one or more N1 SM Containers.

When the AMF receives the one or more service session request (e.g., Namf_Communication_N1N2MessageTransfer) from the one or more SMF, the AMF may send to UE, one or more NAS message comprising the one or more N1 SM Containers. Based on the one or more service session request (e.g., Namf_Communication_N1N2MessageTransfer) from the one or more SMF, the AMF may update the UE Context in AMF data, by storing information related to the one or more PDU sessions. For example, the AMF may store the one or more PDU session IDs and/or related one or more information on the network slices associated with the one or more the PDU sessions. When the UE establishes the one or more PDU session by receiving the one or more NAS messages, the UE may transit to RRC idle state or RRC inactive state. The UE may camp on a cell. To check whether there is an incoming data for the UE, the UE may monitor a paging channel of the cell.

In an example, when the one or more PDU sessions are established for the UE, new data for the UE may arrive at a UPF and/or new data may be generated by the UE.

In an example, a data may arrive at the UPF. The UPF may send Data Notification to a SMF. Based on the Data Notification, the SMF may invoke service session request (e.g., Namf_Communication_N1N2MessageTransfer) to the AMF to indicate the data arrival for the UE. The service session request (e.g., Namf_Communication_N1N2MessageTransfer) may comprise a PDU session ID associated with the arrived data at the UPF. For the received service session request from SMF, the AMF may determine the Network Service information based on the PDU session ID of the service session request. For example, the AMF may use the UE context in AMF data, to determine the Network Service information associated with the PDU session. The UE context in AMF data may comprise at least one of an identity of the UE and/or information of one or more established PDU sessions and/or information of one or more network slices for the one or more PDU sessions. Based on the UE context in AMF data, the AMF may map the PDU Session ID included in the service session request to Network Service information. The Network Service information may comprise information on a network slice. For the indication of data arrival from the SMF, the AMF may send one or more N2 paging messages to NG-RANs supporting the one or more TAs in a list of TAIs associated with a registration area for the UE. The one or more N2 paging messages may comprise the Network Service information. Based on the one or more N2 paging messages, the one or more NG-RANs may transmit one or more paging messages via one or more cells supporting the one or more TAs in the list of TAIs. The one or more paging messages may comprise the Network Service information.

In an example, the UE may receive a paging message of the one or more paging messages, via a cell of the one or more cells. If the UE receives the paging message comprising the identity of the UE, the UE may determine whether to respond to the paging message or not, based on the Network Service information. When the UE determines to respond to the paging message, it may trigger a service request procedure.

In another example, the UE may receive a data from an application or an upper layer of the UE. For the received data, the UE may determine whether to send the data to the network or not. If the UE determines to send the data to the network, the UE may trigger a service request procedure.

In an example, when the UE triggers the service request procedure, the UE may determine whether a network slice associated with the service request procedure is supported in the cell where the UE is located.

In an example, if the network slice is not supported in the cell, the UE may determine to use an alternative network slice for the network slice. For example, the network may configure the UE with information on the alternative network slice for the UE, during a registration update procedure and/or PDU session establishment procedure and/or UE configuration update procedure and/or a paging procedure. When the UE is configured with the alternative network slice, the UE may transmit and receive the data via the alternative network slice.

In another example, when the network slice associated with the data is not supported in the cell, the UE may perform cell reselection toward a cell supporting the network slice. For the cell reselection, a NAS entity of the UE may indicate to a RRC entity of the UE, information of the network slice. The information of the network slice may be Network Service information. The RRC entity may perform the cell reselection, based on the information of the network slice.

In other example, when the network slice associated with the data is not supported in the cell, the UE may indicate to a NG-RAN, the network slice associated with the data. For example, during RRC connection establishment, the UE may send Network Service information to the NG-RAN. The Network Service information may comprise information on the network slice associated with the data. Based on the Network Service information, the NG-RAN may perform a procedure to hand over the UE to a cell supporting the network slice.

In an example, for the triggered service request procedure, the UE may establish a connection with a network. For the establishment of the connection, the UE may indicate the Network Service information to a NG-RAN and/or a core network. For example, based on the Network Service information, the NG-RAN and/or the core network may perform a procedure to provide the UE, with the network slice associated with the data and/or with the PDU session associated with the data. For example, the NG-RAN and/or the core network may perform a procedure to deactivate a PDU session not associated with the data and/or may perform a procedure to deactivate a network slice not associated with the data and/or may perform a procedure to deactivate a PDU session of a network slice not compatible with the network slice associated with the triggered service request procedure. For example, if a first network slice and a second network slice cannot be simultaneously provided to the UE, the first network slice may not be compatible with the second network slice. If the network slice associated with the service request procedure cannot be provided to the UE, the network may perform a procedure to terminate an ongoing procedure associated with the data.

Figure 20:
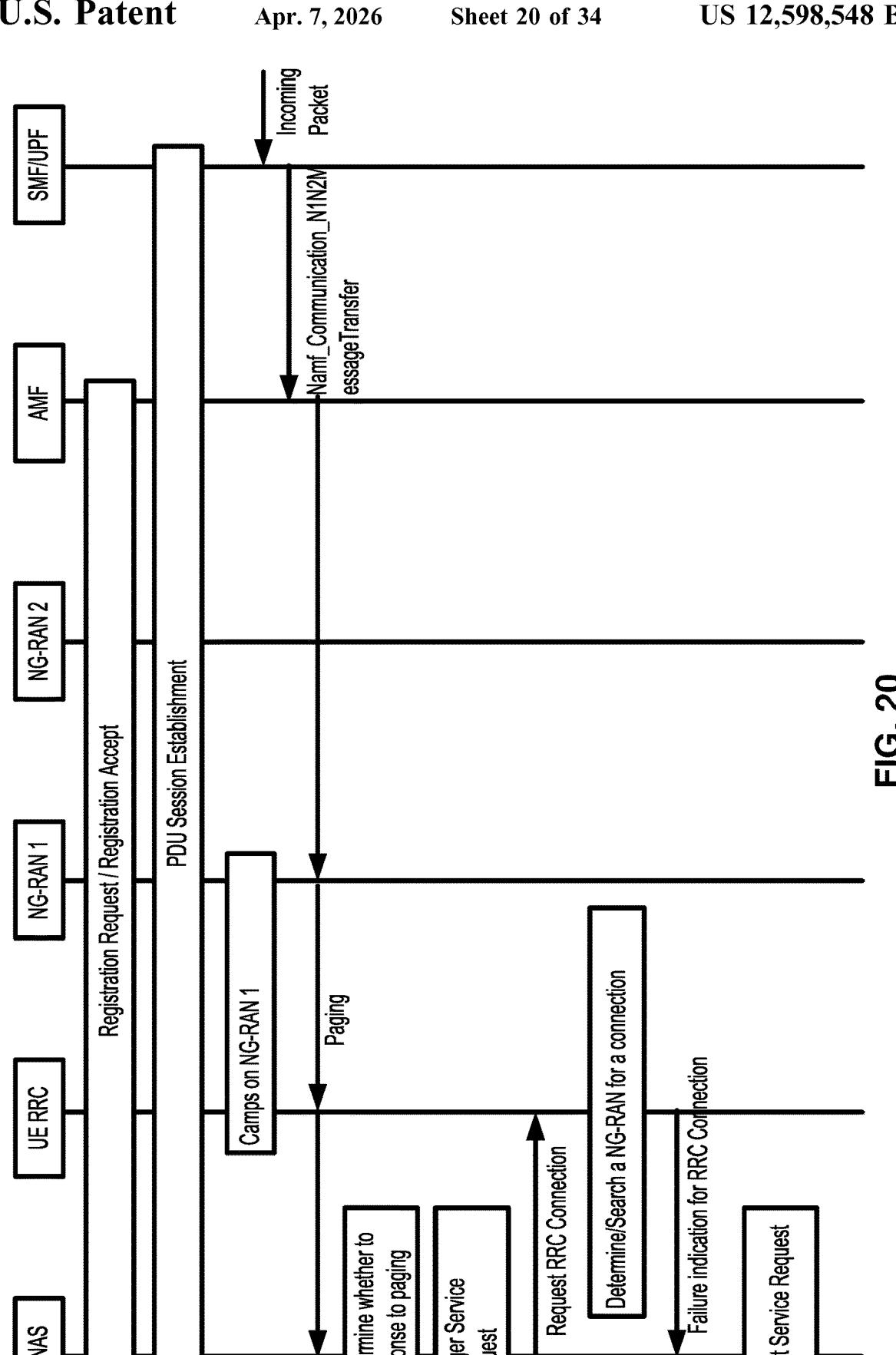
FIG. 20 is a diagram of an aspect of an example embodiment of the present disclosure.

FIG. 20 may depict an example procedure for a data arriving at a UPF in accordance with embodiments of the present disclosure. If a UE receives a paging message from a cell, the UE may trigger a service request procedure to respond to the received paging message. If cell-reselection to a cell supporting a network slice associated with the paging message fails, the UE may terminate the triggered service request procedure.

In an example depicted in FIG. 20, a first NG-RAN may support a first network slice and/or may not support a second network slice and/or may support a first TA and/or may not support a second TA. A second NG-RAN may not support the first network slice and/or may support the second network slice and/or may not support a first TA and/or may support a second TA. A UE may send a registration request message to an AMF. The registration request message may comprise a list of requested network slices. The list of requested network slices may comprise the first network slice and/or the second network slice. When the AMF receives the registration request message, the AMF may respond to the UE with a registration accept message. The registration accept message may comprise a list of accepted network slices and/or a list of TAI associated with a registration area for UE. The list of accept network slices may comprise the first network slice and the second network slice. The list of TAI associated with the registration area for UE may comprise the first TA and the second TA. The UE may receive the registration accept message from the AMF.

In an example, based on the list of the accepted network slices of the registration accept message, the UE may establish one or more PDU sessions for the one or more network slices in the list of accepted network slices. The one or more PDU sessions may comprise a first PDU session and a second PDU session. The first PDU session may be for the first network slice and/or the second PDU session may be for the second network slice. After the UE establishes the one or more PDU sessions, the UE may transit to RRC Idle state or RRC Inactive state. In RRC idle state or RRC inactive state, the UE may camp on a cell of the first NG-RAN. For example, the UE may camp on the cell of the first NG-RAN, based on that the radio signal quality of the cell of first NG-RAN is better than the radio signal quality of a cell of the second NG-RAN.

In an example, if a data arrives at the UPF, the UPF may send Data Notification to a SMF. Based on the Data Notification, the SMF may invoke service session request (e.g., Namf_Communication_N1N2MessageTransfer) to the AMF, to indicate the data arrival for the UE. When the AMF receives the service session request, the AMF may send one or more N2 paging messages to the one or more NG-RANs. The one or more NG-RANs may support the one or more TAs in the list of TAI associated with the registration area for the UE. The one or more N2 Paging messages may comprise Network Service information and identity of the UE. The Network Service information may comprise information of a network service associated with the data arrival and/or information of a network slice associated with the data arrival. When the one or more NG-RANs receive the one or more N2 paging messages from the AMF, the one or more NG-RANs may send one or more paging messages over one or more cells supporting the one or more TAs. The one or more paging messages may comprise the Network Service information and/or the identity of the UE.

In an example, if a RRC entity of the UE receives a paging message of the one or more paging messages, the RRC entity may check whether the identity of the UE matches the identity included of the paging message. If there is a match, the RRC entity may deliver paging information in the paging message to a NAS entity of the UE. The paging information may comprise the identity of the UE and/or the Network Service information.

In an example, if the NAS entity of the UE receives the paging information from the RRC entity, the NAS entity may determine whether the UE needs to respond to paging or not. For example, the NAS may determine whether to respond to the paging or not, based on information related to slice selection. The information related to the slice selection may comprise at least one of the Network Service information and/or information of the one or more established PDU sessions and/or information of the list of allowed network slices and/or information of the one or more network slices for which the one or more PDU sessions are established and/or information of priority among the one or more network slices and/or information of priority among the one or more established PDU sessions and/or information of priority selected by a user. For example, the NAS entity of the UE may determine to respond to the paging, if the priority of the PDU session associated with the paging is higher than the priority of one or more other established PDU sessions. For example, the NAS entity of the UE may determine to respond to the paging, if the priority of network slice associated with the paging is higher than the priority of other one or more allowed network slices. For example, the NAS entity of the UE may determine to respond to the paging, if the user determines to respond to the paging.

In an example, if the NAS entity determines to respond to the paging, the NAS entity may trigger a service request procedure. For the triggered service request procedure, the NAS entity may request the RRC entity, to establish a RRC connection. When the NAS entity requests the RRC entity to establish the RRC connection, the NAS entity may deliver a Priority Network Slice information.

The Priority Network Slice information may use other names of similar purpose. For example, the other names may comprise prioritized network selection information and/or network slice cell reselection information and/or the like. The Priority Network Slice information may comprise information of the network slice indicated by the paging message and/or information of the network slice indicated by the paging message and/or the Network Service information and/or information of network slice selected by the NAS entity and/or information of the network slice prioritized by the NAS entity and/or information of a network service selected by the NAS entity and/or information on a network slice selected by the NAS entity and/or information of the network slice associated with the service request procedure and/or information of the network slice that the service request procedure may activate.

In an example, if the RRC entity receives the request for a RRC connection from the NAS entity, the RRC entity may perform cell reselection procedure. For example, if the RRC entity receives from the NAS entity, the Priority Network Slice information, the RRC entity may determine whether the cell where the UE camps support the network slice indicated by the Priority Network Slice information. To determine whether the cell on which the UE camps support the network slice indicated by the Priority Network Slice information, the UE may receive a SIB from the cell. The SIB may comprise information on one or more network slices supported by the cell and/or information on group of network slices supported by the cell. Based on the SIB, the UE may determine whether the network slice indicated by the Priority Network Slice information is supported by the cell. If the cell does not support the network slice indicated by the Priority Network Slice information, the RRC entity may trigger cell reselection procedure. The RRC entity may search for one or more neighboring cells and may identity one or more network slices supported by the one or more neighboring cells. The RRC entity of the UE may rank the one or more neighboring cells supporting the network slice of the Priority Network Slice information. For the ranking of the one or more neighboring cells, the RRC may not consider one or more cells not supporting the Priority Network Slice information. For the ranking of the one or more neighboring cells, the RRC may not consider one or more cells that do not meet signal quality requirement. The signal quality requirement may be that a signal quality such as Reference Signals Received Power (RSRP) and Reference Signal Received Quality (RSRQ) is beyond a level to support a communication between a cell and a UE.

In an example, if the RRC entity fails to find a cell supporting the network slice indicated by the Priority Network Slice information, among the one or more neighboring cells, the UE may determine that the cell reselection procedure fails. For example, if the RRC entity fails to find a cell supporting the network slice indicated by the Priority Network Slice information in a certain time period, the UE may determine that the cell reselection procedure fails. The time period may be configured in the UE by the network. For example, if there is no neighboring cells to rank, the UE may determine that the cell reselection procedure fails.

In an example, if the UE determine that the cell reselection procedure fails, the RRC entity may indicate to the NAS entity that the establishment of RRC connection fails. In an example, if the UE determine that the cell reselection procedure fails, and if there is no received Priority Network Slice information from the NAS entity, the RRC entity may not indicate to the NAS entity that the establishment of RRC connection fails. When the RRC entity indicates to the NAS that the establishment of RRC connection fails, the RRC entity may indicate to the NAS entity, the cause of failure. The cause of failure may comprise information that no cell supporting the network slice of the Priority Network Slice information is available. If the UE determines that the cell reselection procedure fails, the RRC entity may terminate RRC setup procedure.

If the NAS entity receives the indication from the RRC entity that the establishment of RRC connection fails, the NAS entity may terminate the triggered service request procedure. The NAS entity may indicate failure of data service to the application or the user. The NAS entity may indicate failure of a data service to a core network.

Figure 21:
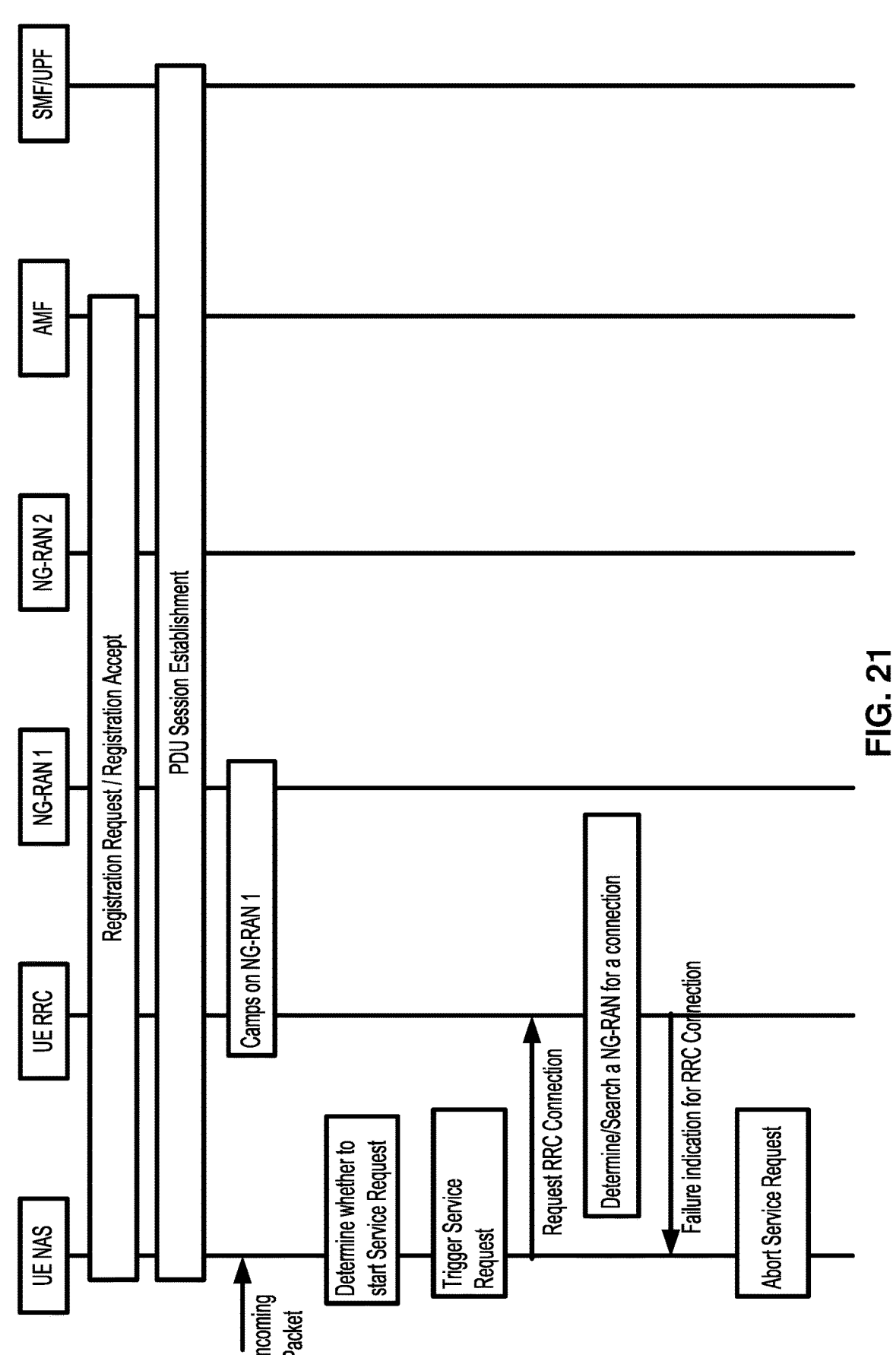
FIG. 21 is a diagram of an aspect of an example embodiment of the present disclosure.

FIG. 21 may depict an example procedure for a data arriving at the UE, from an application or a user in accordance with embodiments of the present disclosure.

In an example, a first NG-RAN may support a first network slice and/or may not support a second network slice and/or may support a first TA and/or may not support a second TA. A second NG-RAN may not support the first network slice and/or may support the second network slice and/or may not support a first TA and/or may support a second TA. A UE may send a registration request message to an AMF. The registration request message may comprise a list of requested network slices. The list of requested network slices may comprise the first network slice and/or the second network slice. When the AMF receives the registration request message, the AMF may respond to the UE with a registration accept message. The registration accept message may comprise a list of accepted network slices and/or a list of TAI associated with a registration area for UE. The list of accept network slices may comprise the first network slice and the second network slice. The list of TAI associated with the registration area for UE may comprise the first TA and the second TA. The UE may receive the registration accept message from the AMF.

In an example, based on the list of the accepted network slices of the registration accept message, the UE may establish one or more PDU sessions for the one or more network slices in the list of accepted network slices. The one or more PDU sessions may comprise a first PDU session and a second PDU session. The first PDU session may be for the first network slice and/or the second PDU session may be for the second network slice. After the UE establishes the one or more PDU sessions, the UE may transit to RRC Idle state or RRC Inactive state. In RRC idle state or RRC inactive state, the UE may camp on a cell of the first NG-RAN. For example, the UE may camp on the cell of the first NG-RAN, based on that the radio signal quality of the cell of first NG-RAN is better than the radio signal quality of a cell of the second NG-RAN.

In an example, if the UE receives a data from a user or from an application, a NAS entity of the UE may determine whether to trigger a service request procedure or not, based on at least one of Network Service information and/or information related to the slice selection. The information related to the slice selection may comprise at least one of information of one or more established PDU sessions and/or information of the list of allowed network slices and/or information of the one or more network slices for which the one or more PDU sessions are established and/or information of priority among the one or more network slices and/or information of priority among the one or more established PDU sessions and/or information of priority selected by a user. For example, the NAS entity may determine to trigger a service request procedure, if the priority of the data is high. For example, the NAS entity may determine to trigger a service request procedure, if the priority of network slice associated with the data is higher than the priority of other network slices. For example, the NAS entity may determine to trigger a service request procedure, if the user determines to send the data.

When the NAS entity determines to trigger a service request procedure, the NAS entity may request the RRC entity, to establish a RRC connection. When the NAS entity requests the RRC entity to establish a RRC connection, the NAS entity may deliver a Priority Network Slice information.

In an example, if the RRC entity receives the request for a RRC connection from the NAS entity, the RRC entity may perform cell reselection procedure. For example, if the RRC entity receives from the NAS entity, the Priority Network Slice information, the RRC entity may determine whether the cell where the UE camps support the network slice indicated by the Priority Network Slice information. To determine whether the cell on which the UE camps support the network slice indicated by the Priority Network Slice information, the UE may receive a SIB from the cell. The SIB may comprise information on one or more network slices supported by the cell and/or information on group of network slices supported by the cell. Based on the SIB, the UE may determine whether the network slice indicated by the Priority Network Slice information is supported by the cell. If the cell does not support the network slice indicated by the Priority Network Slice information, the RRC entity may trigger cell reselection procedure. The RRC entity may search for one or more neighboring cells and may identity one or more network slices supported by the one or more neighboring cells. The RRC entity of the UE may rank the one or more neighboring cells supporting the network slice of the Priority Network Slice information. For the ranking of the one or more neighboring cells, the RRC may not consider one or more cells not supporting the Priority Network Slice information. For the ranking of the one or more neighboring cells, the RRC may not consider one or more cells that do not meet signal quality requirement. The signal quality requirement may be that a signal quality such as Reference Signals Received Power (RSRP) and Reference Signal Received Quality (RSRQ) is beyond a level to support a communication between a cell and a UE.

In an example, if the RRC entity fails to find a cell supporting the network slice indicated by the Priority Network Slice information, among the one or more neighboring cells, the UE may determine that the cell reselection procedure fails. For example, if the RRC entity fails to find a cell supporting the network slice indicated by the Priority Network Slice information in a certain time period, the UE may determine that the cell reselection procedure fails. The time period may be configured in the UE by the network. For example, if there is no neighboring cells to rank, the UE may determine that the cell reselection procedure fails.

In an example, if the UE determine that the cell reselection procedure fails, the RRC entity may indicate to the NAS entity that the establishment of RRC connection fails. In an example, if the UE determine that the cell reselection procedure fails, and if there is no received Priority Network Slice information from the NAS entity, the RRC entity may not indicate to the NAS entity that the establishment of RRC connection fails. When the RRC entity indicates to the NAS that the establishment of RRC connection fails, the RRC entity may indicate to the NAS entity, the cause of failure. The cause of failure may comprise information that no cell supporting the network slice of the Priority Network Slice information is available. If the UE determines that the cell reselection procedure fails, the RRC entity may terminate RRC setup procedure.

If the NAS entity receives the indication from the RRC entity that the establishment of RRC connection fails, the NAS entity may terminate the triggered service request procedure. The NAS entity may indicate failure of data service to the application or the user. The NAS entity may indicate failure of a data service to a core network.

Figure 22:
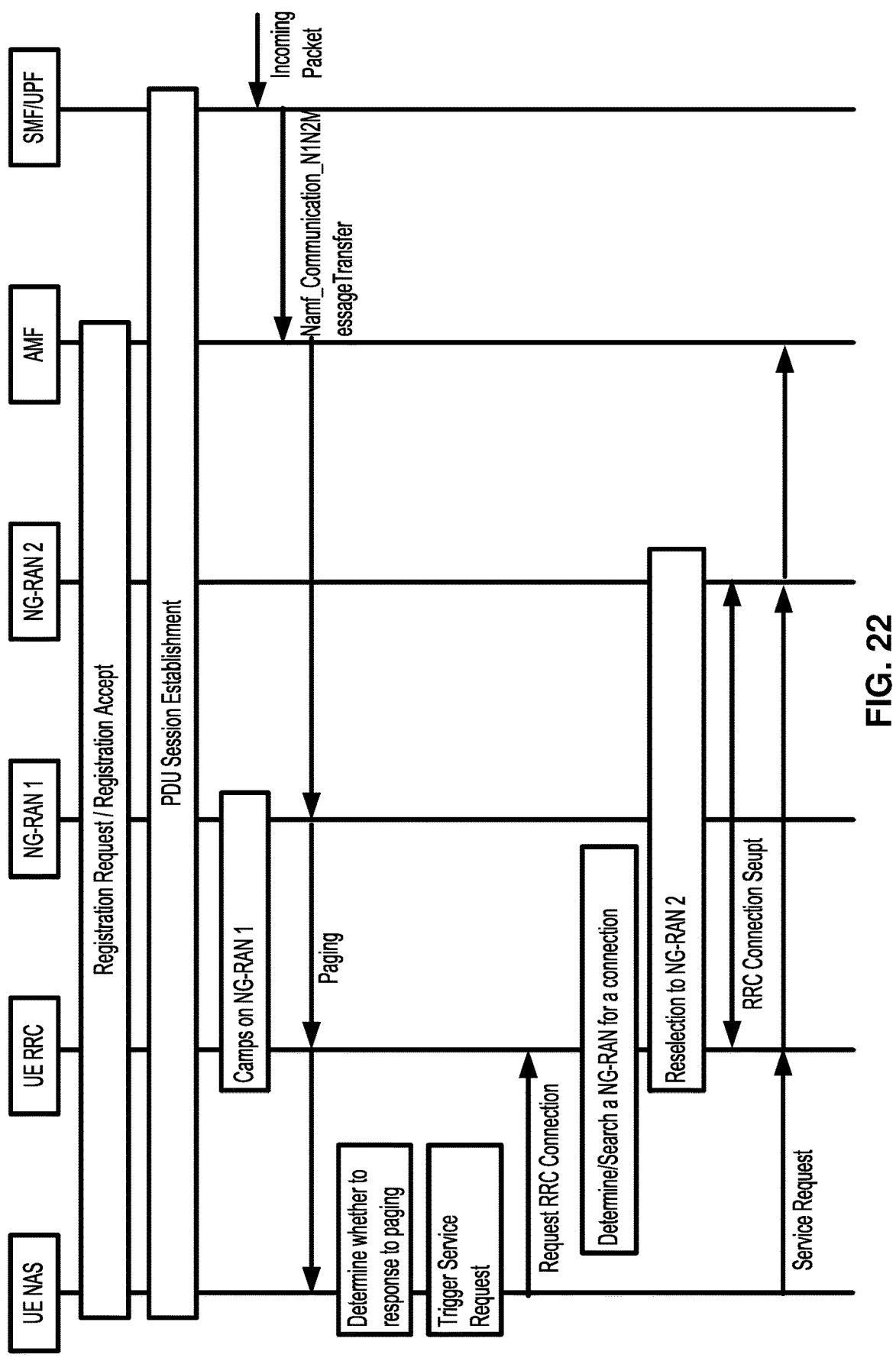
FIG. 22 is a diagram of an aspect of an example embodiment of the present disclosure.

FIG. 22 may depict an example procedure for a data arriving at a UPF in accordance with embodiments of the present disclosure.

In an example, a first NG-RAN may support a first network slice and/or may not support a second network slice and/or may support a first TA and/or may not support a second TA. A second NG-RAN may not support the first network slice and/or may support the second network slice and/or may not support a first TA and/or may support a second TA. A UE may send a registration request message to an AMF. The registration request message may comprise a list of requested network slices. The list of requested network slices may comprise the first network slice and/or the second network slice. When the AMF receives the registration request message, the AMF may respond to the UE with a registration accept message. The registration accept message may comprise a list of accepted network slices and/or a list of TAI associated with a registration area for UE. The list of accept network slices may comprise the first network slice and the second network slice. The list of TAI associated with the registration area for UE may comprise the first TA and the second TA. The UE may receive the registration accept message from the AMF.

In an example, based on the list of the accepted network slices of the registration accept message, the UE may establish one or more PDU sessions for the one or more network slices in the list of accepted network slices. The one or more PDU sessions may comprise a first PDU session and a second PDU session. The first PDU session may be for the first network slice and/or the second PDU session may be for the second network slice. After the UE establishes the one or more PDU sessions, the UE may transit to RRC Idle state or RRC Inactive state. In RRC idle state or RRC inactive state, the UE may camp on a cell of the first NG-RAN. For example, the UE may camp on the cell of the first NG-RAN, based on that the radio signal quality of the cell of first NG-RAN is better than the radio signal quality of a cell of the second NG-RAN.

In an example, if a data arrives at the UPF, the UPF may send Data Notification to a SMF. Based on the Data Notification, the SMF may invoke service session request (e.g., Namf_Communication_N1N2MessageTransfer) to the AMF, to indicate the data arrival for the UE. When the AMF receives the service session request, the AMF may send one or more N2 paging messages to the one or more NG-RANs. The one or more NG-RANs may support the one or more TAs in the list of TAI associated with the registration area for the UE. The one or more N2 Paging messages may comprise Network Service information and identity of the UE. The Network Service information may comprise information of a network service associated with the data arrival and/or information of a network slice associated with the data arrival. When the one or more NG-RANs receive the one or more N2 paging messages from the AMF, the one or more NG-RANs may send one or more paging messages over one or more cells supporting the one or more TAs. The one or more paging messages may comprise the Network Service information and/or the identity of the UE.

In an example, if a RRC entity of the UE receives a paging message of the one or more paging messages, the RRC entity may check whether the identity of the UE matches the identity included of the paging message. If there is a match, the RRC entity may deliver paging information in the paging message to a NAS entity of the UE. The paging information may comprise the identity of the UE and/or the Network Service information.

In an example, if the NAS entity of the UE receives the paging information from the RRC entity, the NAS entity may determine whether the UE needs to respond to paging or not. For example, the NAS may determine whether to respond to the paging or not, based on information related to slice selection. The information related to the slice selection may comprise at least one of the Network Service information and/or information of the one or more established PDU sessions and/or information of the list of allowed network slices and/or information of the one or more network slices for which the one or more PDU sessions are established and/or information of priority among the one or more network slices and/or information of priority among the one or more established PDU sessions and/or information of priority selected by a user. For example, the NAS entity of the UE may determine to respond to the paging, if the priority of the PDU session associated with the paging is higher than the priority of one or more other established PDU sessions. For example, the NAS entity of the UE may determine to respond to the paging, if the priority of network slice associated with the paging is higher than the priority of other one or more allowed network slices. For example, the NAS entity of the UE may determine to respond to the paging, if the user determines to respond to the paging.

In an example, if the NAS entity determines to respond to the paging, the NAS entity may trigger a service request procedure. For the triggered service request procedure, the NAS entity may request the RRC entity, to establish a RRC connection. When the NAS entity requests the RRC entity to establish the RRC connection, the NAS entity may deliver a Priority Network Slice information.

The Priority Network Slice information may use other names of similar purpose. For example, the other names may comprise prioritized network selection information and/or network slice cell reselection information and/or the like. The Priority Network Slice information may comprise information of the network slice indicated by the paging message and/or information of the network slice indicated by the paging message and/or the Network Service information and/or information of network slice selected by the NAS entity and/or information of the network slice prioritized by the NAS entity and/or information of a network service selected by the NAS entity and/or information on a network slice selected by the NAS entity and/or information of the network slice associated with the service request procedure and/or information of the network slice that the service request procedure may activate.

In an example, if the RRC entity receives the request for a RRC connection from the NAS entity, the RRC entity may perform cell reselection procedure. For example, if the RRC entity receives from the NAS entity, the Priority Network Slice information, the RRC entity may determine whether the cell where the UE camps support the network slice indicated by the Priority Network Slice information. To determine whether the cell on which the UE camps support the network slice indicated by the Priority Network Slice information, the UE may receive a SIB from the cell. The SIB may comprise information on one or more network slices supported by the cell and/or information on group of network slices supported by the cell. Based on the SIB, the UE may determine whether the network slice indicated by the Priority Network Slice information is supported by the cell. If the cell does not support the network slice indicated by the Priority Network Slice information, the RRC entity may trigger cell reselection procedure. The RRC entity may search for one or more neighboring cells and may identity one or more network slices supported by the one or more neighboring cells. The RRC entity of the UE may rank the one or more neighboring cells supporting the network slice of the Priority Network Slice information. For the ranking of the one or more neighboring cells, the RRC may not consider one or more cells not supporting the Priority Network Slice information. For the ranking of the one or more neighboring cells, the RRC may not consider one or more cells that do not meet signal quality requirement. The signal quality requirement may be that a signal quality such as Reference Signals Received Power (RSRP) and Reference Signal Received Quality (RSRQ) is beyond a level to support a communication between a cell and a UE.

If at least one of the ranked cells supports the network slice indicated by the Priority Network Slice information and if the at least one of the ranked cells meets the signal quality requirement, the at least one of the ranked cells may be a target cell. The RRC entity of the UE may reselect to the target cell. For example, the target cell may be one of cells of the second NG-RAN. When the UE reselects to the target cell, the UE may send a RRC Setup Request message to the target cell, to establish a RRC connection. After the RRC connection is established between the UE and the second NG-RAN, the UE may send a service request message to the AMF via the second NG-RAN.

Figure 23:
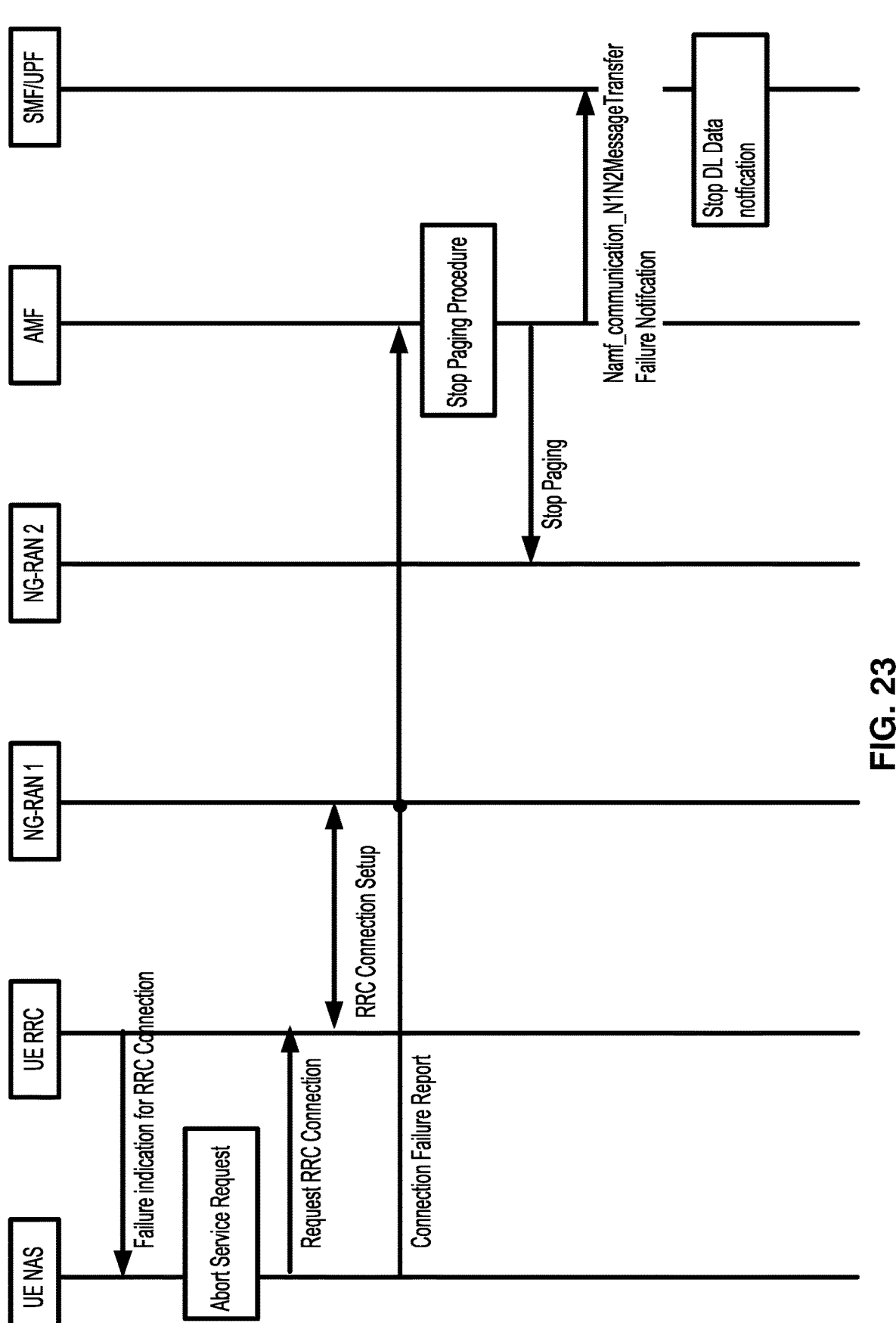
FIG. 23 is a diagram of an aspect of an example embodiment of the present disclosure.

FIG. 23 may depict example embodiments of the present disclosure.

If a NAS entity of a UE is notified of a paging, the NAS entity of the UE may request a RRC entity of the UE to establish a RRC connection. As depicted in the example of FIG. 20 and/or FIG. 20, the NAS entity may receive from the RRC entity, an indication that establishment of RRC connection fails. After receiving the indication that establishment of RRC connection fails, the NAS entity may terminate a triggered service request procedure. If the UE does not send a response to a paging, a network may consider that a paging procedure is unsuccessful, and the network may trigger another paging procedure. This may cause unnecessary waste of network resources. The example embodiment depicted in FIG. 23 may enable efficient use of network resources, by assisting the network to understand condition of the UE.

As depicted in the example of FIG. 20 and/or FIG. 21, the NAS entity may receive from the RRC entity, the indication that establishment of RRC connection fails. For example, the RRC entity may indicate to the NAS entity, a failure of establishing RRC connection to a cell supporting a network slice indicated by a Priority Network Slice information. After receiving the indication, the NAS entity may terminate a triggered service request procedure and/or may perform a procedure to indicate to the network, a failure related to a network service.

In an example, for the procedure to indicate the failure related to the network service, the NAS entity may request the RRC entity to establish a RRC connection. Based on that the RRC connection is required to report the failure, the NAS may not deliver to the RRC entity with Priority Network Slice information. If the RRC entity receives a request for a RRC connection from the NAS entity without Priority Network Slice information, the RRC entity may send RRC Setup Request message to a cell which the UE camps on. For example, if the UE camps on a cell of the first NG-RAN, the UE may transmit the RRC Setup Request to the cell of the first NG-RAN. After the RRC connection is established between the UE and the first NG-RAN, the UE may send a Connection Failure message and/or the like to an AMF via the first NG-RAN. The Connection Failure message and/or the like may comprise:

information that the UE is located outside of an area where the network slice associated with the data is supported.
  information of the network slices that cannot be provided at the UE's location.
  information that the network slice related to the paging cannot be activated.
  information that the network may stop paging.
  information that the UE received a paging message.
  information that the UE cannot respond to the paging.
  information that a data is generated by an application or a user.
  information that a data cannot be delivered to the network.
  information that the UE cannot activate a PDU session associated with the paging.
  information that the UE cannot activate a PDU session associated with the data.
  information that the a network slice associated with the data is not available.
  information that the a network slice associated with the paging is not available.

information of the network slice associated with the data
    information of the network slice associated with the paging
  Priority Network Service information
  information on the PDU session For example, the Connection Failure message and/or the like may be a service request message.

In an example, if the AMF receives the Connection Failure message and/or the like, the AMF may terminate an ongoing procedure (e.g., paging procedure) for the UE. For example, the AMF may send one or more N2 Paging Stop messages and/or the like, to the one or more NG-RANs supporting the one or more TAs in a list of TAI associated with a registration area for the UE. The one or more N2 Paging Stop messages and/or the like may prevent further paging message transmission by the one or more NG-RANs. If the one or more NG-RANs receive the one or more N2 Paging Stop messages and/or the like, the one or more NG-RANs may discard stored one or more paging messages for the UE and/or may abort the transmission of the one or more paging messages.

In an example, when the AMF receives a Connection Failure message and/or the like, the AMF may send a SMF request (e.g., Namf_Communication_N1N2MessageTransfer Failure Notification) to a SMF handling a PDU session for the UE. For example, the SMF may be the SMF associated with the network slice. For example, the SMF may be the SMF associated with the paging. For example, the SMF may be the SMF associated with the data. The SMF request may comprise network slice failure information and/or the like to the SMF. The network slice failure information and/or the like may comprise at least one of:

information that a paging procedure for the UE fails,
  information that activation of a PDU session for the UE fails,
  information that notification of a data arrival for the UE fails,
  information that the UE is located outside of an area where a PDU session is supported.
  information that the UE is located outside of an area where a network slice is supported.
  information of associated network slice
  information of associated PDU session.

In an example, if the SMF receives from the AMF, the SMF request with the network slice failure information and/or the like, the SMF may indicate to a UPF that the data notification fails. The SMF may indicate to the UPF that the UPF discards the arrived data. The SMF may indicate to the UPF that the UPF may not further indicate data arrival to the SMF. For example, if a new data arrives at the UPF, the UPF may not indicate the data arrival to the SMF. For example, if a new data arrives at the UPF, the SMF may not indicate the data arrival to the AMF. For example, if the SMF receives from the AMF, the SMF request with the network slice failure information and/or the like, the SMF may terminate ongoing procedure (e.g., paging procedure, PDU Session Modification procedure) for the UE.

Figure 24:
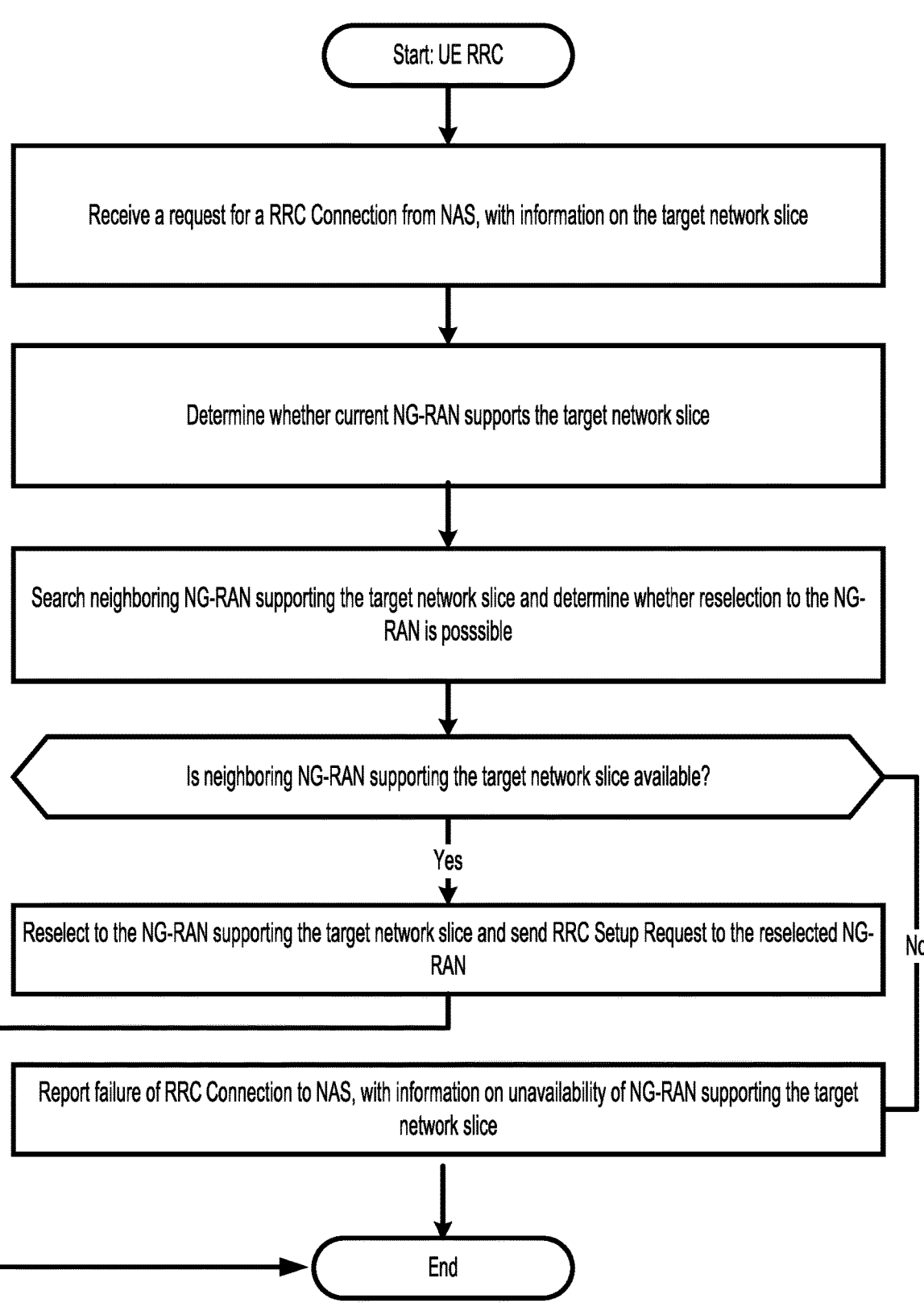
FIG. 24 is a diagram of an aspect of an example embodiment of the present disclosure.

FIG. 24 may depict an example procedure for a UE in accordance with embodiments of the present disclosure.

A RRC entity of a UE may receive a request for a RRC connection from a NAS entity of the UE. The request from the NAS entity may comprise a Priority Network Slice information. The RRC entity may determine whether a cell on which the UE camps on supports a network slice indicated by the Priority Network Slice information. If the cell on which the UE camps does not support the network slice, the RRC entity may initiate a cell search procedure to find a neighboring cell supporting the network slice. If the neighboring cell supporting the network slice in the Priority Network Slice information is found, the RRC entity may determine whether the UE can perform cell reselection to the found neighboring cell. If the cell reselection to the found neighboring cell is possible, the UE may perform cell reselection to the found neighboring cell and may send a RRC Setup Request message. If the cell reselection to the neighboring cell is not possible or if no neighboring cell supports the network slice indicated by the Priority Network Slice information, the RRC entity may report to the NAS entity. The report may indicate failure of establishment of RRC connection and/or unavailability of the network slice indicated by the Priority Network Slice information.

Figure 25:
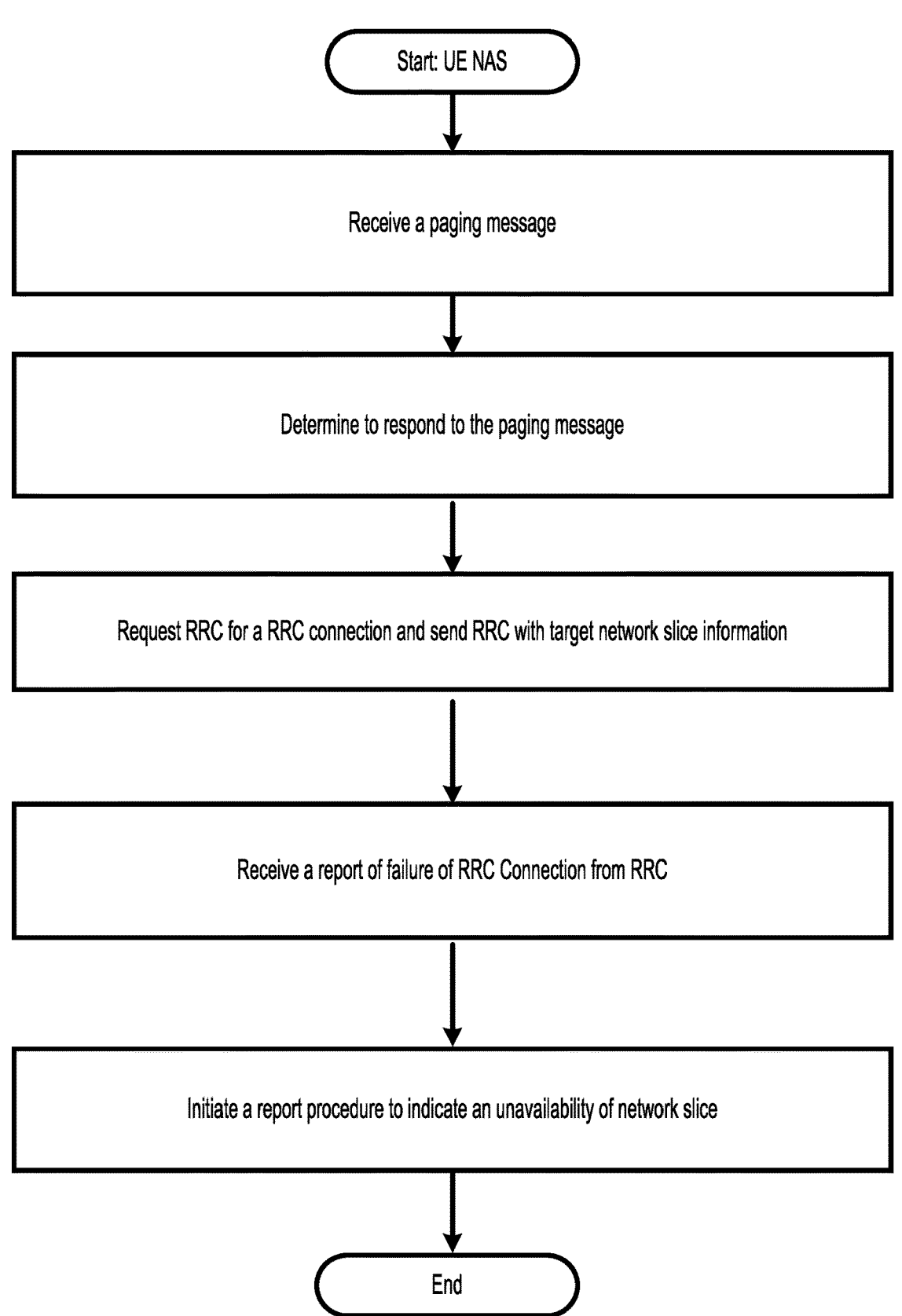
FIG. 25 is a diagram of an aspect of an example embodiment of the present disclosure.

FIG. 25 may depict an example procedure for a UE in accordance with embodiments of the present disclosure.

A NAS entity of a UE may receive a paging information with Network Service information from a RRC entity. After the NAS entity receives the paging information, the NAS entity may determine whether to respond to paging or not. The NAS may determine whether to respond to the paging or not, based on at least one of information of the network slice associated with the paging and/or information of one or more established PDU sessions and/or information of the list of allowed network slices and/or information of the one or more network slices for which the one or more PDU sessions are established and/or information of priority among the one or more network slices and/or information of priority among the one or more established PDU sessions and/or priority selected by the user. For example, the NAS entity may determine to respond to the paging if the priority of the data associated with the paging is high. For example, the NAS entity may determine to respond to the paging if the priority of network slice associated with the paging is higher than the priority of other network slices. For example, the NAS entity may determine to respond to the paging if the user determines to respond to the paging.

If the NAS entity determines to respond to the paging, the NAS entity may request the RRC entity to establish a RRC connection, with information of a target network slice. The information of the target network slice may be Priority Network Slice information. The NAS entity may receive from the RRC entity a report. The report may indicate failure of establishment of RRC connection and/or unavailability of the network slice indicated by the Priority Network Slice information. If the NAS entity receives the report, the NAS entity may terminate the triggered service request procedure. If the NAS entity receives the report, the NAS entity may initiate a procedure to report a connection failure to the AMF. The report of connection failure may indicate to the network that the network slice associated with the paging is not available and/or that the UE cannot respond to the paging.

Figure 26:
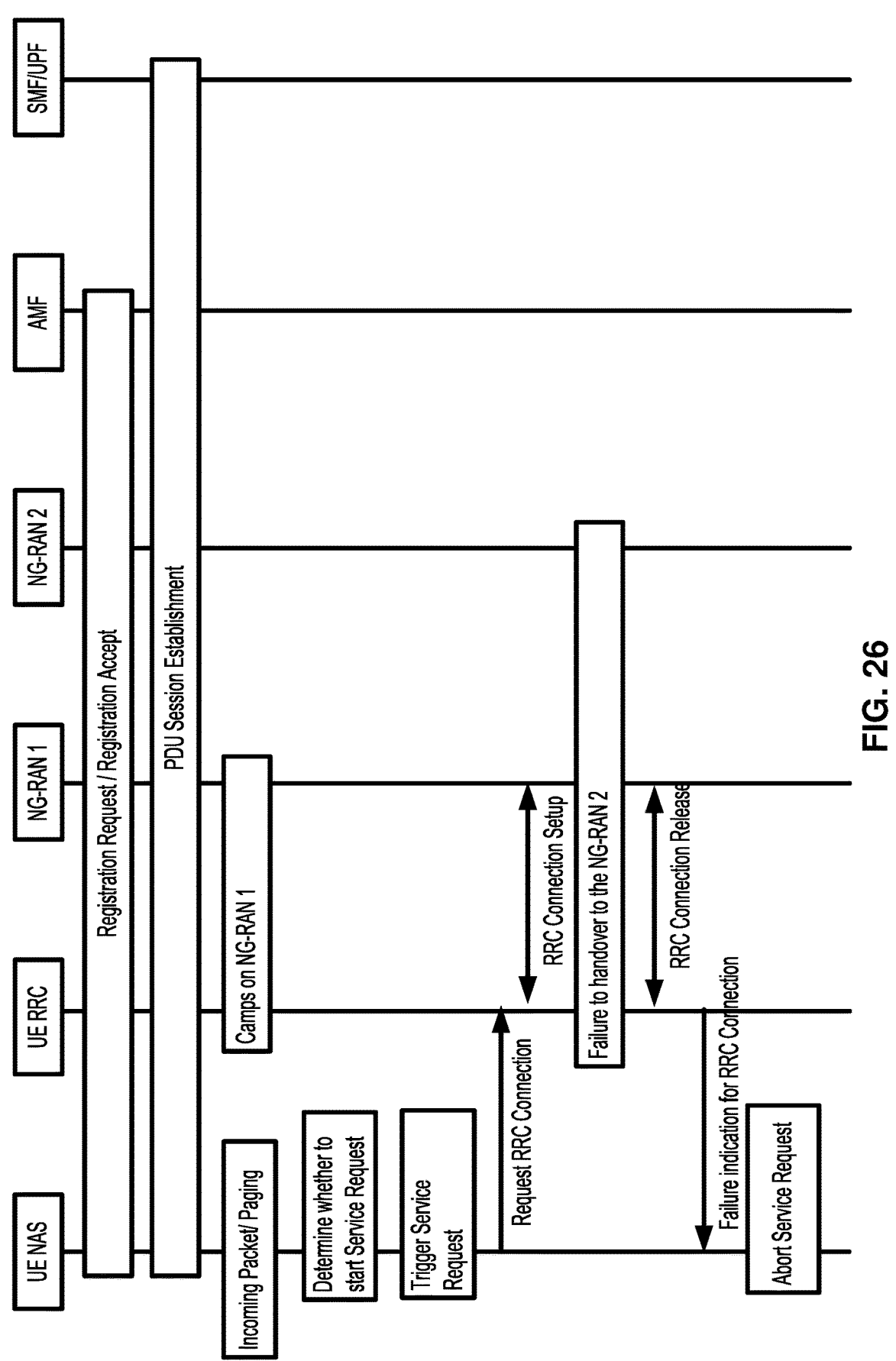
FIG. 26 is a diagram of an aspect of an example embodiment of the present disclosure.

FIG. 26 may depict an example procedure in accordance with embodiments of the present disclosure.

In an example, when a UE receives a paging message and/or when the UE receives a data from a user or from an application, a NAS entity of the UE may determine whether to trigger a service request procedure or not.

For example, the NAS entity of the UE may determine whether to trigger the service request procedure or not, based on at least one of the Network Service information and/or information of the one or more established PDU sessions and/or information of the list of allowed network slices and/or information of the one or more network slices for which the one or more PDU sessions are established and/or information of priority among the one or more network slices and/or information of priority among the one or more established PDU sessions and/or information of priority selected by a user.

For example, the NAS entity of the UE may determine to trigger the service request procedure, when the priority of the PDU session associated with the data is higher than the priority of the one or more other established PDU sessions. For example, the NAS entity of the UE may determine to trigger the service request procedure, if the priority of network slice associated with the data is higher than the priority of other one or more network slices. For example, the NAS entity of the UE may determine to trigger a service request procedure, if the user determines to respond to the paging.

If the NAS entity triggers the service request procedure, the NAS entity may request the RRC entity to establish a RRC connection. When the NAS entity requests the RRC entity to establish the RRC connection, the NAS entity may deliver to the RRC entity, Priority Network Slice information.

In an example, if the RRC entity receives the request for the RRC connection from the NAS entity, the RRC entity may perform a RRC connection establishment procedure to a cell where the UE camps on. The cell may be one of cells of a first NG-RAN. The first NG-RAN may not support the network slice associated with the data. During the RRC connection establishment procedure, the UE may send to the NG-RAN, the Priority Network Slice information. The Priority Network Slice information may be included in a RRC Setup Request message and/or a RRC Setup Complete message and/or the like.

The Priority Network Slice information may comprise information of a list of network slices associated with the service request procedure. To assist the NG-RAN network to determine the network slice that the UE needs, the Priority Network Slice information may be provided separately from information on a list of allowed network slices. For example, the list of allowed network slice may include one or more network slices which do not have one or more associated PDU sessions. The Priority Network Slice information may be provided as a separate information to the network from the information of the list of requested network slices that the UE may deliver during a registration update procedure.

Based on the received Priority Network Slice information, the first NG-RAN may determine whether the first NG-RAN supports the network slice indicated by the Priority Network Slice information. If the first NG-RAN determines that the first NG-RAN does not support the network slice, the first NG-RAN may send a measurement configuration to the UE. The measurement configuration may help for the first NG-RAN to estimate a radio signal quality of a serving cell for the UE and/or one or more neighboring cells for the UE. The one or more neighboring cells may support the network slice indicated by the Priority Network Slice information. Based on the measurement configuration, the UE may perform measurement of the serving cell and/or the one or more neighboring cells.

In an example, based on the measurement, the UE may send a measurement report to the first NG-RAN. For the received measurement report from the UE, the first NG-RAN may determine whether a handover of the UE to a cell supporting the network slice indicated by the Priority Network Slice information is possible or not. For example, if the measurement from the UE does not include a cell supporting the network slice, the first NG-RAN may determine that a handover of the UE to a cell supporting the network slice is not possible. For example, if the measurement from the UE does not include a cell supporting the network slice with enough radio signal quality for communication, the first NG-RAN may determine that a handover of the UE to a cell supporting the network slice is not possible.

In an example, if the NG-RAN does not receive the measurement report from the UE, the first NG-RAN may determine that a handover of the UE to a cell supporting the network slice is not possible.

In an example, if the first NG-RAN does not have information of one or more neighboring cells supporting the network slice indicated in the Priority Network Slice information, the first NG-RAN may determine that a handover of the UE to a cell supporting the network slice is not possible.

In an example, if the first NG-RAN may determine that a handover to a cell supporting the network slice indicated by the Priority Network Slice information is not possible, the first NG-RAN may release the established RRC connection with the UE. If the first NG-RAN releases the established RRC connection with the UE, the first NG-RAN may deliver to the UE with the release cause. The release cause may comprise at least one of indication that no cell is available for the network slice indicated by the Priority Network Slice information and/or indication that the network slice indicated by the Priority Network Slice information is not supported and/or indication that handover to a cell supporting the network slice indicated by the Priority Network Slice information is not possible.

If the UE receives from the first NG-RAN the release cause when the RRC connection is released, the RRC entity may indicate to the NAS entity, failure of RRC connection establishment and/or a cause of failure. The cause of failure may comprise the release cause and/or may indicate that no cell supporting the network slice indicated by the Priority Network Slice information is available.

If the NAS entity receives from the RRC entity, indication of failure of RRC connection establishment, the NAS entity may terminate the triggered service request procedure and may initiate a procedure to indicate a failure to the network. For example, the UE may perform procedure as depicted in the example of FIG. 23.

Figure 27:
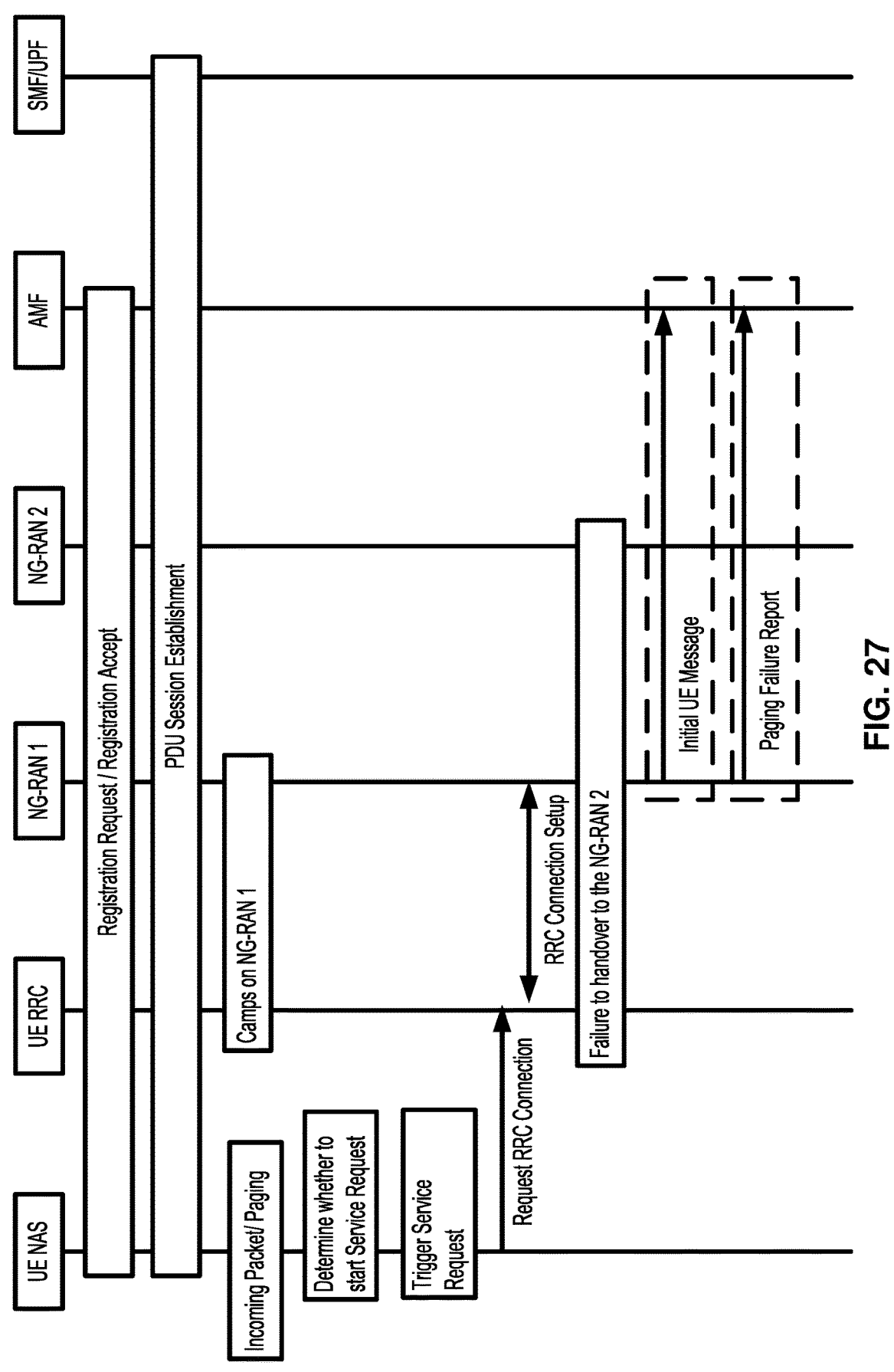
FIG. 27 is a diagram of an aspect of an example embodiment of the present disclosure.

FIG. 27 may depict an example procedure in accordance with embodiments of the present disclosure.

In an example, when a UE receives a paging message and/or when the UE receives a data from a user or from an application, a NAS entity of the UE may determine whether to trigger a service request procedure or not.

For example, the NAS entity of the UE may determine whether to trigger the service request procedure or not, based on at least one of the Network Service information and/or information of the one or more established PDU sessions and/or information of the list of allowed network slices and/or information of the one or more network slices for which the one or more PDU sessions are established and/or information of priority among the one or more network slices and/or information of priority among the one or more established PDU sessions and/or information of priority selected by a user.

For example, the NAS entity of the UE may determine to trigger the service request procedure, when the priority of the PDU session associated with the data is higher than the priority of the one or more other established PDU sessions. For example, the NAS entity of the UE may determine to trigger the service request procedure, if the priority of network slice associated with the data is higher than the priority of other one or more network slices. For example, the NAS entity of the UE may determine to trigger a service request procedure, if the user determines to respond to the paging.

If the NAS entity triggers the service request procedure, the NAS entity may request the RRC entity to establish a RRC connection. When the NAS entity requests the RRC entity to establish the RRC connection, the NAS entity may deliver to the RRC entity, Priority Network Slice information.

In an example, if the RRC entity receives the request for the RRC connection from the NAS entity, the RRC entity may perform a RRC connection establishment procedure to a cell where the UE camps on. The cell may be one of cells of a first NG-RAN. The first NG-RAN may not support the network slice associated with the data. During the RRC connection establishment procedure, the UE may send to the NG-RAN, the Priority Network Slice information. The Priority Network Slice information may be included in a RRC Setup Request message and/or a RRC Setup Complete message and/or the like.

The Priority Network Slice information may comprise information of a list of network slices associated with the service request procedure. To assist the NG-RAN network to determine the network slice that the UE needs, the Priority Network Slice information may be provided separately from information on a list of allowed network slices. For example, the list of allowed network slice may include one or more network slices which do not have one or more associated PDU sessions. The Priority Network Slice information may be provided as a separate information to the network from the information of the list of requested network slices that the UE may deliver during a registration update procedure.

Based on the received Priority Network Slice information, the first NG-RAN may determine whether the first NG-RAN supports the network slice indicated by the Priority Network Slice information. If the first NG-RAN determines that the first NG-RAN does not support the network slice, the first NG-RAN may send a measurement configuration to the UE. The measurement configuration may help for the first NG-RAN to estimate a radio signal quality of a serving cell for the UE and/or one or more neighboring cells for the UE. The one or more neighboring cells may support the network slice indicated by the Priority Network Slice information. Based on the measurement configuration, the UE may perform measurement of the serving cell and/or the one or more neighboring cells.

In an example, based on the measurement, the UE may send a measurement report to the first NG-RAN. For the received measurement report from the UE, the first NG-RAN may determine whether a handover of the UE to a cell supporting the network slice indicated by the Priority Network Slice information is possible or not. For example, if the measurement from the UE does not include a cell supporting the network slice, the first NG-RAN may determine that a handover of the UE to a cell supporting the network slice is not possible. For example, if the measurement from the UE does not include a cell supporting the network slice with enough radio signal quality for communication, the first NG-RAN may determine that a handover of the UE to a cell supporting the network slice is not possible.

In an example, if the NG-RAN does not receive the measurement report from the UE, the first NG-RAN may determine that a handover of the UE to a cell supporting the network slice is not possible.

In an example, if the first NG-RAN does not have information of one or more neighboring cells supporting the network slice indicated in the Priority Network Slice information, the first NG-RAN may determine that a handover of the UE to a cell supporting the network slice is not possible.

In an example, if the first NG-RAN determines that the handover to a cell supporting the network slice indicated by the Priority Network Slice information is not possible, the first NG-RAN may send Initial UE Message toward an AMF. The Initial UE Message may comprise the Priority Network Slice information and/or Slice Handover information. The Slice Handover information may comprise information that the handover of the UE to a NG-RAN supporting the network slice indicated by the Priority Network Slice information is not possible and/or information that the network slice indicated by the Priority Network Slice information is not supported by the first NG-RAN and/or information that a NG-RAN supporting the network slice indicated by the Priority Network Slice information is not available.

In an example, if the first NG-RAN previously received a N2 Paging message for the UE, the first NG-RAN may send to an AMF, a PagingFailure Report message and/or the like. The PagingFailure Report message and/or the like may comprise the Priority Network Slice information and/or The Slice Handover information.

In an example, the AMF may receive the Initial UE Message or PagingFailure Report message and/or the like comprising the Slice Handover information. Based on the Slice Handover information, if there is a triggered paging procedure for the UE, the AMF may terminate the paging procedure and/or may indicate failure to a SMF. For example, if the AMF receives Slice Handover information, the AMF may behave similarly as if the AMF receives a Connection Failure message in the example depicted in FIG. 23.

Figure 28:
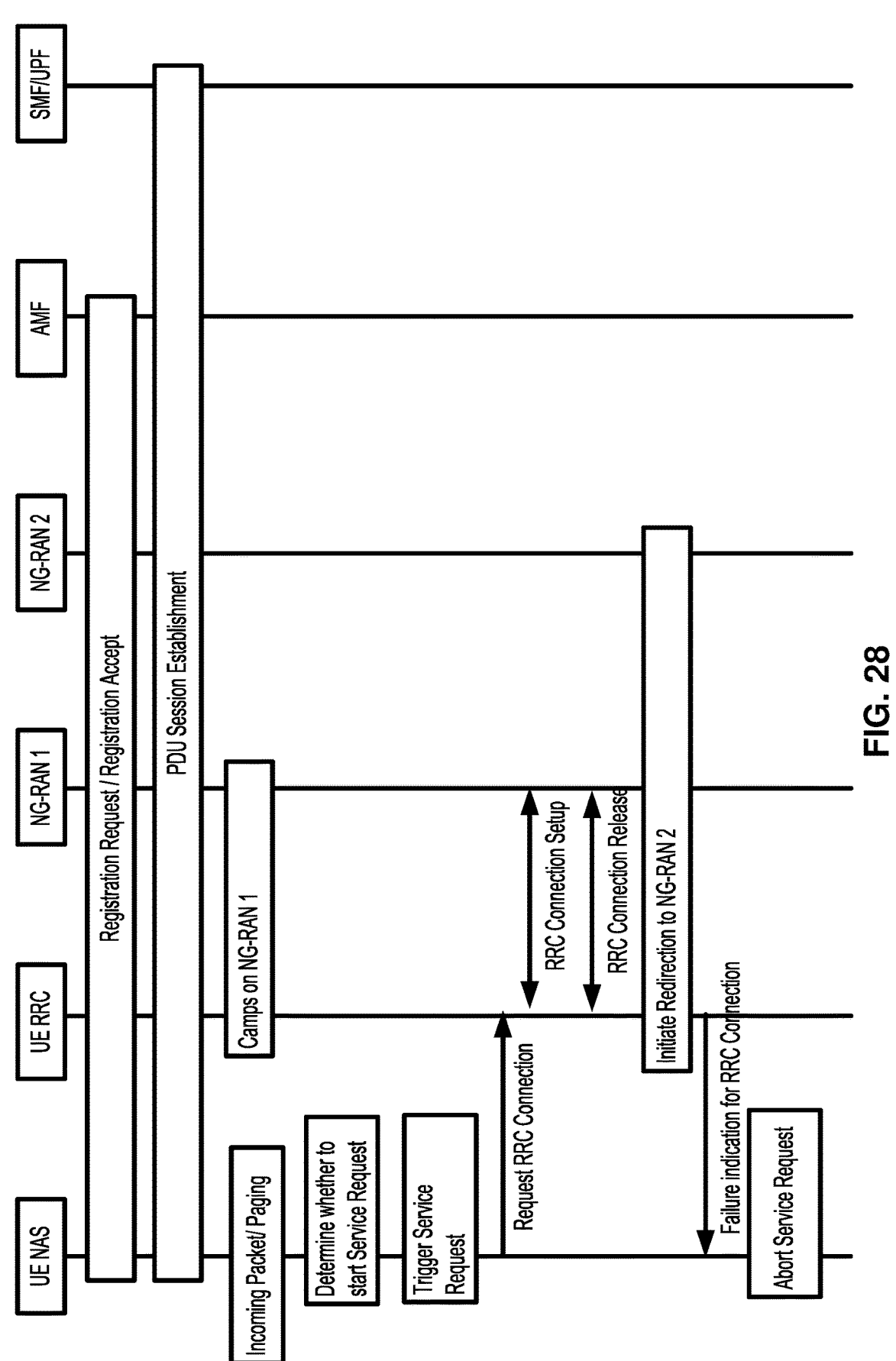
FIG. 28 is a diagram of an aspect of an example embodiment of the present disclosure.

FIG. 28 may depict an example in accordance with embodiments of the present disclosure.

In an example, when a UE receives a paging message and/or when the UE receives a data from a user or from an application, a NAS entity of the UE may determine whether to trigger a service request procedure or not.

For example, the NAS entity of the UE may determine whether to trigger the service request procedure or not, based on at least one of the Network Service information and/or information of the one or more established PDU sessions and/or information of the list of allowed network slices and/or information of the one or more network slices for which the one or more PDU sessions are established and/or information of priority among the one or more network slices and/or information of priority among the one or more established PDU sessions and/or information of priority selected by a user.

For example, the NAS entity of the UE may determine to trigger the service request procedure, when the priority of the PDU session associated with the data is higher than the priority of the one or more other established PDU sessions. For example, the NAS entity of the UE may determine to trigger the service request procedure, if the priority of network slice associated with the data is higher than the priority of other one or more network slices. For example, the NAS entity of the UE may determine to trigger a service request procedure, if the user determines to respond to the paging.

If the NAS entity triggers the service request procedure, the NAS entity may request the RRC entity to establish a RRC connection. When the NAS entity requests the RRC entity to establish the RRC connection, the NAS entity may deliver to the RRC entity, Priority Network Slice information.

In an example, if the RRC entity receives the request for the RRC connection from the NAS entity, the RRC entity may perform a RRC connection establishment procedure to a cell where the UE camps on. The cell may be one of cells of a first NG-RAN. The first NG-RAN may not support the network slice associated with the data. During the RRC connection establishment procedure, the UE may send to the NG-RAN, the Priority Network Slice information. The Priority Network Slice information may be included in a RRC Setup Request message and/or a RRC Setup Complete message and/or the like.

The Priority Network Slice information may comprise information of a list of network slices associated with the service request procedure. To assist the NG-RAN network to determine the network slice that the UE needs, the Priority Network Slice information may be provided separately from information on a list of allowed network slices. For example, the list of allowed network slice may include one or more network slices which do not have one or more associated PDU sessions. The Priority Network Slice information may be provided as a separate information to the network from the information of the list of requested network slices that the UE may deliver during a registration update procedure.

Based on the received Priority Network Slice information, the first NG-RAN may determine whether it supports the network slice indicated in the Priority Network Slice information. If the first NG-RAN determines that it does not support the network slice indicated in the Priority Network Slice information, the first NG-RAN may release the established RRC connection with the UE by sending RRC Release message. The RRC Release message may comprise slice redirection information. For example, based on that the first NG-RAN does not support the network slice indicated by the Priority Network Slice information, the first NG-RAN may include the slice redirection information in the RRC Release message. The slice redirection information may assist the UE to camp on a neighboring cell supporting the network slice. For example, the slice redirection information may comprise at least one of information on parameters to select the neighboring cell supporting the network slice and/or a list of network slices supported by the neighboring cells.

In an example, if the UE receives the RRC Release message with the slice redirection information, the UE may perform cell reselection procedure based on the slice redirection information. If the UE fails to reselect a neighboring cell supporting the network slice, the RRC entity of the UE may determine that the cell reselection procedure fails. For the failed cell reselection procedure, the RRC entity may indicate to the NAS entity that establishment of RRC connection fails. In addition, the NAS entity may indicate that the RRC connection establishment fails due to that no cell supporting the network slice is available.

In an example, if the NAS entity receives the indication from the RRC entity that the RRC connection establishment fails due to that no cell supporting the network slice is available, the NAS entity may terminate the triggered service request procedure. For example, the NAS entity may indicate data service failure to the application or the user. For example, the UE may send to an AMF, a Connection Failure message, as shown in the example depicted in FIG. 23.

Figure 29:
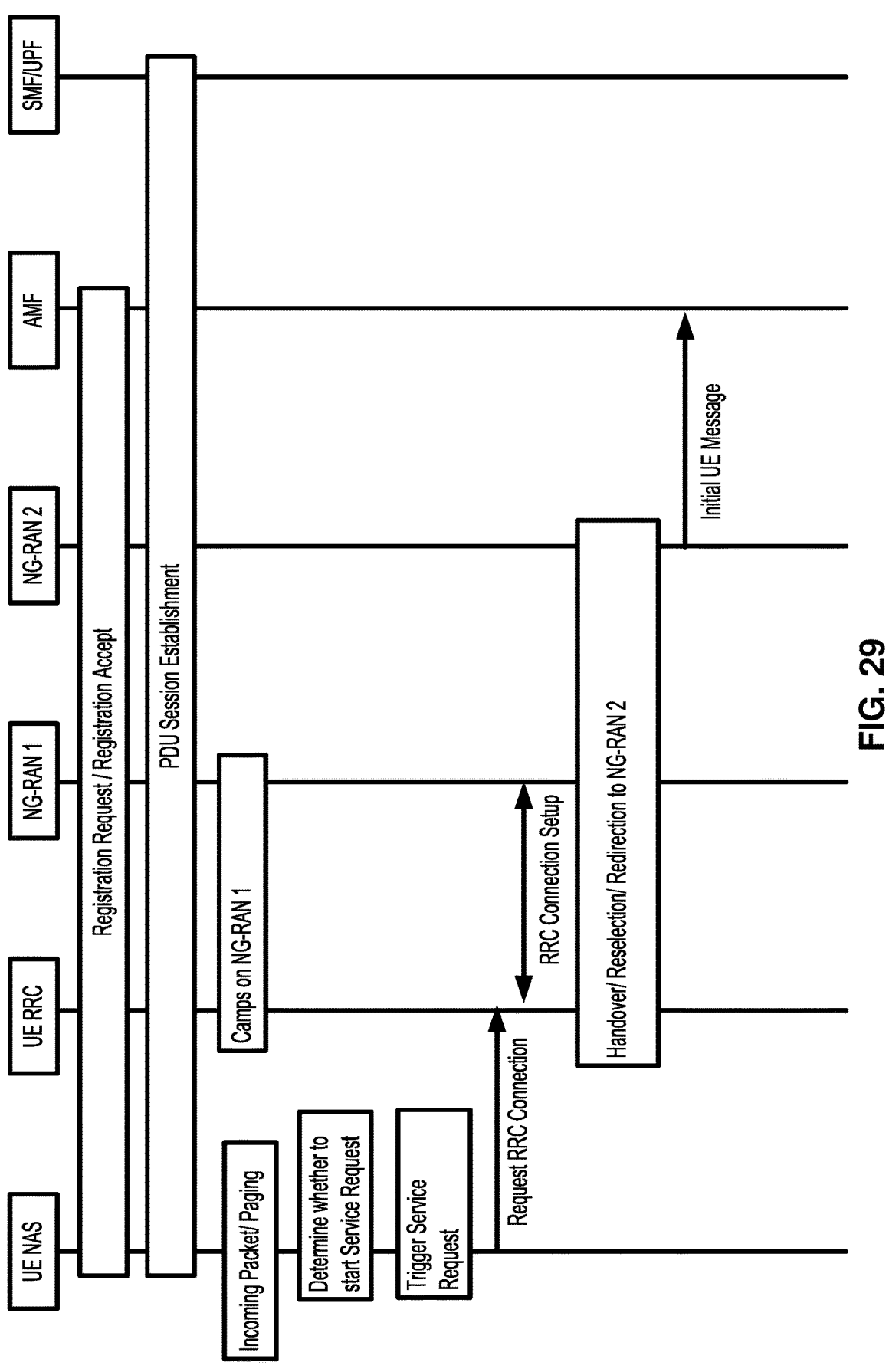
FIG. 29 is a diagram of an aspect of an example embodiment of the present disclosure.

FIG. 29 may depict an example procedure in accordance with embodiments of the present disclosure.

In an example, when a UE receives a paging message and/or when the UE receives a data from a user or from an application, a NAS entity of the UE may determine whether to trigger a service request procedure or not.

For example, the NAS entity of the UE may determine whether to trigger the service request procedure or not, based on at least one of the Network Service information and/or information of the one or more established PDU sessions and/or information of the list of allowed network slices and/or information of the one or more network slices for which the one or more PDU sessions are established and/or information of priority among the one or more network slices and/or information of priority among the one or more established PDU sessions and/or information of priority selected by a user.

For example, the NAS entity of the UE may determine to trigger the service request procedure, when the priority of the PDU session associated with the data is higher than the priority of the one or more other established PDU sessions. For example, the NAS entity of the UE may determine to trigger the service request procedure, if the priority of network slice associated with the data is higher than the priority of other one or more network slices. For example, the NAS entity of the UE may determine to trigger a service request procedure, if the user determines to respond to the paging.

If the NAS entity triggers the service request procedure, the NAS entity may request the RRC entity to establish a RRC connection. When the NAS entity requests the RRC entity to establish the RRC connection, the NAS entity may deliver to the RRC entity, Priority Network Slice information.

In an example, if the RRC entity receives the request for the RRC connection from the NAS entity, the RRC entity may perform a RRC connection establishment procedure to a cell where the UE camps on. The cell may be one of cells of a first NG-RAN. The first NG-RAN may not support the network slice associated with the data. During the RRC connection establishment procedure, the UE may send to the NG-RAN, the Priority Network Slice information. The Priority Network Slice information may be included in a RRC Setup Request message and/or a RRC Setup Complete message and/or the like.

The Priority Network Slice information may comprise information of a list of network slices associated with the service request procedure. To assist the NG-RAN network to determine the network slice that the UE needs, the Priority Network Slice information may be provided separately from information on a list of allowed network slices. For example, the list of allowed network slice may include one or more network slices which do not have one or more associated PDU sessions. The Priority Network Slice information may be provided as a separate information to the network from the information of the list of requested network slices that the UE may deliver during a registration update procedure.

Based on the received Priority Network Slice information, the first NG-RAN may determine whether the first NG-RAN supports the network slice indicated in the Priority Network Slice information.

If the first NG-RAN cannot support the network slice indicated by the Priority Network Slice information, the first NG-RAN may perform a procedure to perform mobility procedure for the UE to a second NG-RAN supporting the network slice, as shown in the example in FIG. 26, FIG. 27 or FIG. 28. If the first NG-RAN determines that handover or cell reselection to a second cell supporting the network slice is possible, the first NG-RAN may perform handover procedure or may command the UE to perform cell reselection to the second cell of the second NG-RAN. A second NG- RAN may comprise the second cell. If the UE connects to the second NG-RAN supporting the network slice, the second NG-RAN may send Initial UE Message to an AMF. Based on the connection between the UE and the network, the data may be exchanged between the UE and the network.

Figure 30:
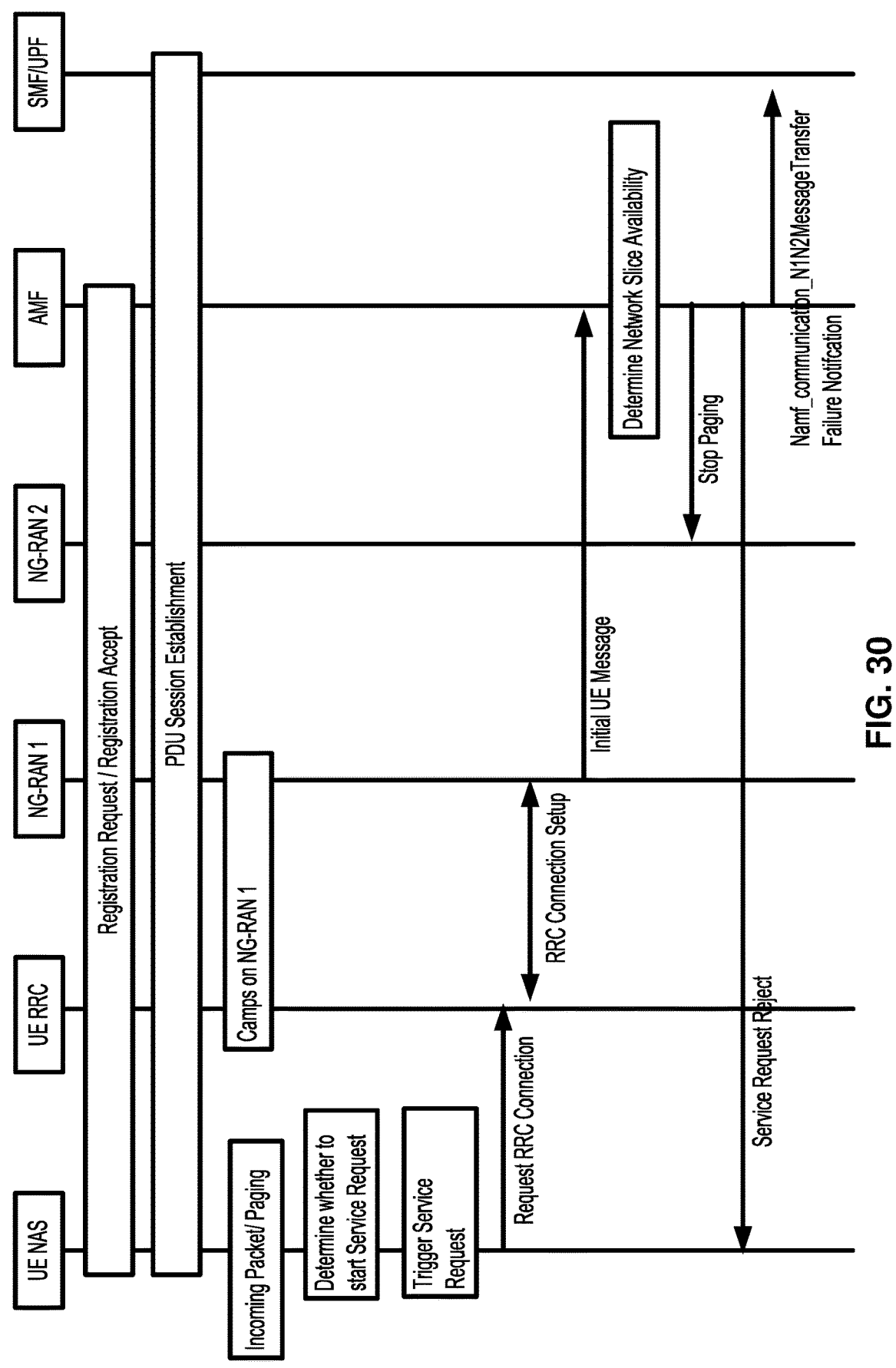
FIG. 30 is a diagram of an aspect of an example embodiment of the present disclosure.

FIG. 30 may depict an example in accordance with embodiments of the present disclosure. In an example, when a UE receives a paging message and/or when the UE receives a data from a user or from an application, a NAS entity of the UE may determine whether to trigger a service request procedure or not.

For example, the NAS entity of the UE may determine whether to trigger the service request procedure or not, based on at least one of the Network Service information and/or information of the one or more established PDU sessions and/or information of the list of allowed network slices and/or information of the one or more network slices for which the one or more PDU sessions are established and/or information of priority among the one or more network slices and/or information of priority among the one or more established PDU sessions and/or information of priority selected by a user.

For example, the NAS entity of the UE may determine to trigger the service request procedure, when the priority of the PDU session associated with the data is higher than the priority of the one or more other established PDU sessions. For example, the NAS entity of the UE may determine to trigger the service request procedure, if the priority of network slice associated with the data is higher than the priority of other one or more network slices. For example, the NAS entity of the UE may determine to trigger a service request procedure, if the user determines to respond to the paging.

If the NAS entity triggers the service request procedure, the NAS entity may request the RRC entity to establish a RRC connection. When the NAS entity requests the RRC entity to establish the RRC connection, the NAS entity may deliver to the RRC entity, Priority Network Slice information.

In an example, if the RRC entity receives the request for the RRC connection from the NAS entity, the RRC entity may perform a RRC connection establishment procedure to a cell where the UE camps on. The cell may be one of cells of a first NG-RAN. The first NG-RAN may not support the network slice associated with the data. During the RRC connection establishment procedure, the UE may send to the NG-RAN, the Priority Network Slice information. The Priority Network Slice information may be included in a RRC Setup Request message and/or a RRC Setup Complete message and/or the like.

The Priority Network Slice information may comprise information of a list of network slices associated with the service request procedure. To assist the NG-RAN network to determine the network slice that the UE needs, the Priority Network Slice information may be provided separately from information on a list of allowed network slices. For example, the list of allowed network slice may include one or more network slices which do not have one or more associated PDU sessions. The Priority Network Slice information may be provided as a separate information to the network from the information of the list of requested network slices that the UE may deliver during a registration update procedure.

After establishing the RRC connection, the first NG-RAN may send Initial UE Message to an AMF. The Initial UE Message may comprise a service request message associated with the triggered service request procedure. The service request message may include information of the network slice associated with the data. For example, the information of the network slice associated with the data may be Network Service information. If the AMF receives the Initial UE Message, the AMF may determine whether a current location of the UE and/or the first NG-RAN supports the network slice indicated by the service request message. If the AMF determines that the current location of the UE or the first NG-RAN does not support the network slice indicated by the service request message, the AMF may send a service reject message to the UE. If the AMF determines that the first NG-RAN and/or the current location of the UE does not support the network slice, the AMF may terminate ongoing procedure (e.g., a paging procedure). To terminate the ongoing procedure, the AMF may send one or more N2 Paging Stop message and/or the like to one or more NG-RANs, to prevent further paging message transmission by the one or more NG-RANs. For example, the procedure in FIG. 23 may be used. If the one or more NG-RANs receive the one or more N2 Paging Stop messages and/or the like, the one or more NG-RANs may stop transmission of one or more paging messages over Uu interface. If the AMF determines that the current location of the UE or the first NG-RAN does not support the network slice indicated by the service request message, the AMF may send a SMF request (e.g., Namf_Communication_N1N2MessageTransfer Failure Notification) to a SMF. The SMF request may comprise information that a paging procedure fails and/or that the UE is located outside of the area where the network slice associated with the paging is supported and/or indication that the UE is outside of the area where the network slice for associated PDU session is supported. For example, the SMF may behave as if it receives a slice failure information, as depicted in the example of FIG. 23.

Figure 31:
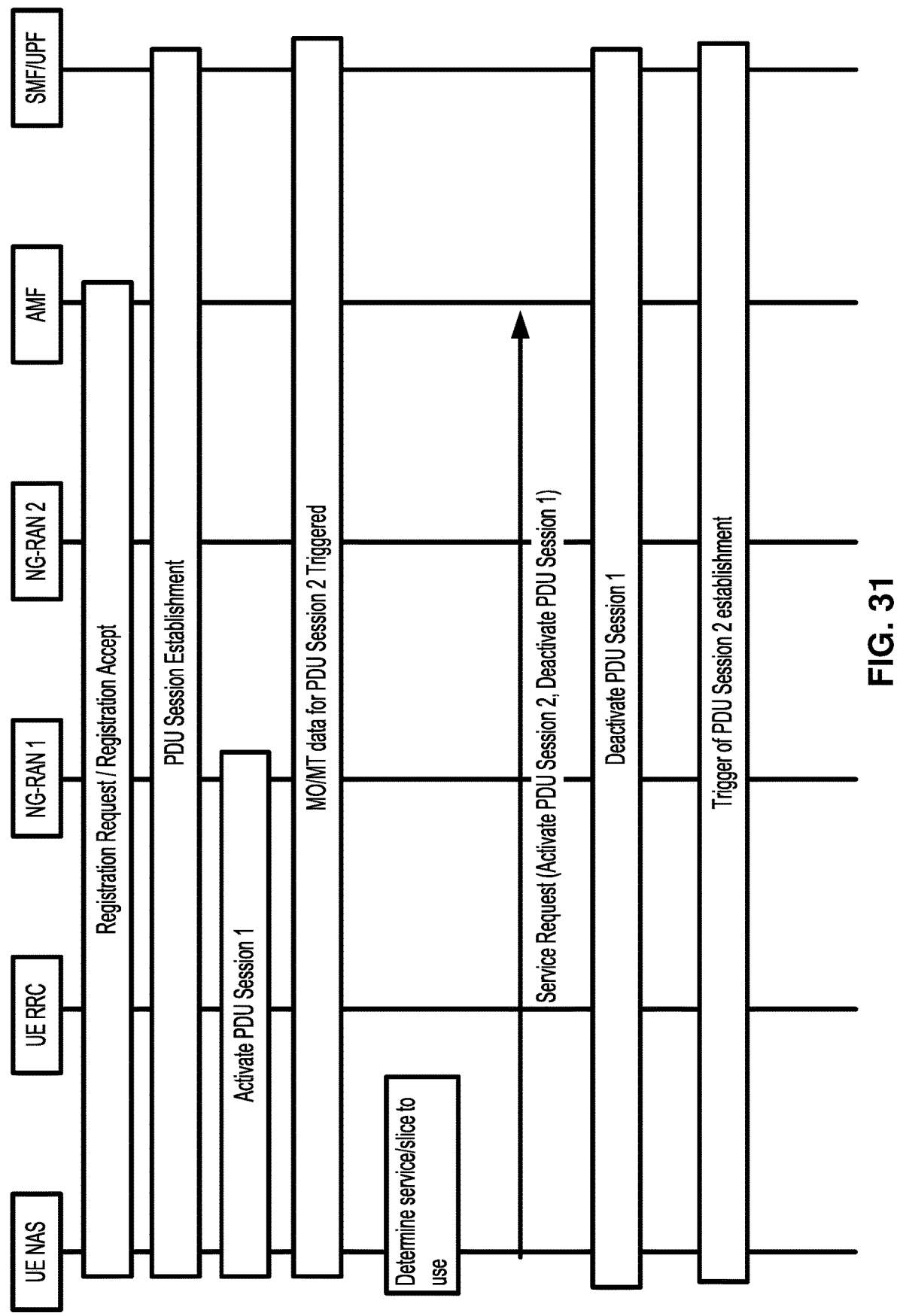
FIG. 31 is a diagram of an aspect of an example embodiment of the present disclosure.

FIG. 31 may depict an example in accordance with embodiments of the present disclosure. In an example, while a UE has an active first PDU session, the UE may be notified of new data for a second PDU session, as depicted in embodiments of the present disclosure. If the second PDU session cannot be provided simultaneously with the first PDU session, the UE may decide to deactivate the first PDU session. For example, If the UE decides to deactivate the first PDU session, the UE may indicate to a core network that the first PDU session needs to be deactivated. If the core network receives the indication, the core network may deactivate the first PDU session. If there is a PDU session to be activated (e.g., the second PDU session), the core network may perform activation of the second PDU session.

In an example depicted in FIG. 30, the UE may register to an AMF with a first network slice and a second network slice. The UE may establish a first PDU session for the first network slice and may establish a second PDU session for the second network slice. If there is a data for the first PDU session, the UE may activate the first PDU session and the UE may transit into RRC connected state. If the UE receives a paging/notification message associated with the second PDU session or if an application/user generates a data for the second PDU session, the UE may determine to activate the second PDU session. Based on SIB received from a cell where the UE is located, the UE may determine that the second network slice associated with the second PDU session is not supported in the cell. If the second network slice or the second PDU session is prioritized, the UE may determine to deactivate the first PDU session of the first network slice. By deactivating the first PDU session, the UE may be able to use the second PDU session.

In an example, to deactivate the first PDU session, the UE may send a service request message to the AMF. The service request message may comprise information of one or more PDU sessions that the UE may activate. The service request message may comprise information of one or more PDU sessions that the UE may deactivate. For example, in the service request message, the UE may indicate that the UE requests activation of the second PDU session and that the UE request deactivation of the first PDU session. The service request message may further comprise information on a cause of the deactivation. For example, the cause of deactivation may comprise information that the second PDU session is prioritized and/or that the second network slice is prioritized and/or that the second network slice is not available and/or that the first network slice and the second network slice are not simultaneously supported at the current location. If the AMF receives the service request message indicating the deactivation, the AMF may notify a SMF to deactivate the PDU session (e.g., the first PDU session).

In an example, to deactivate the first PDU session, the UE may send a PDU Session Deactivation Request message and/or the like, to the SMF. If the SMF receives the PDU Session Deactivation Request message and/or the like, the SMF may not release the PDU session indicated by the PDU Session Deactivation Request message and/or the like. If the SMF receives the PDU Session Deactivation Request message and/or the like, the SMF may deactivate the PDU session indicated by the PDU Session Deactivation Request message and/or the like. For example, if the SMF receives a request for a PDU session release, the SMF may delete all information related to the PDU session. For example, if the SMF receives the PDU Session Deactivation Request, the SMF may release the network resources such as N3 resources between a UPF and NG-RAN. For example, if the SMF receives the PDU Session Deactivation Request, the SMF may not delete the context of the UE such as IP address.

Figure 32:
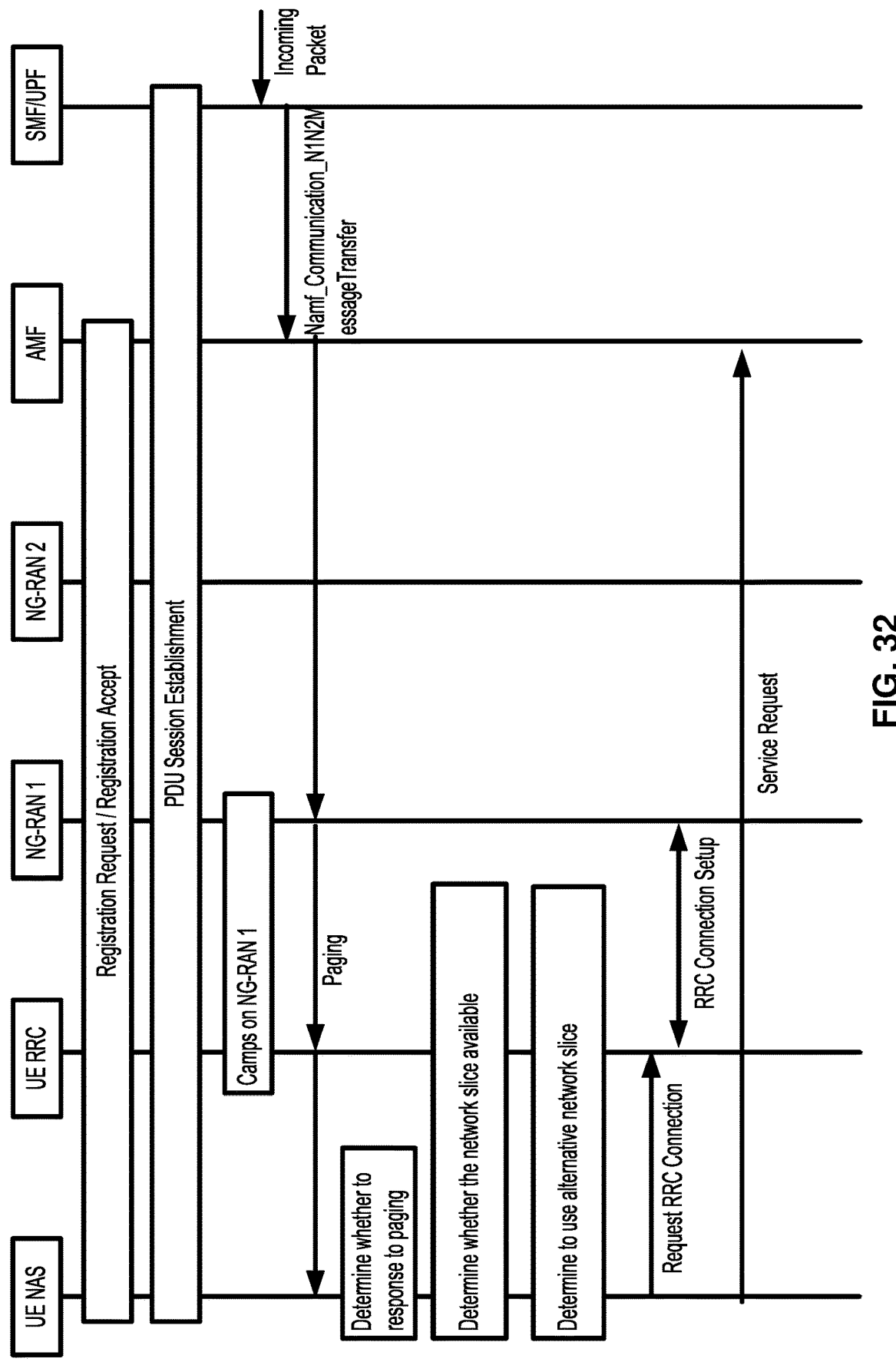
FIG. 32 is a diagram of an aspect of an example embodiment of the present disclosure.

FIG. 32 may depict an example in accordance with embodiments of the present disclosure. In an example, an AMF may deliver to a UE, with a list of allowed network slices and/or a list of TAIs associated with a registration area. For example, the AMF may include a first network slice and/or a second network slice into the list of allowed network slices. For example, the AMF may include a first TA and a second TA into the list of TAIs associated with the registration area for the UE. One or more TAs in the list of TAIs may not support one or more network slices in the list of allowed network slices. For example, the first TA may support the first network slice and/or may not support the second network slice and/or may support a third network slice. For example, the second TA may not support the first network slice and/or may support the second network slice.

The UE may be in a cell supporting the first TA. A data for the second network slice may arrive at a core network. Based on a location of the UE, the AMF may determine that the UE is in an area where the second network slice is not supported. The AMF may send to a NG-RAN, with a N2 Paging message. The N2 Paging message may comprise an information of an alternative network slice. For example, the AMF may include in the N2 paging message, information that the alternative network slice for the second network slice is the third network slice. Based on the N2 paging message, the NG-RAN may send a paging message to the UE. The paging message may comprise at least one of information that the paging is for the second network slice and/or information that the alternative network slice is the third network slice. The UE may receive the paging message. Based on the paging message, if the UE determines that the second network slice is not supported in the current cell, the UE may use the alternative network slice. For example, the UE may send a service request message comprising a request for the third network slice. Based on the service request message from the UE, the core network may a procedure to configure the third network slice. Based on the configured the third network slice, the core network may data to the UE.

Figure 33:
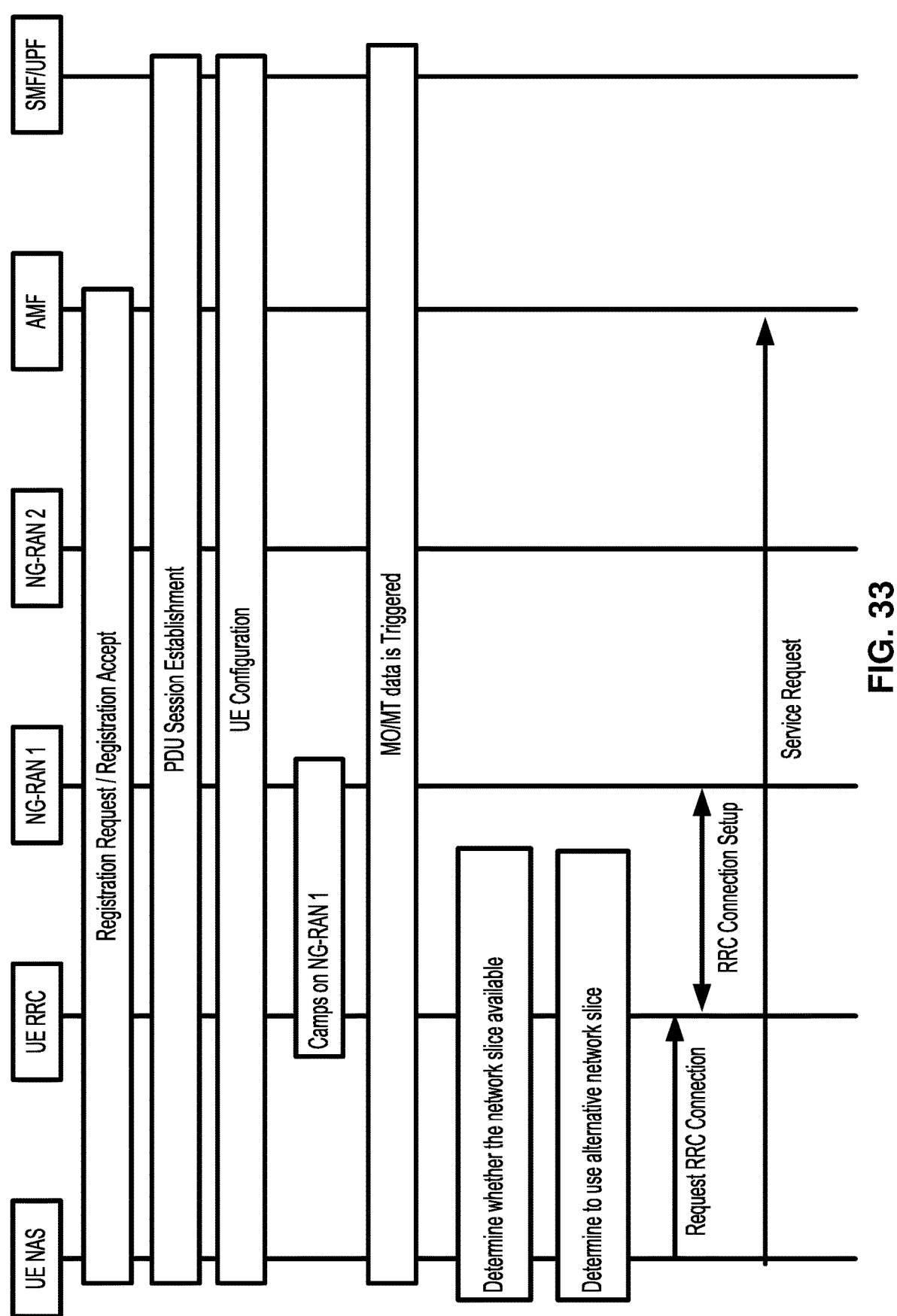
FIG. 33 is a diagram of an aspect of an example embodiment of the present disclosure.

FIG. 33 may depict an example in accordance with embodiments of the present disclosure. In an example, an AMF may deliver to a UE, with a list of alternative network slices. For example, the AMF may include a first network slice and/or a second network slice into the list of allowed network slices. In an example, the core network may send to a UE, a list of allowed network slices and/or a list of alternative network slices for the list of allowed network slices. An alternative network slice in the list of alternative network slices may be used, if the network slice in the list of allowed network slice is not available.

In an example, a core network may send a registration accept message, in response to a registration request from a UE. The registration accept message may comprise a list of allowed network slices and/or a list of TAIs associated with a registration area. For example, the list of allowed network slice may comprise a first network slice and/or a second network slice. For example, the list of TAIs associated with the registration area for the UE may comprise a first TA and/or a second TA into the. One or more TAs in the list of TAIs may not support one or more network slices in the list of allowed network slices. For example, the first TA may support the first network slice and/or may not support the second network slice and/or may support a third network slice. For example, the second TA may not support the first network slice and/or may support the second network slice. For the list of allowed network slices, the AMF may send to UE, a list of alternative network slices. The list of alternative network slices may comprise one or more alternative network slices for one or more network slices in the list of allowed network slices. For example, if a network slice in the list of allowed network slices is not supported in an area, the UE may use the alternative network slice for the network slice. For example, the AMF may send to the UE, an information that the alternative network slice for the second network slice is the third network slice.

In an example, the UE may be in a cell supporting the first TA. A data for the second network slice may arrive at the core network. For the data arrival, the AMF may send to a NG-RAN, a N2 paging message. Based on the N2 paging message, the NG-RAN may send a paging message to the UE. The paging message may indicate that the paging is for the second network slice. The UE may receive the paging message. The UE may determine that the second network slice is not supported in the current cell. The UE may determine to use the alternative network slice in the list of alternative network slice. Based on the list of alternative network slices, the UE may determine that the alternative network slice for the second network slice is the third network slice. The UE may request to use the third network slice when it sends a service request message to the core network. Based on the service request from the UE, the core network may configure a PDU session using the third network slice and send data to the UE. For example, the N2 paging message may comprise an identifier of the UE. For example, the paging message may comprise an identifier of the UE.

Figure 34:
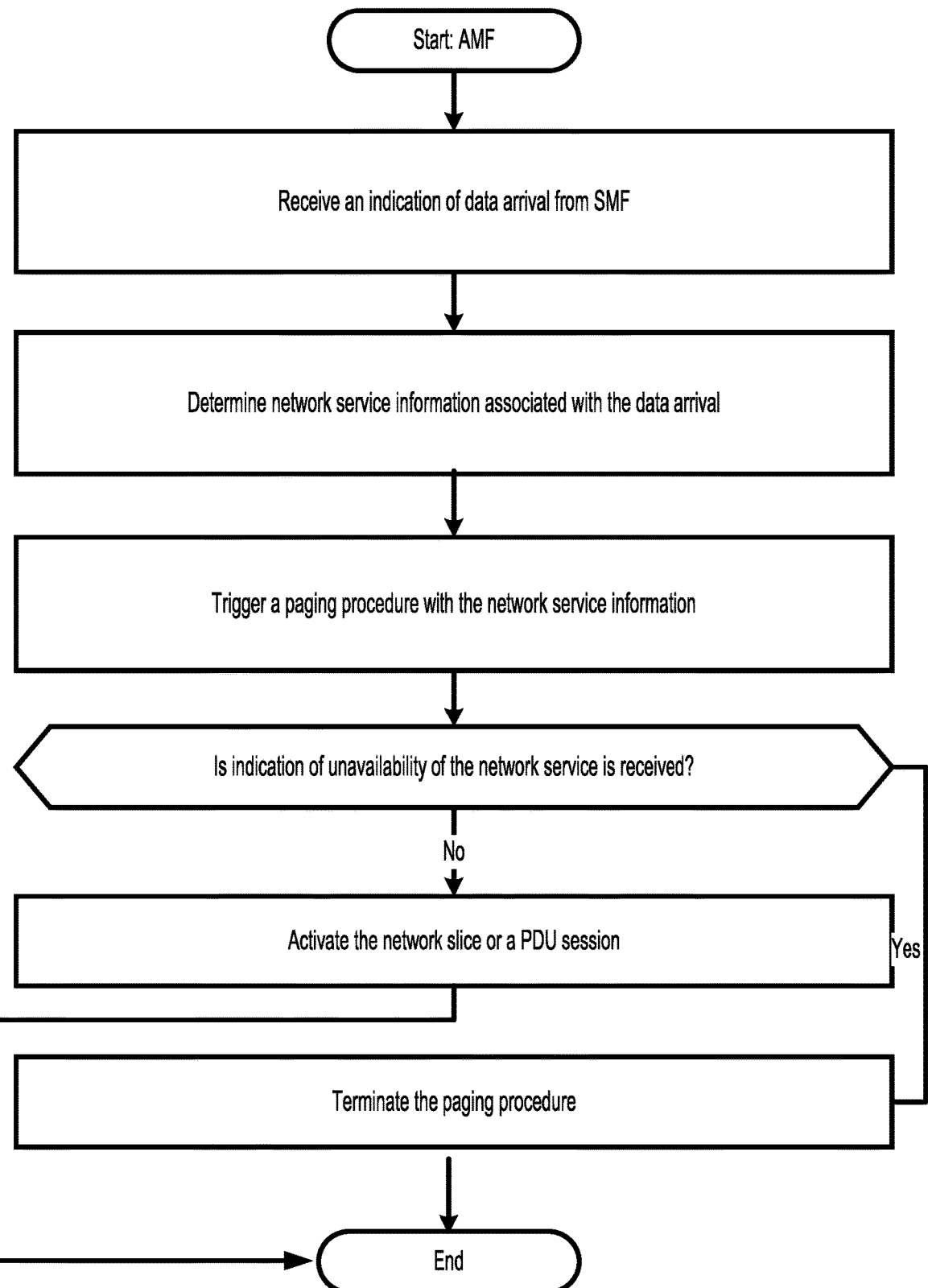
FIG. 34 is a diagram of an aspect of an example embodiment of the present disclosure.

FIG. 34 may depict an example in accordance with embodiments of the present disclosure. In an example, an AMF may receive an indication of a data arrival for a UE. For example, the AMF may receive the indication from a SMF. For the indication of the data arrival, the AMF may determine a network service associated with the data arrival. For example, the network service may be a network slice associated with the data arrival. Based on the network service, the AMF may trigger a paging procedure. For example, the AMF may send a N2 Paging message to a NG-RAN. The N2 Paging message may comprise a network slice information. The network slice information may indicate the network service. The AMF may receive from a UE, an indication that the network service is not available at the UE's location. If the AMF receive the indication that the network service is not available, the AMF may terminate the triggered paging procedure. For example, the AMF may indicate to the SMF that notification of data arrival to the UE fails. The AMF may not receive from the UE, the indication that the network service is not available at the UE's location. The AMF may receive from the UE, a request to activate the network service or a PDU session associated with the network service. If AMF receives the request to activate the network service or a PDU session associated with the network service, the AMF may perform activation of the network service or the PDU session.

In an example, a UE may receive from a first NG-RAN, a message indicating a data arrival (e.g., paging message). The message indicating the data arrival may comprise Network Service information. The Network Service information may indicate which network service the paging message is associated with. Based on the Network Service information, the UE may determine whether the network service is available at UE's location. For example, the UE may determine whether the first NG-RAN and/or other NG-RANs supports the network service. If the UE determine that the NG-RAN supporting the network service is not available, the UE may send a message to a network node (e.g., AMF and/or SMF) that the network service is not available.

In an example, to determine whether the network service is available at the UE's location or not, the UE may search for one or more NG-RANs. The one or more NG-RANs may comprise one or neighbor NG-RANs of the first NG-RAN and/or the first NG-RAN. For example, the one or more NG-RANs may support handover procedure with the first NG-RAN. For example, the one or more NG-RANs may be one or more NG-RANs that the UE can reselect. During the search for one or more NG-RANs, the UE may determine whether there is a NG-RAN supporting the network service, among the one or more NG-RANs. For example, the UE may check one or more cells of the one or more NG-RANs.

In an example, after searching for the one or more NG-RANs, among the one or more NG-RANs, if there is no NG-RAN supporting the network service, the UE may determine that NG-RAN supporting the network slice is not available. To assist the UE to determine whether an NG-RAN supports the network service or not, the NG-RAN may send information on the supported network service by the NG-RAN. For example, the one or more NG-RANs may send information on the supported network service by the one or more NG-RANs. For example, the information on the supported network service may be sent via SIB. In an example, each NG-RAN of the one or more NG-RANs may comprise at least one of a gNB and/or ng-eNB and/or the like. In an example, after searching for the one or more NG-RANs, among the one or more NG-RANs, if there is a NG-RAN supporting the network service, the UE may establish a connection with the NG-RAN supporting the network service. Based on the established connection, the UE may receive a data associated with the data arrival.

In an example, the first NG-RAN may receive a N2 Paging message from the AMF. Based on the N2 Paging message, the UE may send the paging message to the UE. The N2 Paging message may indicate a data arrival. The N2 Paging message may comprise at least one of an identifier of the UE (e.g., UE paging identity, S-TMSI, etc.) and/or one or more tracking area identifiers (TAIs) and/or information of a paging priority and/or a radio capability of the wireless device for paging and/or information of paging discontinuous reception (DRX) and/or information of coverage restriction and/or a wake-up signal (WUS) assistance information.

In an example, the network service may comprise information on one or more network services. The one or more network service may comprise one or more network slices. The one or more network slices may be one or more S-NSSAIs. In an example, the network service may be one of the network services that the UE registered to a network (e.g., AMF, SMF, and/or the like). The first NG-RAN may comprise one or more cell of a registration area of the UE.

In an example, when the UE receives the message indicating the data arrival, a radio and resource control (RRC) entity of the UE may receive the message indicating the data arrival. The radio and resource control entity may deliver to a non-access stratum (NAS) entity, information of the message indicating the data arrival.

In an example, if there is no NG-RAN supporting the network service, the UE (e.g., the non-access stratum entity) may send to the network node, indication that the network service is not available. The indication sent by the UE may comprise an information that the UE fails to find a NG-RAN supporting the network service and/or an information that the indication of the data arrival is rejected by the wireless device. The indication sent by the UE may comprise an information that the indication of the data arrival is received by the UE. If the network node receives the indication sent by the UE, the indication of unavailability of the network service, the network node terminates a procedure for indication of data arrival (e.g., paging procedure). If the network node (e.g., AMF) receives the indication of unavailability of the network service, the network node may send to a second network node (e.g., SMF), a message indication failure of notification of data arrival. Based on the indication from the network node, the second network node may discard a data associated with the data arrival.

In an example, a RRC entity of a UE may receive a message indicating a data arrival (e.g., paging) from a first NG-RAN. The message indicating the data arrival may comprise a network service information (e.g., network slice information). The RRC entity may receive from a NAS entity, a request to establish a connection with a NG-RAN. The request may comprise the network service information. The RRC entity may receive from one or more NG-RANs, one or more information of one or more network services supported by the one or more NG-RANs. Based on the information from the NAS entity, the RRC entity may establish connection with a NG-RAN (e.g., the first NG-RAN and/or the one or more NG-RANs). The RRC entity may send to the second NG-RAN, the network service information.

In an example, a RRC entity of a UE may receive from a NAS entity, a request to establish a RRC connection with a NG-RAN. The request may comprise a network service information. Based on the network service information, the RRC entity may determine whether a NG-RAN supporting a network service indicated by the network service information is available. If the NG-RAN supporting the network service is available, the RRC entity may perform a cell reselection to the NG-RAN. After cell reselection, the RRC entity may perform a procedure to establish the RRC connection to the NG-RAN. The UE may send to the NG-RAN, a RRC message comprising the network service information.

In an example, a UE may trigger a procedure to establish a connection with a NG-RAN, to get a network service. Based on information associated with the network service, the UE may determine whether a NG-RAN supporting the network service is available. If the NG-RAN supporting the network service is not available, the UE may send to a network an indication that the network service is not available.

In an example, an AMF may receive an indication of data arrival for a UE. The indication may comprise information of a network service. For the received indication of the data arrival, the AMF may trigger a procedure to notify the data arrival to the UE. For example, the procedure may be a N2 Paging procedure to a NG-RAN. The AMF may receive from the UE, an indication that the network service is not available. Based on the indication that the network service is not available, the AMF may terminate the procedure to notify the data arrival to the UE.

The invention claimed is:

1. A method comprising:
   receiving, by an access and mobility management function (AMF) from a wireless device, a non-access stratum (NAS) message comprising:
      an establishment request for a protocol data unit (PDU) session; and
      a network slice identifier of an allowed network slice within which the PDU session is established, wherein the allowed network slice comprises a first network slice;
   sending, by the AMF to the wireless device, one or more messages comprising a first list of allowed network slices comprising the first network slice, wherein based on the AMF determining that the first network slice becomes unavailable, the one or more messages further comprise:
      a second list of alternative network slices comprising a second network slice and a third network slice; and
      information indicating which one of the second network slice and the third network slice is an alternative network slice for the first network slice;
      wherein the information indicates that the second network slice is an alternative network slice for the first network slice;
      the first list of allowed network slices further comprises a fourth network slice; and
      the information indicates that the third network slice is an alternative network slice for the fourth network slice; and
   receiving, by the AMF from the wireless device, a second request message, for a second PDU session, indicating the alternative network slice.

2. The method of claim 1, wherein data associated with the first network slice is transmitted via the alternative network slice.

3. The method of claim 1, wherein the AMF sends the one or more messages upon determining the allowed network slice is not available in a tracking area (TA) of a registration area (RA).

4. The method of claim 3, wherein the allowed network slice is supported in a first TA of the RA, wherein the RA comprises the first TA and the TA.

5. The method of claim 1, further comprising sending, by the AMF, a paging message.

6. The method of claim 5, wherein the paging message indicates a data arrival of the allowed network slice.

7. An access and mobility management function (AMF) comprising one or more processors and memory storing instructions that, when executed by the one or more processors, cause the AMF to:

receive, from a wireless device, a non-access stratum (NAS) message comprising:

an establishment request for a protocol data unit (PDU) session; and a network slice identifier of an allowed network slice within which the PDU session is established, wherein the allowed network slice comprises a first network slice;

send, to the wireless device, one or more messages comprising a first list of allowed network slices comprising the first network slice, wherein based on the AMF determining that the first network slice becomes unavailable, the one or more messages further comprise:

a second list of alternative network slices comprising a second network slice and a third network slice; and information indicating which one of the second network slice and the third network slice is an alternative network slice for the first network slice;

wherein the information indicates that the second network slice is an alternative network slice for the first network slice;

the first list of allowed network slices further comprises a fourth network slice; and the information indicates that the third network slice is an alternative network slice for the fourth network slice; and receive, from the wireless device, a second request message, for a second PDU session, indicating the alternative network slice.

8. The AMF of claim 7, wherein data associated with the first network slice is transmitted via the alternative network slice.

9. The AMF of claim 7, wherein the AMF sends the one or more messages upon determining the allowed network slice is not available in a tracking area (TA) of a registration area (RA).

10. The AMF of claim 9, wherein the allowed network slice is supported in a first TA of the RA, wherein the RA comprises the first TA and the TA.

11. The AMF of claim 7, wherein the instructions further cause the AMF to send a paging message.

12. The method of claim 11, wherein the paging message indicates a data arrival of the allowed network slice.

13. A method comprising:

sending, by a wireless device to an access and mobility function (AMF), a non-access stratum (NAS) message comprising:

an establishment request for a protocol data unit (PDU) session; and a network slice identifier of an allowed network slice within which the PDU session is established, wherein the allowed network slice comprises a first network slice;

receiving, by the wireless device from the AMF, one or more messages comprising a first list of allowed network slices comprising the first network slice, wherein based on the AMF determining that the first network slice becomes unavailable, the one or more messages further comprise:

a second list of alternative network slices comprising a second network slice and a third network slice; and information indicating which one of the second network slice and the third network slice is an alternative network slice for the first network slice;

wherein the information indicates that the second network slice is an alternative network slice for the first network slice;

the first list of allowed network slices further comprises a fourth network slice; and the information indicates that the third network slice is an alternative network slice for the fourth network slice; and sending, by the wireless device to the AMF, a second request message, for a second PDU session, indicating the alternative network slice.

14. The method of claim 13, wherein the second PDU session is via the alternative network slice.

15. The method of claim 14, wherein the second request message indicates that the allowed network slice is not available.

16. The method of claim 15, wherein the second request message indicates that the allowed network slice is not available in a tracking area (TA) of a registration (RA).

17. The method of claim 13, further comprising receiving, from the AMF, a paging message.

* * * * *